United States Patent
Snibbe et al.

(10) Patent No.: US 10,120,530 B2
(45) Date of Patent: Nov. 6, 2018

(54) METHODS AND DEVICES FOR TOUCH-BASED MEDIA CREATION

(71) Applicant: Facebook, Inc., Menlo Park, CA (US)

(72) Inventors: Scott Snibbe, San Francisco, CA (US); Graham McDermott, Berkeley, CA (US); Justin Ponczek, San Francisco, CA (US); Spencer Schoeben, Palo Alto, CA (US); Jesse Fulton, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 395 days.

(21) Appl. No.: 14/933,921

(22) Filed: Nov. 5, 2015

(65) Prior Publication Data

US 2016/0054873 A1 Feb. 25, 2016

Related U.S. Application Data

(63) Continuation of application No. 14/608,099, filed on Jan. 28, 2015, now Pat. No. 9,207,844.
(Continued)

(51) Int. Cl.
*G06F 3/0482* (2013.01)
*G06F 3/0484* (2013.01)
(Continued)

(52) U.S. Cl.
CPC .......... *G06F 3/0482* (2013.01); *G06F 3/0412* (2013.01); *G06F 3/0488* (2013.01);
(Continued)

(58) Field of Classification Search
CPC . G06F 3/04883; G06F 3/0412; G06F 3/04842
See application file for complete search history.

(56) References Cited

U.S. PATENT DOCUMENTS

| 6,493,872 B1 | 12/2002 | Rangan |
| 8,209,723 B2 | 6/2012 | Sakaguchi et al. |

(Continued)

FOREIGN PATENT DOCUMENTS

| EP | 2575131 A1 | 4/2013 |
| EP | 3100182 | 12/2016 |

(Continued)

OTHER PUBLICATIONS

"Create your own music video with video star". Bakari Chavanu. Retrieved from the wayback machine dated Jun. 13, 2012. Available at: http://web.archive.org/web/20120613172308/http://www.makeuseof.com/tag/create-your-own-music-video-with-video-star/ 16 pgs.*

(Continued)

*Primary Examiner* — Omar R Abdul-Ali
(74) *Attorney, Agent, or Firm* — Kilpatrick Townsend & Stockton LLP

(57) ABSTRACT

The various embodiments described herein include methods and systems for generating interactive media items. In one aspect, a method is performed at a server system. The method includes providing access for playback of an interactive media item based on metadata generated using information associated with the interactive media item. The metadata includes information associating at least one parameter with the interactive media item. The interactive media item is generated based on one or more user inputs selecting one or more interactive effects for association with the interactive media item. The user input(s) cause the server system to make the one or more interactive effects available to a subsequent viewer during the playback of the interactive media item, such that the subsequent viewer is able to interact with video and/or audio of the interactive media item by controlling the at least one parameter during the playback.

20 Claims, 38 Drawing Sheets

Related U.S. Application Data

(60) Provisional application No. 61/934,665, filed on Jan. 31, 2014.

(51) Int. Cl.
| | |
|---|---|
| *G06F 3/0488* | (2013.01) |
| *G06F 21/10* | (2013.01) |
| *H04L 29/08* | (2006.01) |
| *G11B 27/031* | (2006.01) |
| *G11B 27/34* | (2006.01) |
| *G06F 3/041* | (2006.01) |

(52) U.S. Cl.
CPC ........ *G06F 3/04842* (2013.01); *G06F 21/105* (2013.01); *G11B 27/031* (2013.01); *G11B 27/34* (2013.01); *H04L 67/10* (2013.01)

(56) References Cited

U.S. PATENT DOCUMENTS

| | | | |
|---|---|---|---|
| 8,258,390 B1 | 9/2012 | Gossweiler et al. | |
| 8,594,714 B2 | 11/2013 | Wu | |
| 8,745,500 B1* | 6/2014 | Kostello | G11B 27/34 |
| | | | 386/282 |
| 8,806,320 B1 | 8/2014 | Abdo | |
| 8,996,538 B1 | 3/2015 | Cremer et al. | |
| 9,116,912 B1 | 8/2015 | Snibbe et al. | |
| 9,207,844 B2 | 12/2015 | Snibbe et al. | |
| 9,207,857 B2 | 12/2015 | Snibbe et al. | |
| 9,268,787 B2 | 2/2016 | Snibbe et al. | |
| 9,519,644 B2 | 12/2016 | Snibbe et al. | |
| 2004/0095379 A1 | 5/2004 | Chang et al. | |
| 2004/0096379 A1 | 5/2004 | Furste et al. | |
| 2005/0078947 A1 | 4/2005 | Chung | |
| 2006/0005143 A1 | 1/2006 | Sakkinen et al. | |
| 2006/0064716 A1 | 3/2006 | Sull et al. | |
| 2006/0212478 A1 | 9/2006 | Plastina et al. | |
| 2007/0061724 A1 | 3/2007 | Slothouber et al. | |
| 2007/0188657 A1 | 8/2007 | Basson et al. | |
| 2007/0204003 A1 | 8/2007 | Abramson | |
| 2007/0250896 A1 | 10/2007 | Parker et al. | |
| 2008/0092047 A1 | 4/2008 | Fealkoff et al. | |
| 2008/0136940 A1 | 6/2008 | Srikanth et al. | |
| 2008/0208692 A1 | 8/2008 | Garaventi et al. | |
| 2008/0209482 A1 | 8/2008 | Meek et al. | |
| 2008/0256086 A1 | 10/2008 | Miyoshi et al. | |
| 2008/0274687 A1 | 11/2008 | Roberts et al. | |
| 2009/0100361 A1 | 4/2009 | Abello et al. | |
| 2009/0150797 A1 | 6/2009 | Burkholder et al. | |
| 2009/0271283 A1 | 10/2009 | Fosnacht | |
| 2010/0223128 A1 | 9/2010 | Dukellis et al. | |
| 2010/0223314 A1 | 9/2010 | Gadel | |
| 2011/0066940 A1 | 3/2011 | Kamrani et al. | |
| 2011/0163969 A1* | 7/2011 | Anzures | G06F 3/04883 |
| | | | 345/173 |
| 2012/0026397 A1 | 2/2012 | Gummagatta | |
| 2012/0233644 A1 | 9/2012 | Rao | |
| 2012/0254925 A1 | 10/2012 | Nassiri | |
| 2013/0047081 A1 | 2/2013 | Long et al. | |
| 2013/0070093 A1 | 3/2013 | Rivera | |
| 2013/0117692 A1* | 5/2013 | Padmanabhan | H04N 21/4126 |
| | | | 715/753 |
| 2013/0218942 A1 | 9/2013 | Willis et al. | |
| 2013/0238696 A1 | 9/2013 | Cotelo | |
| 2013/0273968 A1 | 10/2013 | Rhoads et al. | |
| 2013/0311886 A1* | 11/2013 | Ku | G06F 3/0484 |
| | | | 715/719 |
| 2014/0040742 A1 | 2/2014 | Park et al. | |
| 2014/0074712 A1 | 3/2014 | Palmer et al. | |
| 2014/0115469 A1 | 4/2014 | Pendergast et al. | |
| 2014/0237365 A1* | 8/2014 | Oberbrunner | G11B 27/34 |
| | | | 715/722 |
| 2014/0359448 A1* | 12/2014 | Paulus | G06F 3/04847 |
| | | | 715/722 |
| 2015/0066780 A1 | 3/2015 | Cohen et al. | |
| 2015/0067514 A1 | 3/2015 | Lewis et al. | |
| 2015/0067726 A1 | 3/2015 | Glasser | |
| 2015/0220249 A1 | 8/2015 | Snibbe et al. | |
| 2015/0220558 A1 | 8/2015 | Snibbe et al. | |
| 2015/0221339 A1 | 8/2015 | Snibbe et al. | |
| 2015/0234564 A1 | 8/2015 | Snibbe et al. | |
| 2015/0286716 A1 | 10/2015 | Snibbe et al. | |
| 2015/0339295 A1 | 11/2015 | Snibbe et al. | |
| 2015/0341707 A1 | 11/2015 | Snibbe et al. | |
| 2016/0173960 A1 | 6/2016 | Snibbe et al. | |
| 2017/0040039 A1 | 2/2017 | Snibbe et al. | |
| 2017/0325007 A1 | 11/2017 | Snibbe et al. | |

FOREIGN PATENT DOCUMENTS

| | | |
|---|---|---|
| EP | 3100268 | 12/2016 |
| WO | WO2011/066432 A2 | 6/2011 |
| WO | 2015116839 | 8/2015 |
| WO | 2015116841 | 8/2015 |

OTHER PUBLICATIONS

Eyegroove, Inc., International Preliminary Report on Patentability, PCT/US2015/013570, dated Aug. 2, 2016, 8 pgs.
Eyegroove, Inc., Communication Pursuant to Rules 161(2) and 162, EP15705154.1, dated Sep. 20, 2016, 2 pgs.
U.S. Appl. No. 14/816,984, Final Office Action dated Dec. 8, 2017, 7 pages.
Canadian Application No. 2,975,416, Notice of Allowance dated Nov. 21, 2017, 1 page.
U.S. Appl. No. 14/820,477, Non-Final Office Action dated Jan. 12, 2018, 21 pages.
U.S. Appl. No. 15/297,062, Notice of Allowance dated Jan. 16, 2018, 8 pages.
U.S. Appl. No. 15/297,062, Corrected Notice of Allowance dated Feb. 13, 2018, 5 pages.
Eyegroove, Inc., International Search Report and Written Opinion, PCT/US2015/013568, dated Apr. 14, 2015, 8 pgs.
Eyegroove, Inc., International Search Report and Written Opinion, PCT/US2015/013570, dated May 20, 2015, 11 pgs.
Handler, A., "iMovie for iPhone," Jan. 24, 2013, downloaded from http://examples.oreilly.com/9781449393656/iMovie_for_iPhone, 11 pgs.
U.S. Appl. No. 14/608,097, First Action Interview Pilot Program Pre-Interview Communication dated Sep. 8, 2015, 5 pages.
U.S. Appl. No. 14/608,097, Notice of Allowance dated Oct. 14, 2015, 11 pages.
U.S. Appl. No. 14/608,099, Non-Final Office Action dated Apr. 20, 2015, 14 pages.
U.S. Appl. No. 14/608,099, Notice of Allowance dated Aug. 6, 2015, 8 pages.
U.S. Appl. No. 14/608,103, Notice of Allowance dated Aug. 11, 2015, 19 pages.
U.S. Appl. No. 14/608,103, Pre-Interview First Office Action dated Apr. 30, 2015, 5 pages.
U.S. Appl. No. 14/608,105, Notice of Allowance dated Mar. 27, 2015, 9 pages.
U.S. Appl. No. 14/608,108, Final Office Action dated Feb. 26, 2016, 11 pages.
U.S. Appl. No. 14/608,108, Final Office Action dated Aug. 14, 2015, 12 pages.
U.S. Appl. No. 14/608,108, Non-Final Office Action dated Nov. 12, 2015, 14 pages.
U.S. Appl. No. 14/608,108, Notice of Allowance dated Jul. 15, 2016, 7 pages.
U.S. Appl. No. 14/608,108, Pre-Interview First Office Action dated Mar. 26, 2015, 5 pages.
U.S. Appl. No. 14/816,984, Non-Final Office Action dated Jun. 15, 2017, 7 pages.
U.S. Appl. No. 14/820,477, Final Office Action dated Feb. 9, 2017, 20 pages.

(56) References Cited

OTHER PUBLICATIONS

U.S. Appl. No. 14/820,477, Final Office Action dated Sep. 29, 2017, 22 pages.
U.S. Appl. No. 14/820,477, Non-Final Office Action dated Jun. 17, 2016, 16 pages.
U.S. Appl. No. 14/820,477, Non-Final Office Action dated Apr. 26, 2017, 20 pages.
U.S. Appl. No. 15/051,618, Non-Final Office Action dated Sep. 6, 2017, 18 pages.
U.S. Appl. No. 15/297,062, Non-Final Office Action dated Sep. 25, 2017, 7 pages.
Canadian Application No. 2,975,411, Office Action dated Sep. 15, 2017, 7 pages.
European Application No. 12820426.0, Supplemental European Search Report dated Feb. 27, 2015, 6 pages.
European Application No. 15705155.8, Communication Pursuant to Rules 161(2) and 162 dated Sep. 28, 2016, 2 pages.
International Patent Application No. PCT/US2015/013568, International Preliminary Report on Patentability dated Aug. 11, 2016, 7 pages.

* cited by examiner

Metadata Structure 500 →

| id tag 502 | |
|---|---|
| author 504 | |
| date/time 506 | |
| media file pointer(s) 508 | |
| audio source table(s) 510 | |
| audio pointer 512-a | start time 514-a |
| audio pointer 512-b | start Time 514-b |
| ⋮ | ⋮ |
| effects table 516 | |
| <user, effect type, effect version, content, t1, t2, p1, p2, ..., effect script> 518-a | |
| <user, effect type, effect version, content, t1, t2, p1, p2, ..., effect script> 518-b | |
| ⋮ | |
| interactive effects table 520 | |
| <user, effect type, effect version, content, p1, p2, ..., mapping table, effect script> 522-a | |
| <user, effect type, effect version, content, p1, p2, ..., mapping table, effect script> 522-b | |
| ⋮ | |
| play count 524 | |
| <user, date, time, loc, ...> 526-a | |
| ⋮ | |
| shares 528 | |
| <user, method, date, time, loc, ...> 530-a | |
| ⋮ | |
| comments 532 | |
| <comment, user, date, time, loc, ...> 534-a | |
| ⋮ | |
| associated media items 536 | |
| <id tag, user, date, time, loc, ...> 538-a | |
| ⋮ | |
| ⋮ | |

Figure 5

METHODS AND DEVICES FOR TOUCH-BASED MEDIA CREATION

PRIORITY CLAIM AND RELATED APPLICATIONS

The present application is a continuation of U.S. patent application Ser. No. 14/608,099, filed Jan. 28, 2015, entitled "Methods and Devices for Touch-based Media Creation," which itself claims priority to U.S. Provisional Patent Application No. 61/934,665, filed Jan. 31, 2014, both of which are hereby expressly incorporated by reference in their entirety.

This application is related to U.S. patent application Ser. No. 14/608,097, filed Jan. 28, 2015, entitled "Methods and Devices for Synchronizing and Sharing Media Items," U.S. patent application Ser. No. 14/608,103, entitled "Methods and Devices for Presenting Interactive Media Items," U.S. patent application Ser. No. 14/608,105, filed Jan. 28, 2015, entitled "Methods and Devices for Modifying Pre-Existing Media Items," and U.S. patent application Ser. No. 14/608,108, entitled "Methods and Devices for Generating Media Items," which are hereby incorporated by reference in their entirety.

TECHNICAL FIELD

The present invention relates to the field of Internet technologies, and more particularly to touch-based creation of a media item.

BACKGROUND OF THE INVENTION

As wireless networks and the processing power of mobile devices have improved, web-based applications increasingly allow everyday users to create original content in real-time without professional software. For example, Instagram and Vine allow a user to create original media content that is personalized to the user's tastes—anytime and anywhere. Despite the advances in the provision of web-based media creation applications, some solutions for creating media content are clumsy or ill-suited to future improvements in provisioning media content.

SUMMARY

Various implementations of methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to generate a media item.

In some embodiments, a client-side method of generating a media item is performed at a client device (e.g., client device 104, FIGS. 1-2) with one or more processors and memory. The method includes displaying a first user interface including a plurality of audio tracks. The method also includes: detecting a first user input selecting one of the plurality of audio tracks; and in response to detecting the first user input, displaying a second user interface for recording a video clip. The method also includes: detecting a second user input to initiate recording of the video clip; and detecting a third user input to stop recording of the video clip. The method further includes: detecting a fourth user input to publish the media item based on the video clip and the selected audio track; and in response to detecting the fourth user input, publishing the media item to a server, including sending to the server information identifying the selected audio track, the video clip, and information related to synchronization of the selected audio track and the video clip.

In some embodiments, a server-side method of generating a media item is performed at a server system (e.g., server system 108, FIGS. 1 and 3) with one or more processors and memory. The method includes: receiving first information, from a client device, identifying at least a portion of an audio track associated with the media item; and receiving second information, from the client device, identifying one or more media files associated with the media item. The method also includes generating a metadata structure corresponding to the media item generated by the client device, where: the metadata structure enables synchronization of at least the portion of the audio track with the one or more media files; and the metadata structure includes: a pointer to the audio track identified by the first information; and a pointer to the one or more media files identified by the second information.

In some embodiments, an electronic device or a computer system (e.g., client device 104, FIGS. 1-2 or server system 108, FIGS. 1 and 3) includes one or more processors and memory storing one or more programs for execution by the one or more processors, the one or more programs include instructions for performing the operations of the methods described herein. In some embodiments, a non-transitory computer readable storage medium storing one or more programs, the one or more programs comprising instructions, which, when executed by an electronic device or a computer system (e.g., client device 104, FIGS. 1-2 or server system 108, FIGS. 1 and 3) with one or more processors, cause the electronic device or computer system to perform the operations of the methods described herein.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

FIG. 5 is a diagram of a representative metadata structure for a respective media item in accordance with some embodiments.

Figure 1:
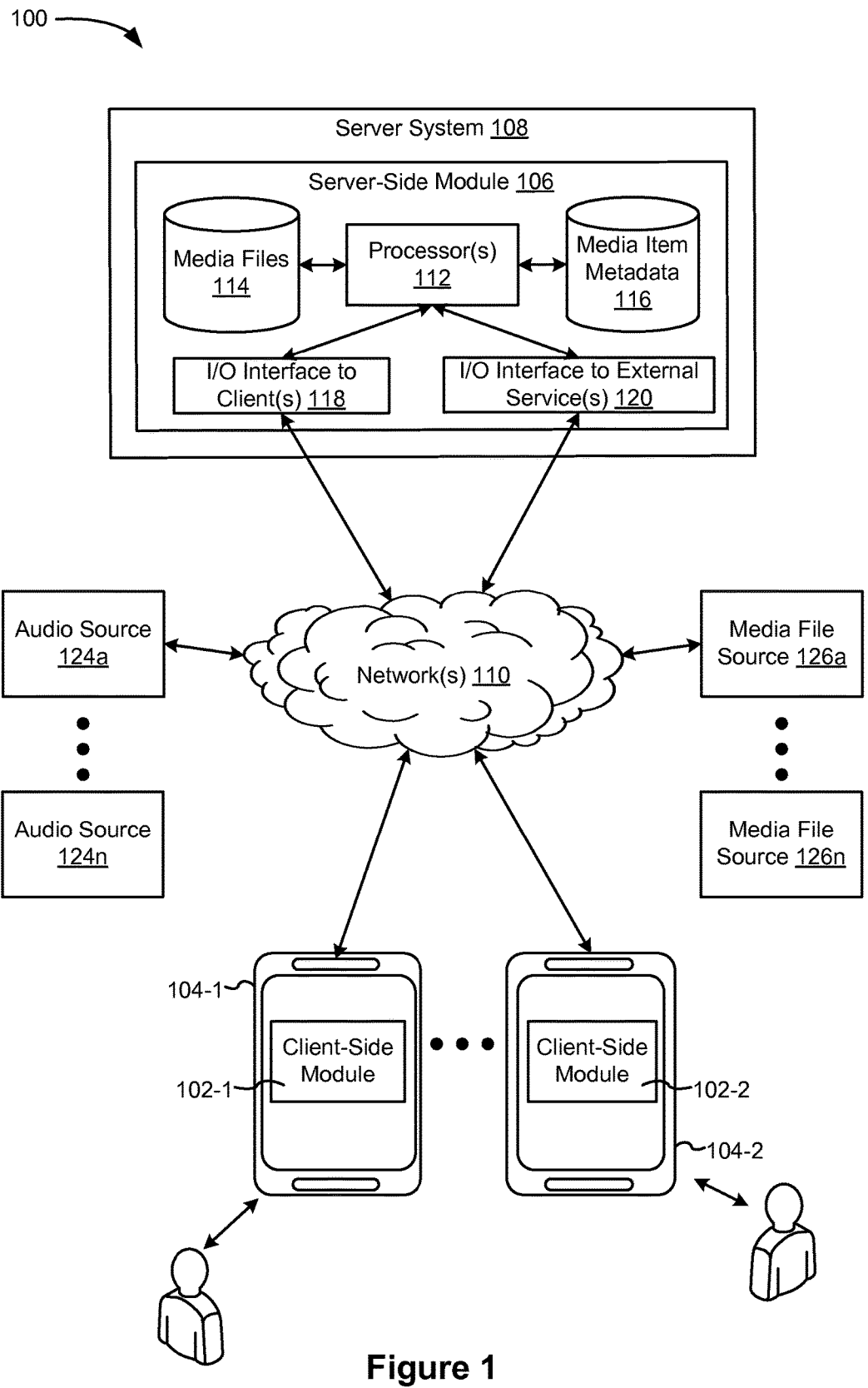
FIG. 1 is a block diagram of a server-client environment in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

As shown in FIG. 1, an application for generating, exploring, and presenting media items is implemented in a server-client environment 100 in accordance with some embodiments. In some embodiments, the application includes client-side processing 102-1, 102-2 (hereinafter "client-side module 102") executed on a client device 104-1, 104-2 and server-side processing 106 (hereinafter "server-side module 106") executed on a server system 108. Client-side module 102 communicates with server-side module 106 through one or more networks 110. Client-side module 102 provides client-side functionalities associated with the application (e.g., creation and presentation of media items) such as client-facing input and output processing and communications with server-side module 106. Server-side module 106 provides server-side functionalities associated with the application (e.g., generating metadata structures for, storing portions of, and causing/directing presentation of media items) for any number of client modules 102 each residing on a respective client device 104.

In some embodiments, server-side module 106 includes one or more processors 112, media files database 114, media item metadata database 116, an I/O interface to one or more clients 118, and an I/O interface to one or more external services 120. I/O interface to one or more clients 118 facilitates the client-facing input and output processing for server-side module 106. One or more processors 112 receive requests from client-side module 102 to create media items or obtain media items for presentation. Media files database 114 stores media files, such as images and/or video clips, associated with media items, and media item metadata database 116 stores a metadata structure for each media item, where each metadata structure associates one or more media files and at least a portion of an audio track with a media item. In some embodiments, media files database 114 and media item metadata database 116 are communicatively coupled with but located remotely from server system 116. In some embodiments, media files database 114 and media item metadata database 116 are located separately from one another. In some embodiments, server-side module 106 communicates with one or more external services such as audio sources 124a . . . 124n (e.g., streaming audio service providers such as Spotify, SoundCloud, Rdio, Pandora, and the like) and media file sources 126a . . . 126n (e.g., service providers of images and/or video such as YouTube, Vimeo, Vine, Flickr, Imgur, and the like) through one or more networks 110. I/O interface to one or more external services 120 facilitates such communications.

Examples of client device 104 include, but are not limited to, a handheld computer, a wearable computing device (e.g., Google Glass or a smart watch), a biologically implanted computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 110 include local area networks ("LAN") and wide area networks ("WAN") such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some embodiments, server system 108 is managed by the provider of the application for generating, exploring, and presenting media items. Server system 108 is implemented on one or more standalone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108.

Although server-client environment 100 shown in FIG. 1 includes both a client-side portion (e.g., client-side module 102) and a server-side portion (e.g., server-side module 106), in some embodiments, the application is implemented as a standalone application installed on client device 104. In addition, the division of functionalities between the client and server portions can vary in different embodiments. For example, in some embodiments, client-side module 102 is a thin-client that provides only user-facing input and output processing functions, and delegates all other data processing functionalities to a backend server (e.g., server system 108).

Figure 2:
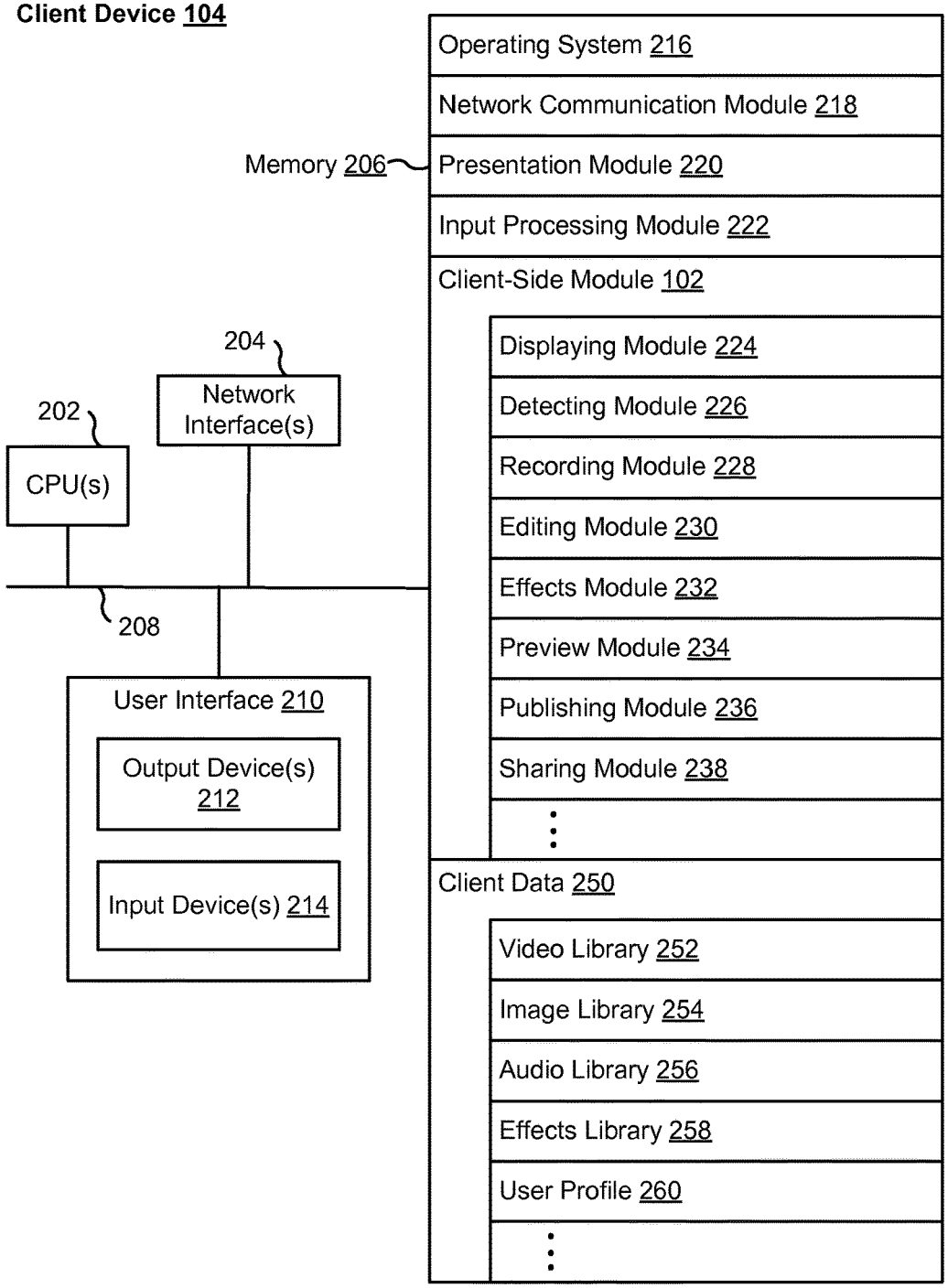
FIG. 2 is a block diagram of a client device in accordance with some embodiments.

FIG. 2 is a block diagram illustrating a representative client device 104 associated with a user in accordance with some embodiments. Client device 104, typically, includes one or more processing units (CPUs) 202, one or more network interfaces 204, memory 206, and one or more communication buses 208 for interconnecting these components (sometimes called a chipset). Client device 104 also includes a user interface 210. User interface 210 includes one or more output devices 212 that enable presentation of media content, including one or more speakers and/or one or more visual displays. User interface 210 also includes one or more input devices 214, including user interface components that facilitate user input such as a keyboard, a mouse, a voice-command input unit or microphone, an accelerometer, a gyroscope, a touch-screen display, a touch-sensitive input pad, a gesture capturing camera, or other input buttons or controls. Furthermore, some client devices 104 use a microphone and voice recognition, a camera and gesture recognition, a brainwave sensor/display, or biologically implanted sensors/displays (e.g. digital contact lenses, fingertip/muscle implants, and so on) to supplement or replace the keyboard, display, or touch screen. Memory 206 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 206, optionally, includes one or more storage devices remotely located from one or more processing units 202. Memory 206, or alternatively the non-volatile memory device(s) within memory 206, includes a non-transitory computer readable storage medium. In some implementations, memory 206, or the non-transitory computer readable storage medium of memory 206, stores the following programs, modules, and data structures, or a subset or superset thereof:

- operating system 216 including procedures for handling various basic system services and for performing hardware dependent tasks;
- network communication module 218 for connecting user device 104 to other computing devices (e.g., server system 108, audio sources 124a . . . 124n, and media file sources 126a . . . 126n) connected to one or more networks 110 via one or more network interfaces 204 (wired or wireless);
- presentation module 220 for enabling presentation of information (e.g., a media item, a user interface for an application or a webpage, audio and/or video content, text, etc.) at client device 104 via one or more output devices 212 (e.g., displays, speakers, etc.) associated with user interface 210; and
- input processing module 222 for detecting one or more user inputs or interactions from one of the one or more input devices 214 and interpreting the detected input or interaction.

In some embodiments, memory 206 also includes a client-side module 102 associated with an application for creating, exploring, and playing back media items that includes, but is not limited to:

- displaying module 224 for displaying user interfaces of the application;
- detecting module 226 for detecting one or more user inputs corresponding to the application;
- recording module 228 for recording live and/or pre-existing video clips and/or images for a media item;
- editing module 230 for reordering, deleting, and otherwise editing video clips in a media item prior to publishing the media item;
- effects module 232 for applying video and/or audio effects to the media item prior to publishing the media item;
- preview module 234 for presenting at least a portion of the media item prior to publishing the media item;
- publishing module 236 for causing the media item to be published by at least sending, to server system 108, first information identifying at least a portion of an audio track associated with the media item and second information identifying one or more media files associated with the media item; and
- sharing module 238 for sharing the media item via one or more sharing methods (e.g., email, SMS, social media outlets, etc.).

In some embodiments, memory 206 also includes client data 250 for storing data for the application. Client data 250 includes, but is not limited to:

- video library 252 storing one or more pre-existing video clips recorded prior to executing the application;
- image library 254 storing one or more pre-existing images captured prior to executing the application;
- audio library 256 storing one or more pre-existing audio tracks created or stored prior to executing the application;
- effects library 258 including functions for implementing one or more real-time or post-processed audio and/or video effects (e.g., OpenGL Shading Language (GLSL) shaders); and
- user profile 260 including a plurality of preferences associated with the application for the user of client device 104.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
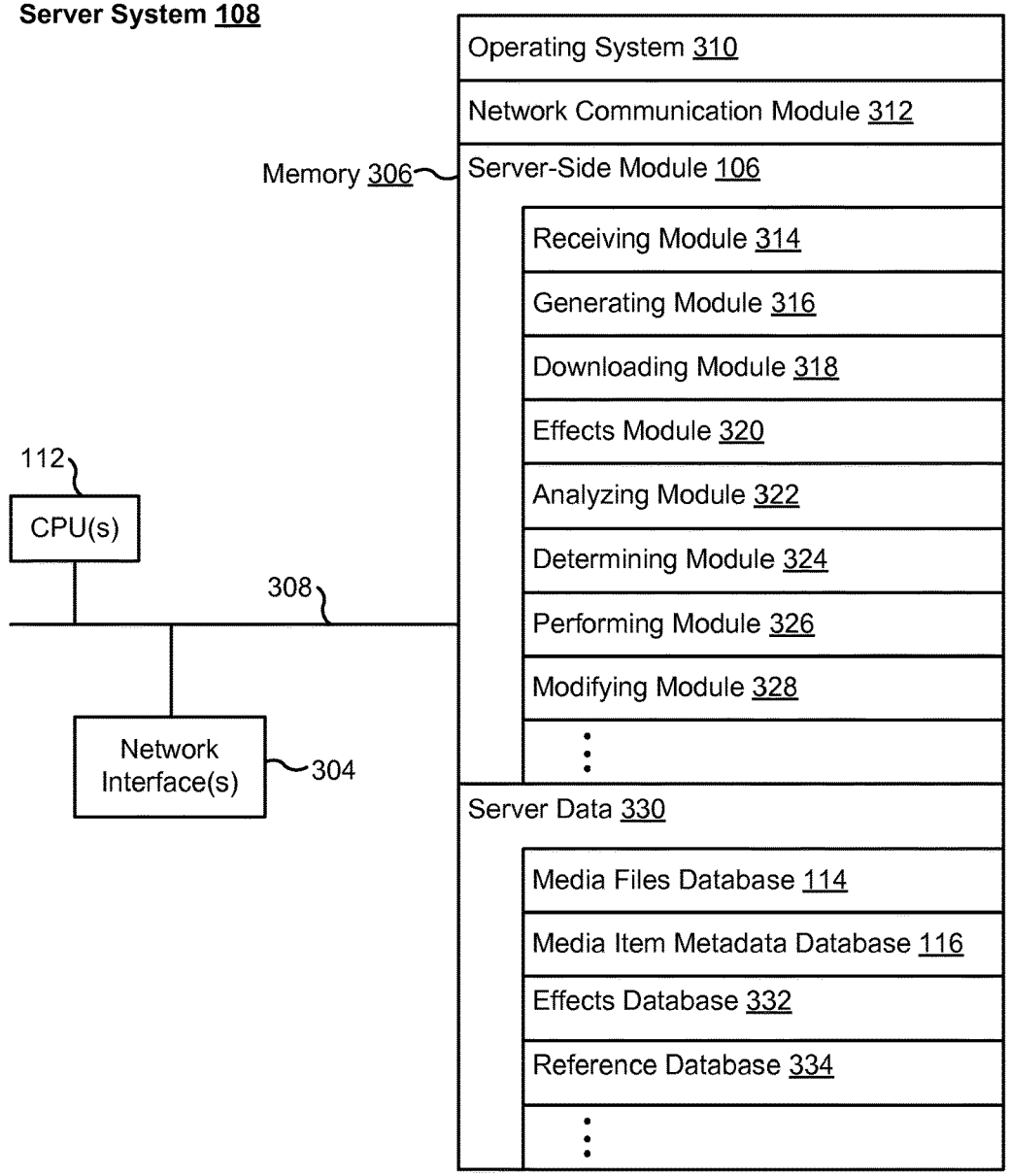
FIG. 3 is a block diagram of a server system in accordance with some embodiments.

FIG. 3 is a block diagram illustrating server system 108 in accordance with some embodiments. Server system 108, typically, includes one or more processing units (CPUs) 112, one or more network interfaces 304 (e.g., including I/O interface to one or more clients 118 and I/O interface to one or more external services 120), memory 306, and one or more communication buses 308 for interconnecting these components (sometimes called a chipset). Memory 306 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 306, optionally, includes one or more storage devices remotely located from one or more processing units 112. Memory 306, or alternatively the non-volatile memory device(s) within memory 306, includes a non-transitory computer readable storage medium. In some implementations, memory 306, or the non-transitory computer readable storage medium of memory 306, stores the following programs, modules, and data structures, or a subset or superset thereof:

- operating system 310 including procedures for handling various basic system services and for performing hardware dependent tasks;
- network communication module 312 that is used for connecting server system 108 to other computing devices (e.g., client devices 104, audio sources 124a . . . 124n, and media file sources 126a . . . 126n) connected to one or more networks 110 via one or more network interfaces 304 (wired or wireless);
- a server-side module 106 associated with the application for generating, exploring, and presenting media items that includes but is not limited to:
  - receiving module 314 for at least receiving, from client device 104, first information identifying at least a portion of an audio track for a new media item and second information identifying one or more media files (e.g., video clips or images) associated with the new media item;
  - generating module 316 for generating a metadata structure corresponding to the new media item;
  - downloading module 318 for downloading the one or more media files associated with the new media item;
  - effects module 320 for receiving and transmitting video and/or audio effects as scripts or computer-readable instructions (e.g., GLSL shaders for use with OpenGL ES) augmented with effect metadata corresponding to effect type, effect version, content, effect parameters, and so on;

analyzing module 322 for analyzing the audio track and the one or more media files associated with the new media item;

determining module 324 for determining whether the analyzed audio track and one or more media files match one of the reference audio tracks and video clips in reference database 332;

performing module 326 for performing a specified action in accordance with a determination that the analyzed audio track and one or more media files match one of the reference audio tracks and video clips in reference database 332; and modifying module 328 for flattening the new media item into a single stream or digital media item or for re-encoding media items for different formats and bit rates; and server data 330, including but not limited to:

media files database 114 storing one or more media files (e.g., images and/or video clips);

media item metadata database 116 storing a metadata structure for each media item, where each metadata structure associates one or more media files and at least a portion of an audio track with a respective media item;

effects database 332 storing one or more real-time or post-processed audio and/or video effects as scripts or computer-readable instructions (e.g., GLSL shaders for use with OpenGL ES) augmented with effect metadata corresponding to effect type, effect version, content, effect parameters, a table mapping of interactive input modalities to effect parameters for real-time effect interactivity, and so on; and reference database 334 storing a plurality of reference audio tracks and video clips and associated preferences.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

Figure 4A:
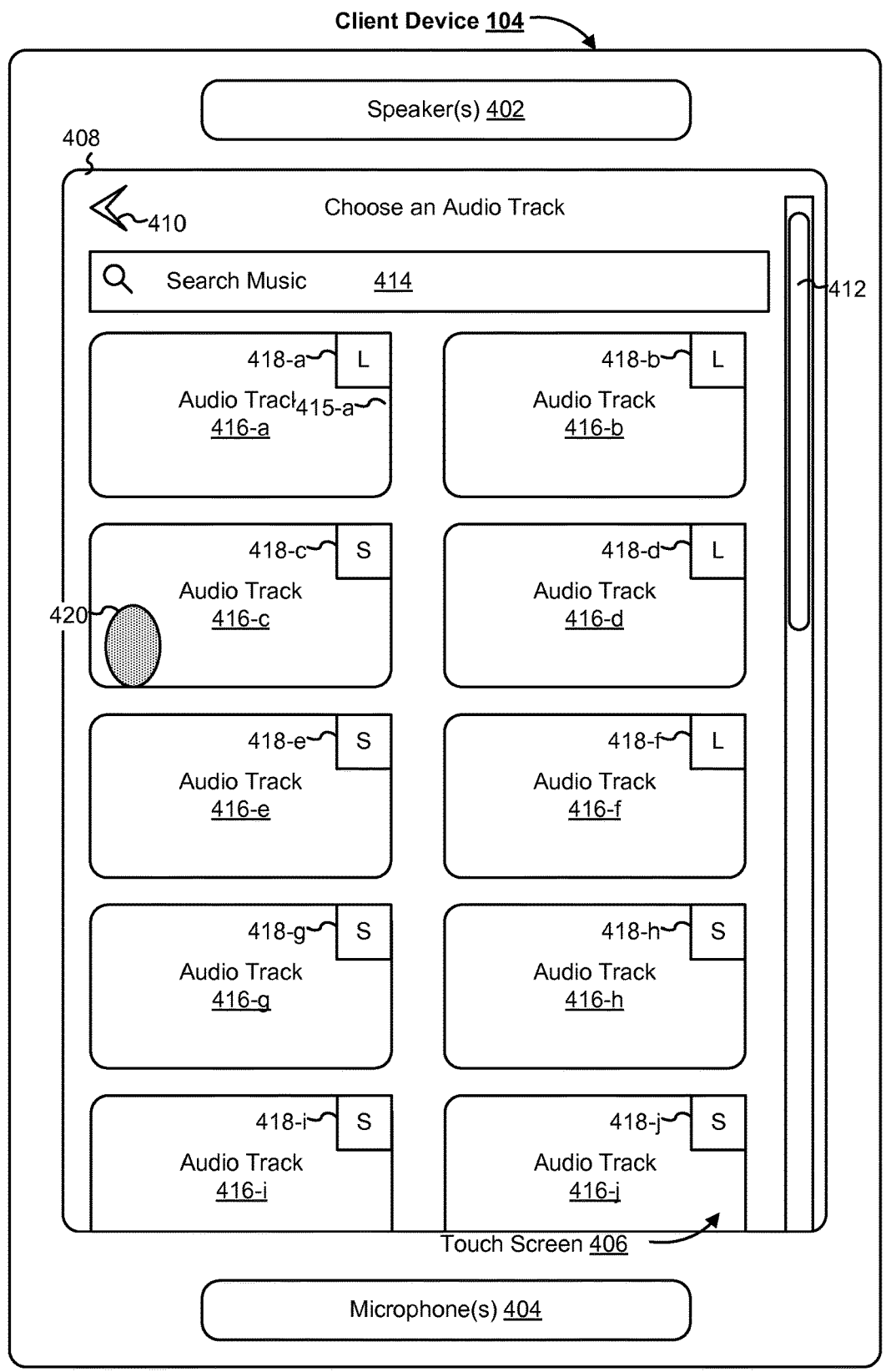
FIGS. 4A-4Z illustrate example user interfaces for generating media items in accordance with some embodiments.

Attention is now directed towards embodiments of user interfaces and associated processes that may be implemented on a respective client device 104 with one or more speakers 402 enabled to output sound, zero or more microphones 404 enabled to receive sound input, and a touch screen 406 enabled to receive one or more contacts and display information (e.g., media content, webpages and/or user interfaces for an application). FIGS. 4A-4Z illustrate example user interfaces for generating a media item in accordance with some embodiments.

Although some of the examples that follow will be given with reference to inputs on touch screen 406 (where the touch sensitive surface and the display are combined), in some embodiments, the device detects inputs on a touch-sensitive surface that is separate from the display. In some embodiments, the touch sensitive surface has a primary axis that corresponds to a primary axis on the display. In accordance with these embodiments, the device detects contacts with the touch-sensitive surface at locations that correspond to respective locations on the display. In this way, user inputs detected by the device on the touch-sensitive surface are used by the device to manipulate the user interface on the display of the device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

FIGS. 4A-4Z show user interfaces 408 displayed on client device 104 (e.g., a mobile phone) for an application for generating, exploring, and presenting media items; however, one skilled in the art will appreciate that the user interfaces shown in FIGS. 4A-4Z may be implemented on other similar computing devices. The user interfaces in FIGS. 4A-4Z are used to illustrate the processes described herein, including the processes described with respect to FIGS. 6A-6F.

FIG. 4A illustrates client device 104 displaying a first user interface of a process for generating a media item on touch screen 406. In FIG. 4A, the first user interface prompts the user of client device 104 to choose an audio track for the media item. In FIG. 4A, the user interface includes search query box 414 for searching for audio tracks and a plurality of audio track affordances 416 corresponding to audio tracks. In some embodiments, audio track affordances 416 corresponding to sponsored audio tracks are displayed at the top or near the top of the feed of first user interface. In some embodiments, each audio track affordance 416 includes album cover art or an associated image, artist name, and track title for the corresponding audio track. In FIG. 4A, each audio track affordance 416 includes a source indicator 418. For example, source indicator 418-a displays an "L" indicating that the audio track corresponding to audio track affordance 416-a is available locally (i.e., stored at client device 104), and source indicator 418-c displays an "S" indicating that the audio track corresponding to audio track affordance 416-c is available via a streaming audio service provider. In FIG. 4A, back navigation affordance 410, when activated (e.g., by a touch input from the user), causes client device 104 to display a previous user interface (e.g., a home screen for the application). In FIG. 4A, scroll bar 412 indicates that the balance of the audio tracks can be viewed by scrolling downwards. FIG. 4A also illustrates detecting contact 420 (e.g., a tap gesture) on touch screen 406 at a location corresponding to audio track affordance 416-c.

Figure 4B:
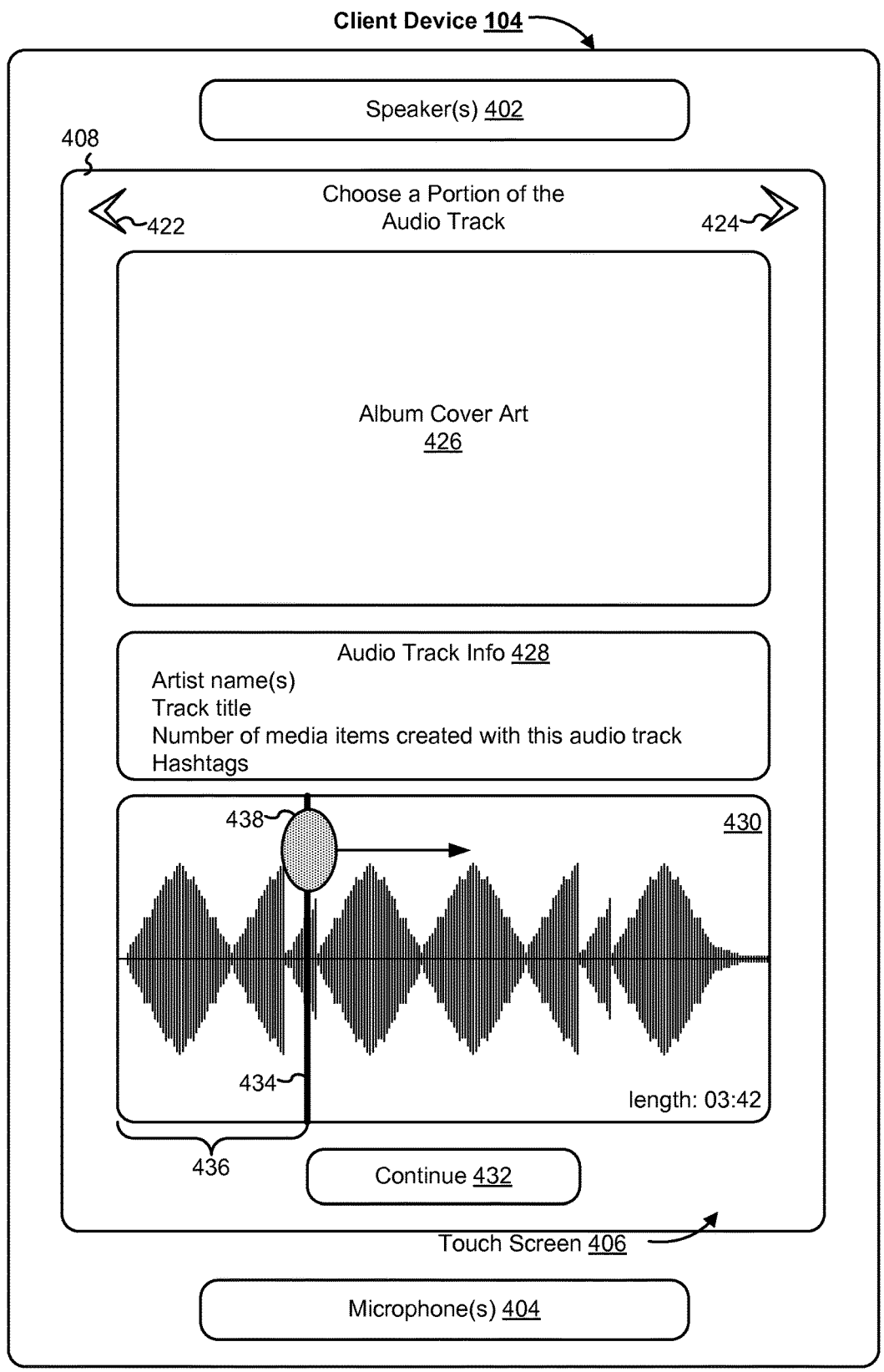

FIG. 4B illustrates client device 104 displaying a next user interface of the process for generating the media item on touch screen 406. In FIG. 4B, the user interface prompts the user of client device 104 to choose a portion of the audio track (e.g., the audio track corresponding to audio track affordance 416-c) in response to detecting contact 420 selecting audio track affordance 416-c in FIG. 4A. In FIG.

4B, the user interface includes album cover art 426, audio track information 428, and a waveform 430 for the audio track corresponding to audio track affordance 416-c. For example, audio track information 428 includes artist name (s), track title, the number of media items created with the audio track, and hashtags associated with the audio track corresponding to audio track affordance 416-c.

In FIG. 4B, waveform 430 optionally includes an end indicator 434 for selected portion 436 of the audio track corresponding to audio track affordance 416-c. For example, end indicator 434 defaults to the 30 second point in the audio track based on a predetermined or default audio portion size of 30 seconds. In FIG. 4B, the user interface also includes back navigation affordance 422, which, when activated (e.g., by a touch input from the user), causes client device 104 to display the previous user interface (e.g., the user interface in FIG. 4A), forward navigation affordance 424, which, when activated (e.g., by a touch input from the user), causes client device 104 to display a next user interface (e.g., the user interface in FIG. 4D) of the process for generating the media item, and continue affordance 432, which, when activated (e.g., by a touch input from the user), causes client device 104 to display the next user interface (e.g., the user interface in FIG. 4D) of the process for generating the media item. FIG. 4B further illustrates detecting a left-to-right dragging gesture with contact 438 on touch screen 406 originating at a location corresponding to end indicator 434.

Figure 4C:
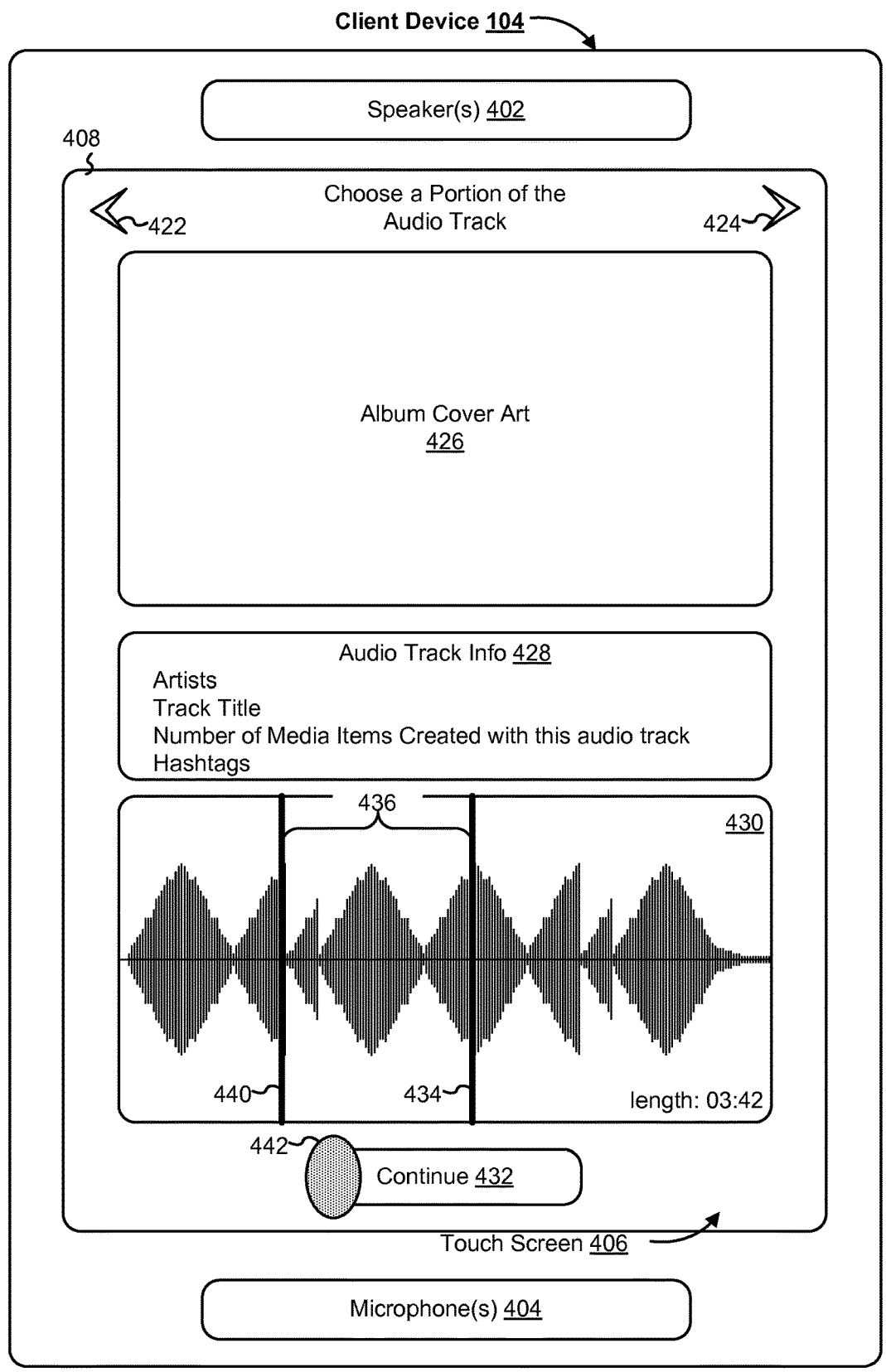

FIG. 4C illustrates moving end indicator 434 left-to-right and displaying start indicator 440 in response to the detecting the dragging gesture in FIG. 4B. For example, selected portion 436 remains a 30 second interval of the audio track between end indicator 434 and start indicator 440. FIG. 4C also illustrates detecting contact 442 (e.g., a tap gesture) on touch screen 406 at a location corresponding to continue affordance 432.

Figure 4D:
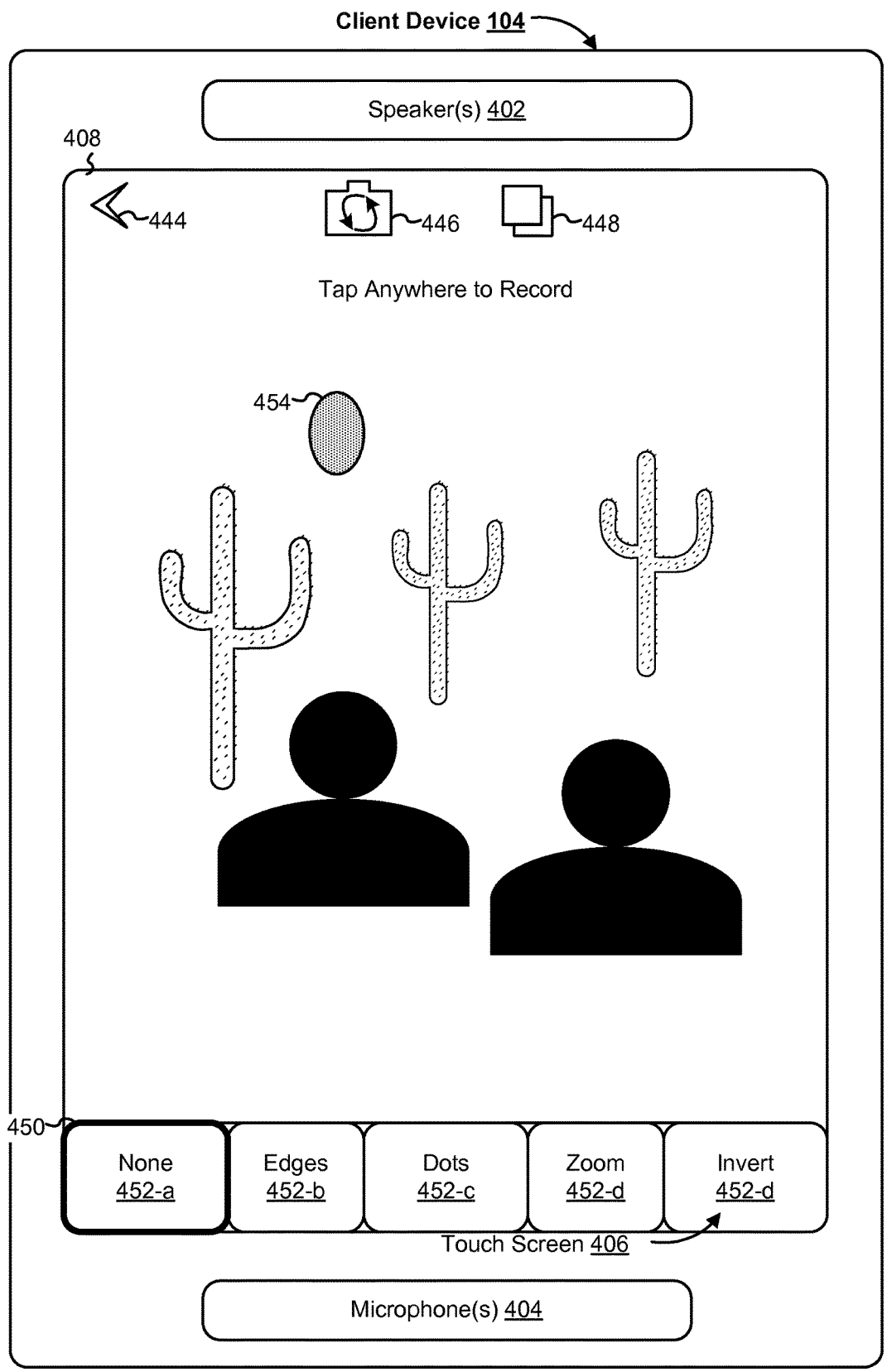

FIG. 4D illustrates client device 104 displaying a live feed from a back-facing camera of client device 104 in response to detecting contact 442 selecting continue affordance 432 in FIG. 4C. In FIG. 4D, the user interface prompts the user of client device 104 to record a video clip for the media item by tapping anywhere on touch screen 406. In FIG. 4D, the user interface includes back navigation affordance 444, which, when activated (e.g., by a touch input from the user), causes client device 104 to display the previous user interface (e.g., the user interface in FIG. 4C). In FIG. 4D, the user interface also includes affordance 446, which, when activated (e.g., by a touch input from the user), causes client device 104 to display a live feed from a front-facing camera of client device 104, and affordance 448, which, when activated (e.g., by a touch input from the user), causes client device 104 to display a first pre-existing media content selection panel (e.g., panel 466 in FIG. 4G). In FIG. 4D, the user interface further includes effects region 450 with a plurality of audio and/or video effect affordances 452 corresponding to audio and/or video effects. In FIG. 4D, the thick frame surrounding effect affordance 452-a indicates that the effect corresponding to effect affordance 452-a (i.e., no effect) is being applied to the video feed displayed on touch screen 406. FIG. 4D also illustrates detecting contact 454 at a location on touch screen 406.

Figure 4E:
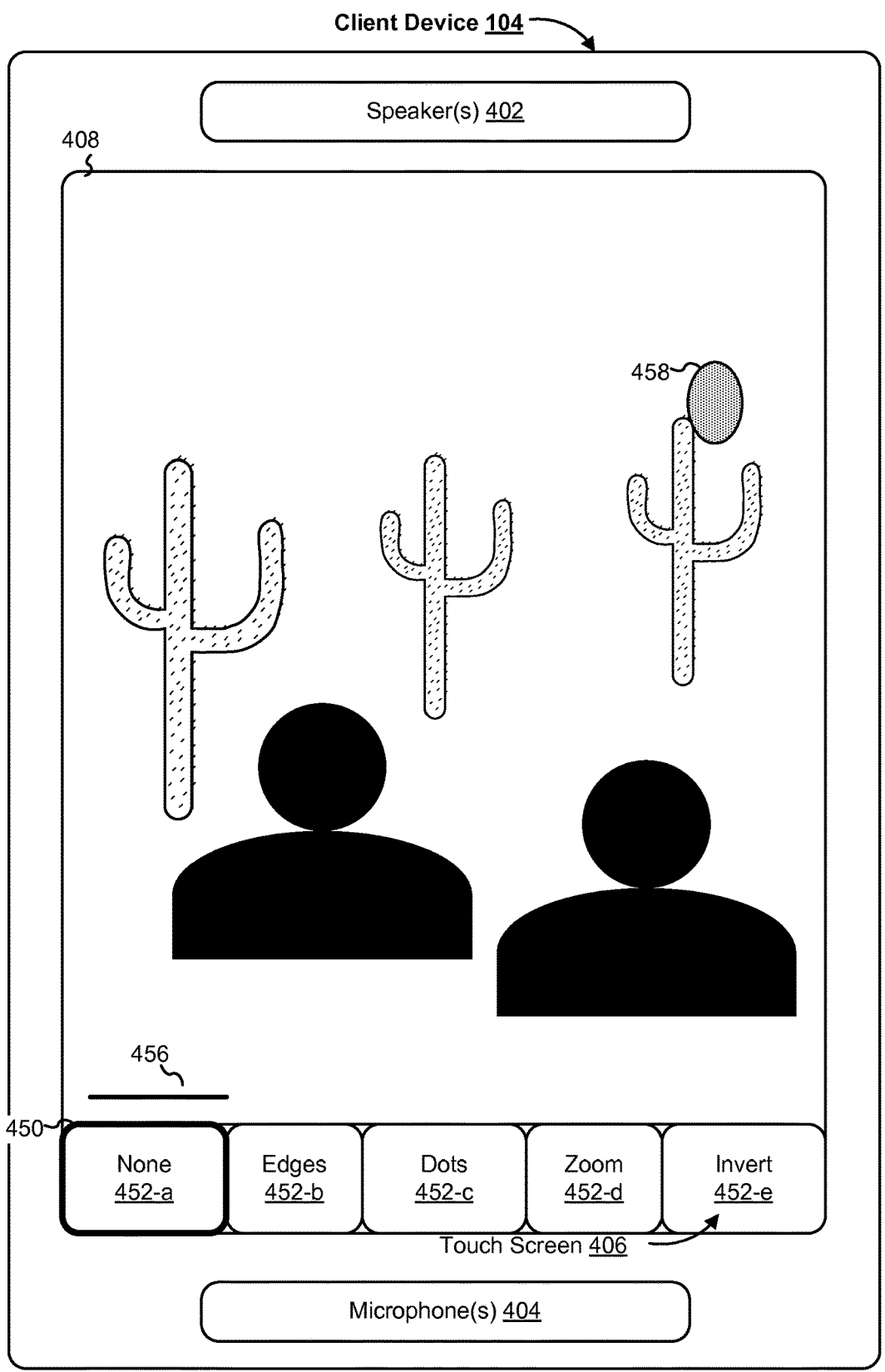

FIG. 4E illustrates client device 104 recording a video clip in response to detecting contact 454 in FIG. 4D. In FIG. 4E, the user interface includes progress indicator 456 for the video clip being recorded. FIG. 4E also illustrates detecting contact 458 at a location on touch screen 406.

Figure 4F:
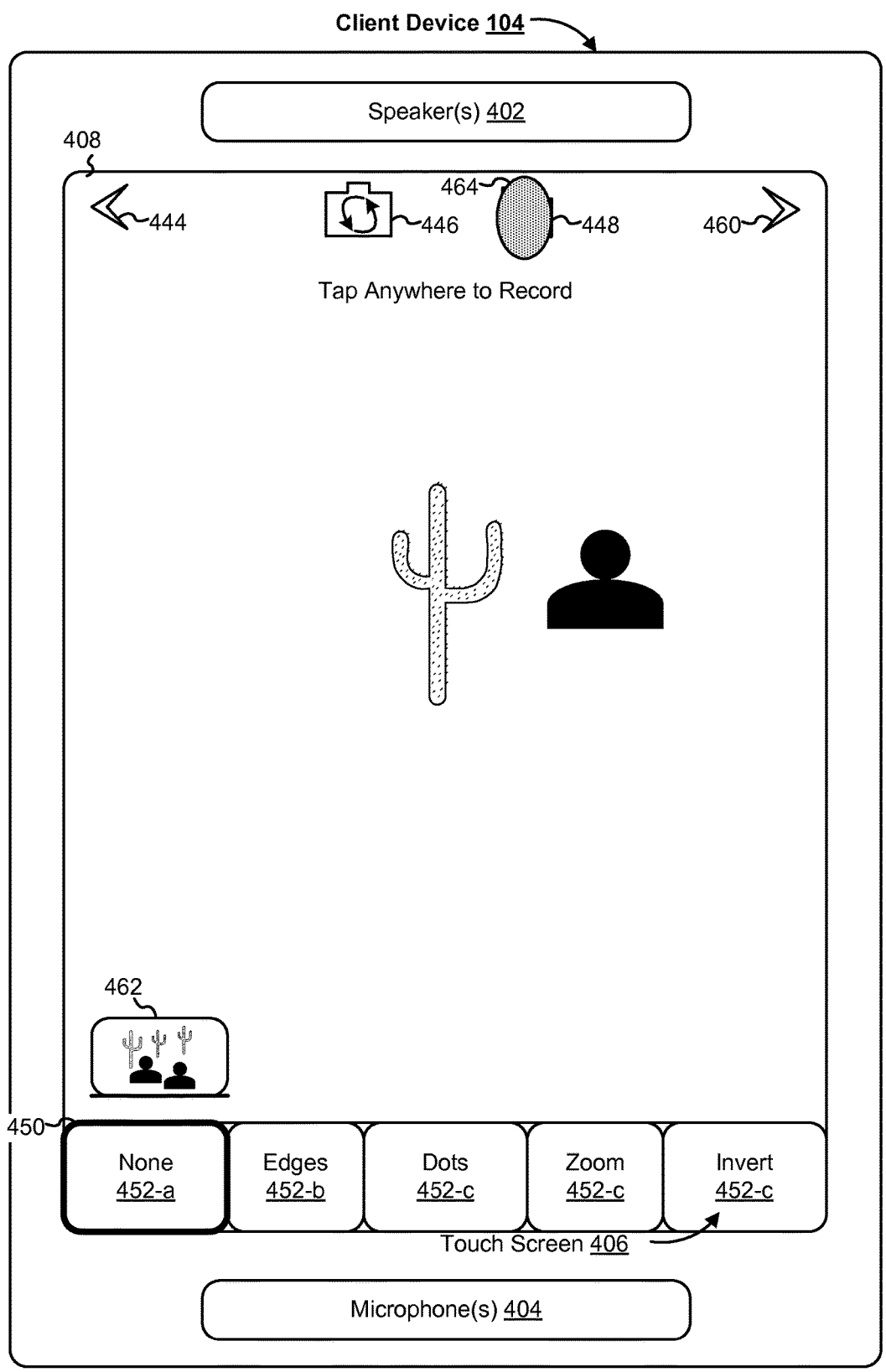

FIG. 4F illustrates client device 104 displaying a live feed from the back-facing camera of client device 104 on touch screen 406 in response to detecting contact 458 in FIG. 4E. In FIG. 4F, the user interface prompts the user of client device 104 to record a video clip for the media item by tapping anywhere on touch screen 406. In FIG. 4F, the user interface also includes forward navigation affordance 460, which, when activated (e.g., by a touch input from the user), causes client device 104 to display the next user interface (e.g., the user interface in FIG. 4V) of the process for generating the media item. In FIG. 4F, the user interface further includes representation 462 of the video clip recorded in FIGS. 4D-4E. FIG. 4F also illustrates detecting contact 464 on touch screen 406 at a location corresponding to affordance 448.

Figure 4G:
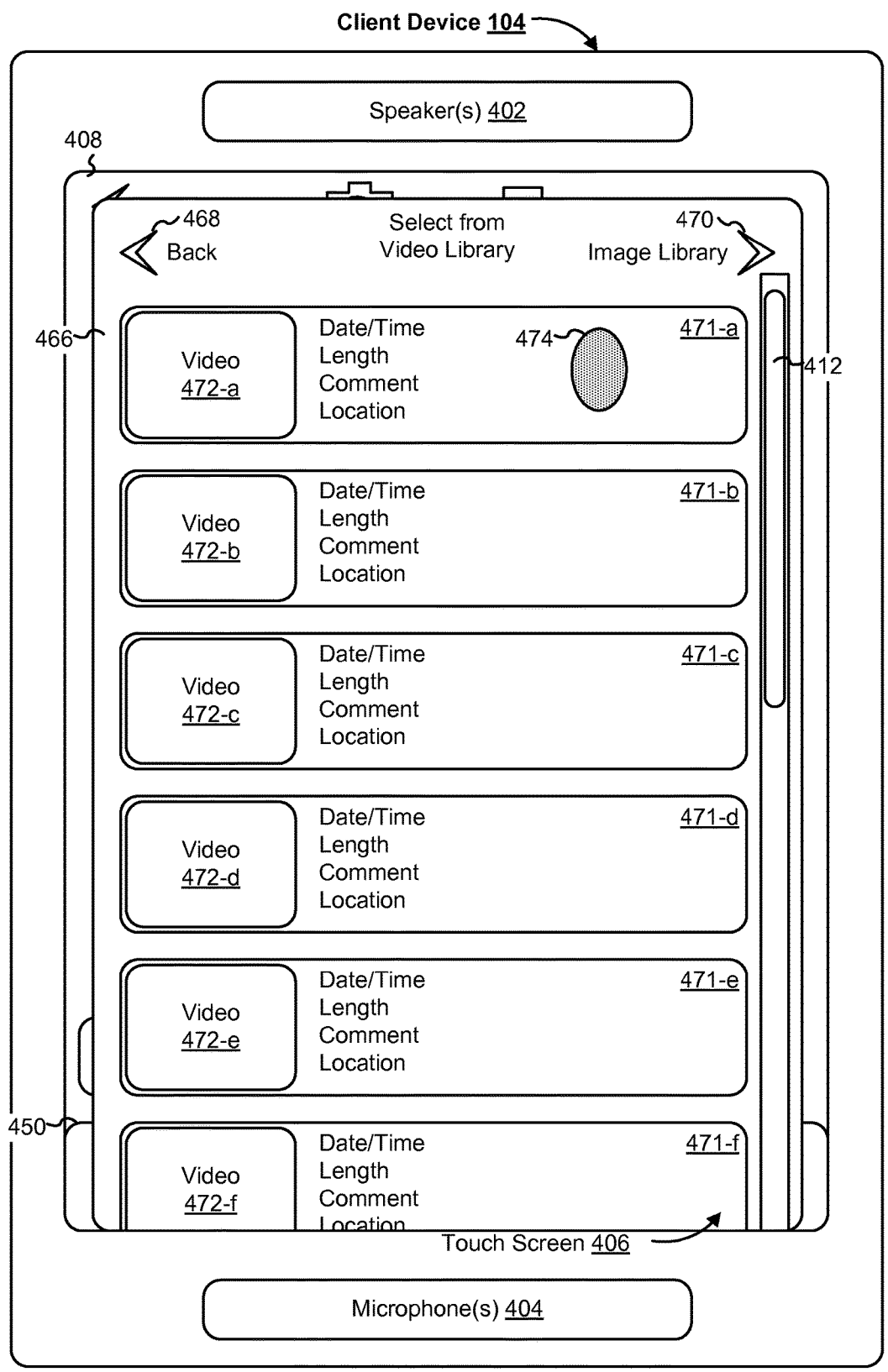

FIG. 4G illustrates client device 104 displaying first pre-existing media content selection panel 466 in response to detecting contact 464 selecting affordance 448 in FIG. 4F. In FIG. 4G, first pre-existing media content selection panel 466 includes a plurality of video regions 471. In FIG. 4G, each of video regions 471 is associated with a pre-recorded video 472 from a video library associated with the user of client device 104 and includes the recording date/time, length, comments, and location for the associated pre-recorded video 472. In FIG. 4G, first pre-existing media content selection panel 466 also includes back navigation affordance 468, which, when activated (e.g., by a touch input from the user), causes client device 104 to display the previous user interface (e.g., the user interface in FIG. 4F) and image library affordance 470, which, when activated (e.g., by a touch input from the user) causes client device 104 to display a second content selection panel including one or more pre-captured images in an image library associated with the user of client device 104. In FIG. 4G, first pre-existing media content selection panel 466 further includes scroll bar 412 indicating that the balance of the pre-recorded videos in the video library can be viewed by scrolling downwards. FIG. 4G also illustrates detecting contact 474 on touch screen 406 at a location corresponding to video region 471-a associated with pre-recorded video 472-a.

Figure 4H:
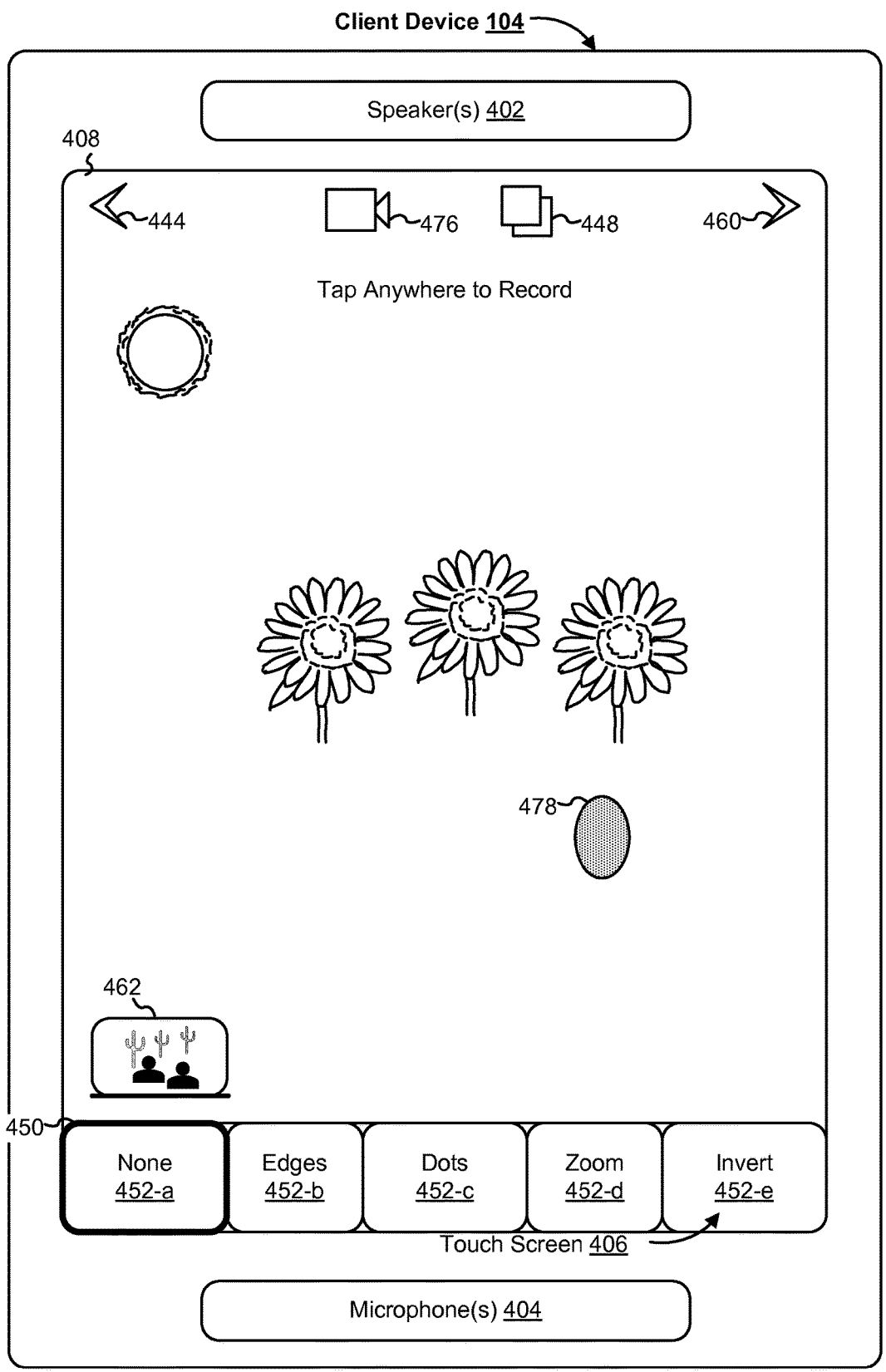

FIG. 4H illustrates client device 104 displaying pre-recorded video 472-a as a live feed on touch screen 406 in response to detecting contact 474 selecting video region 471-a in FIG. 4G. In FIG. 4H, the user interface prompts the user of client device 104 to record a video clip for the media item by tapping anywhere on touch screen 406. In FIG. 4H, the user interface includes affordance 476, which, when activated (e.g., by a touch input from the user), causes client device 104 to display the live feed from the back-facing camera of client device 104 on touch screen 406 (e.g., the user interface in FIG. 4D). FIG. 4H also illustrates detecting contact 478 at a location on touch screen 406.

Figure 4I:
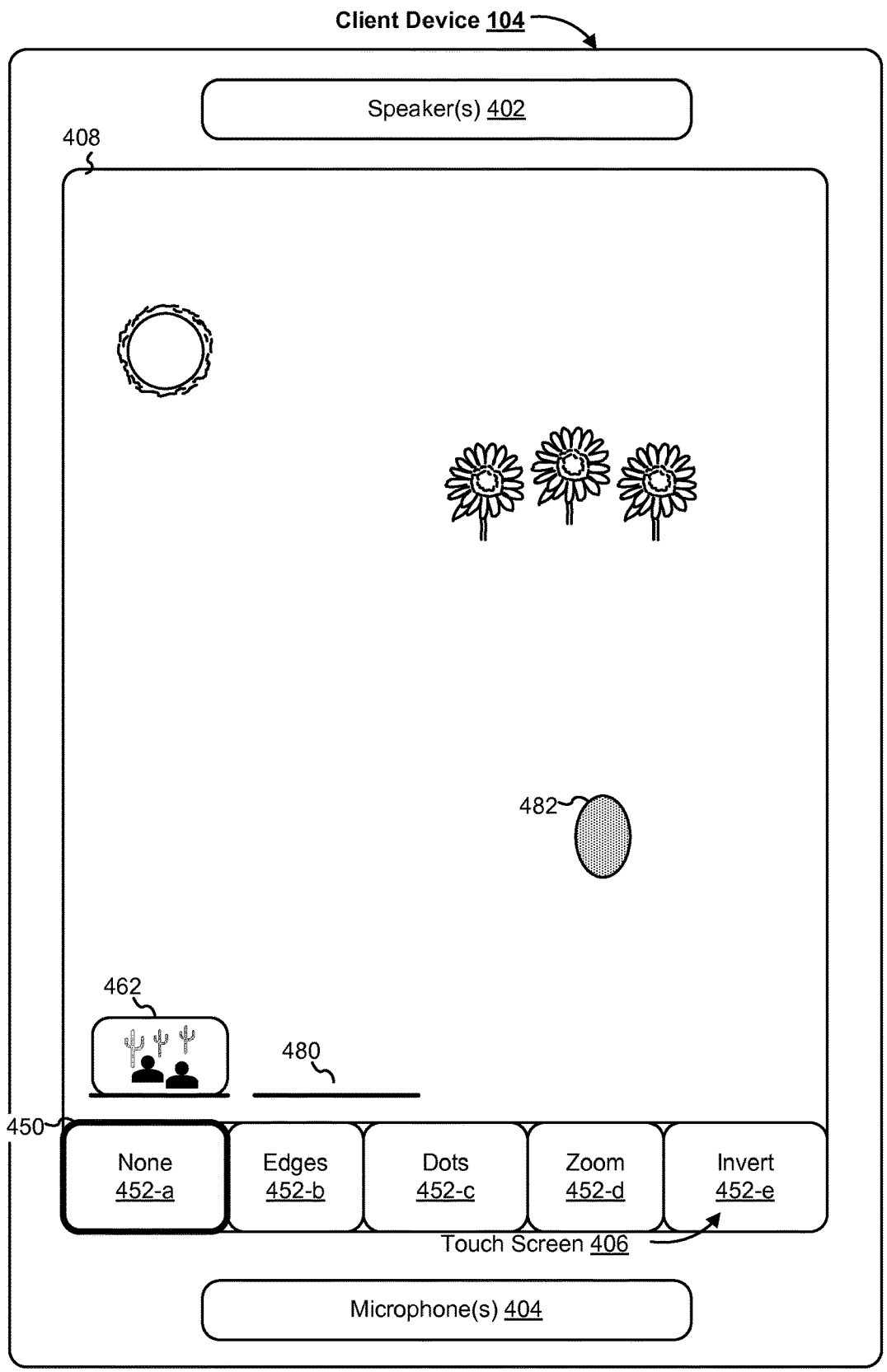

FIG. 4I illustrates client device 104 recording a second video clip from pre-recorded video 472-a in response to detecting contact 478 in FIG. 4H. In FIG. 4I, the user interface includes progress indicator 480 for the second video clip being recorded. FIG. 4I also illustrates detecting contact 482 at a location on touch screen 406.

Figure 4J:
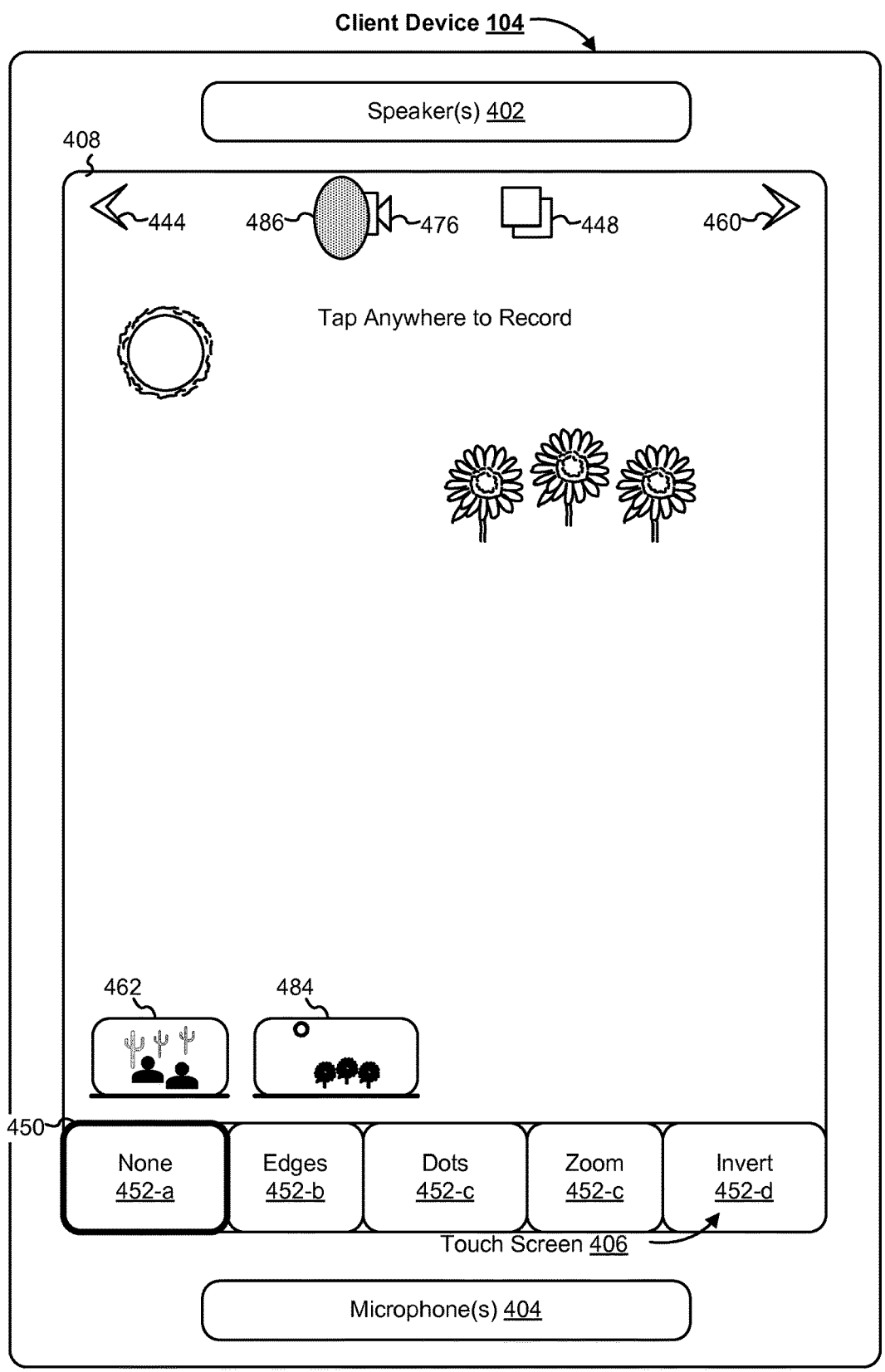

FIG. 4J illustrates client device 104 displaying pre-recorded video 472-a as a live feed on touch screen 406 in response to detecting contact 482 in FIG. 4I. In FIG. 4J, the user interface prompts the user of client device 104 to record a video clip for the media item by tapping anywhere on touch screen 406. In FIG. 4J, the user interface also includes representation 484 of the second video clip recorded in FIGS. 4H-4I. FIG. 4F also illustrates detecting contact 486 on touch screen 406 at a location corresponding to affordance 476.

Figure 4K:
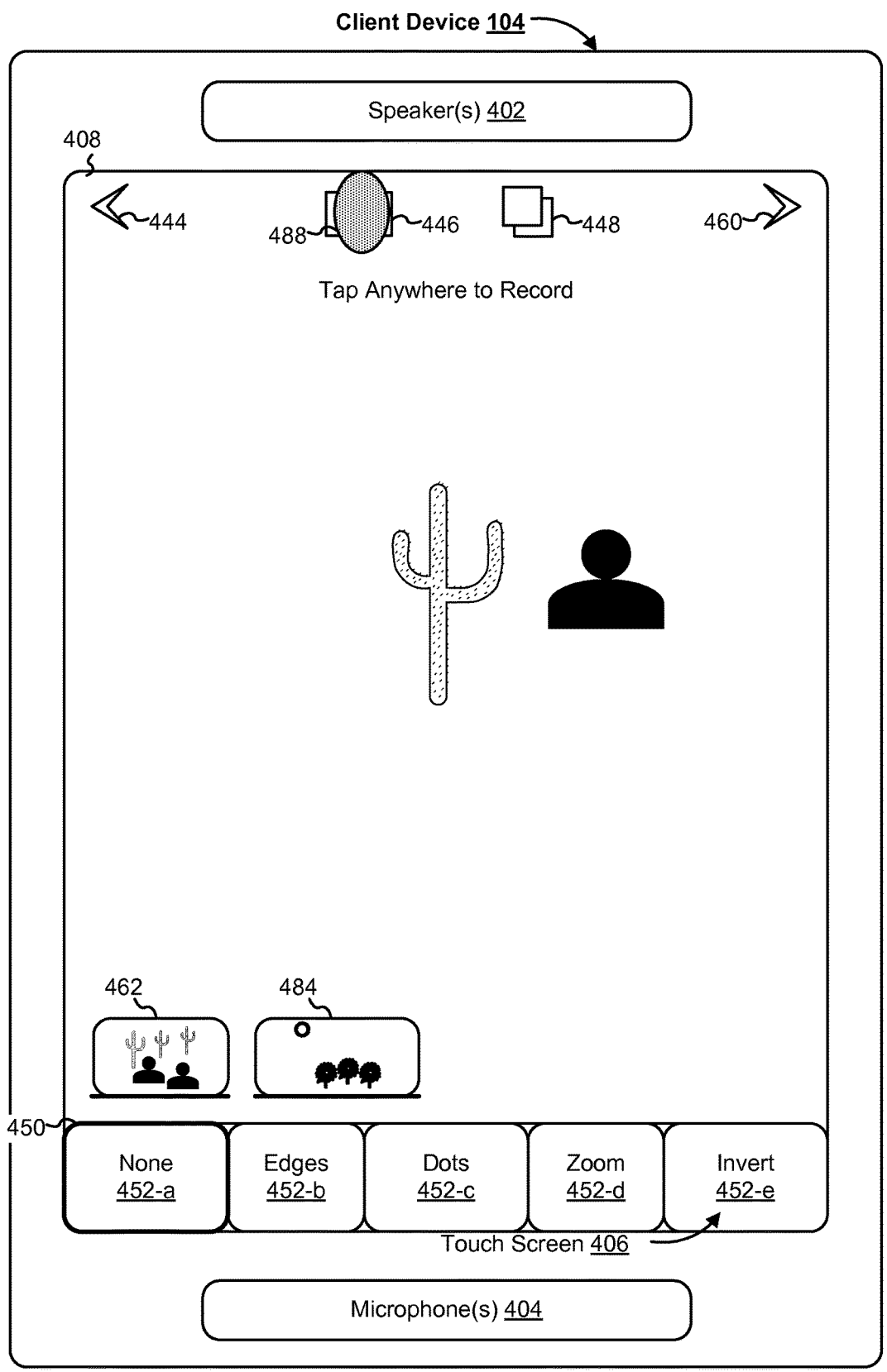

FIG. 4K illustrates client device 104 displaying a live feed from the back-facing camera of client device 104 on touch screen 406 in response to detecting contact 486 selecting affordance 476 in FIG. 4J. In FIG. 4K, the user interface prompts the user of client device 104 to record a video clip for the media item by tapping anywhere on touch screen 406. FIG. 4K also illustrates detecting contact 488 on touch screen 406 at a location corresponding to affordance 446.

Figure 4L:
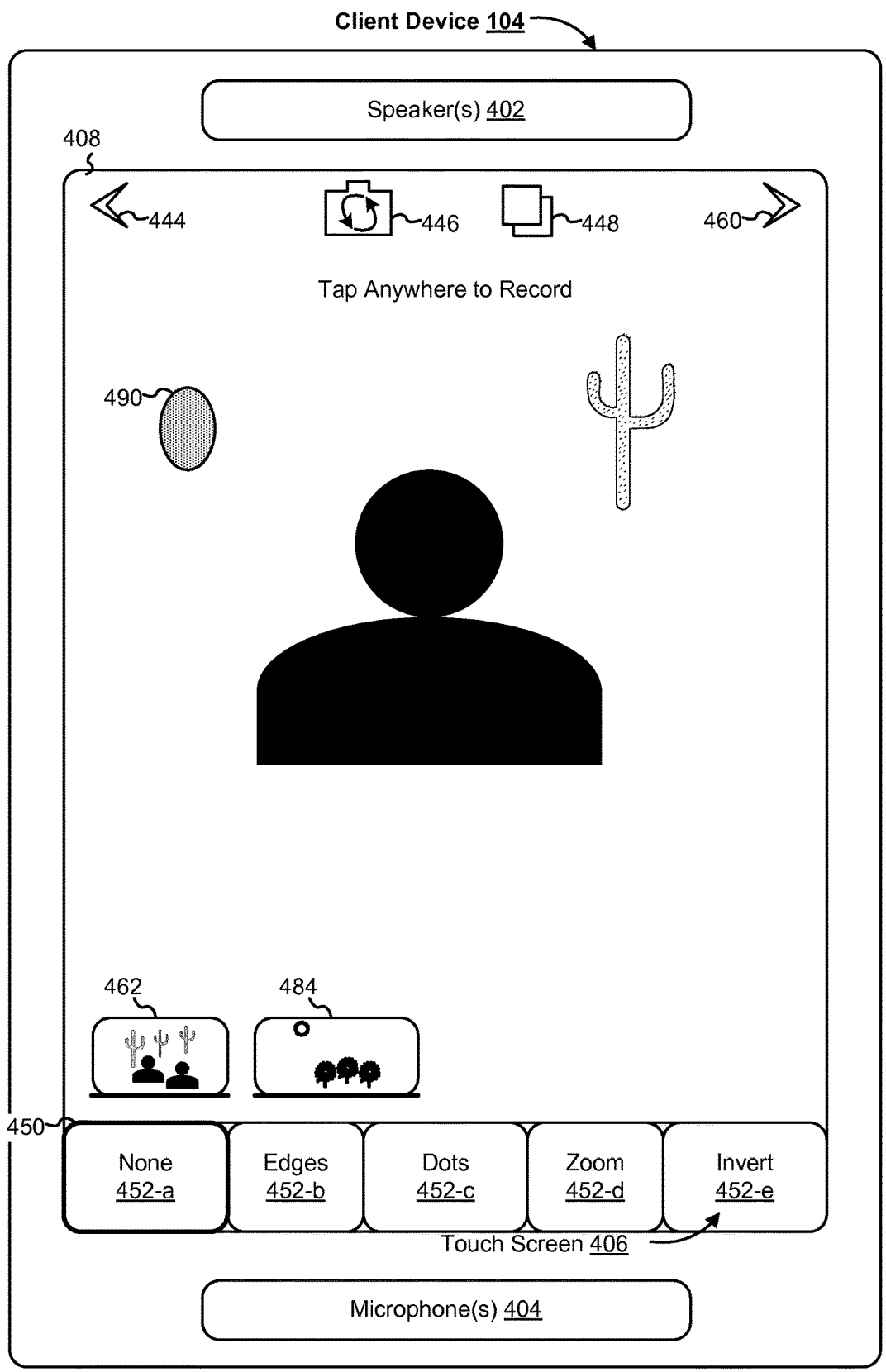

FIG. 4L illustrates client device 104 displaying a live feed from the front-facing camera of client device 104 on touch screen 406 in response to detecting contact 488 selecting affordance 446 in FIG. 4K. In FIG. 4J, the user interface prompts the user of client device 104 to record a video clip for the media item by tapping anywhere on touch screen 406. FIG. 4L also illustrates detecting contact 490 at a location on touch screen 406.

Figure 4M:
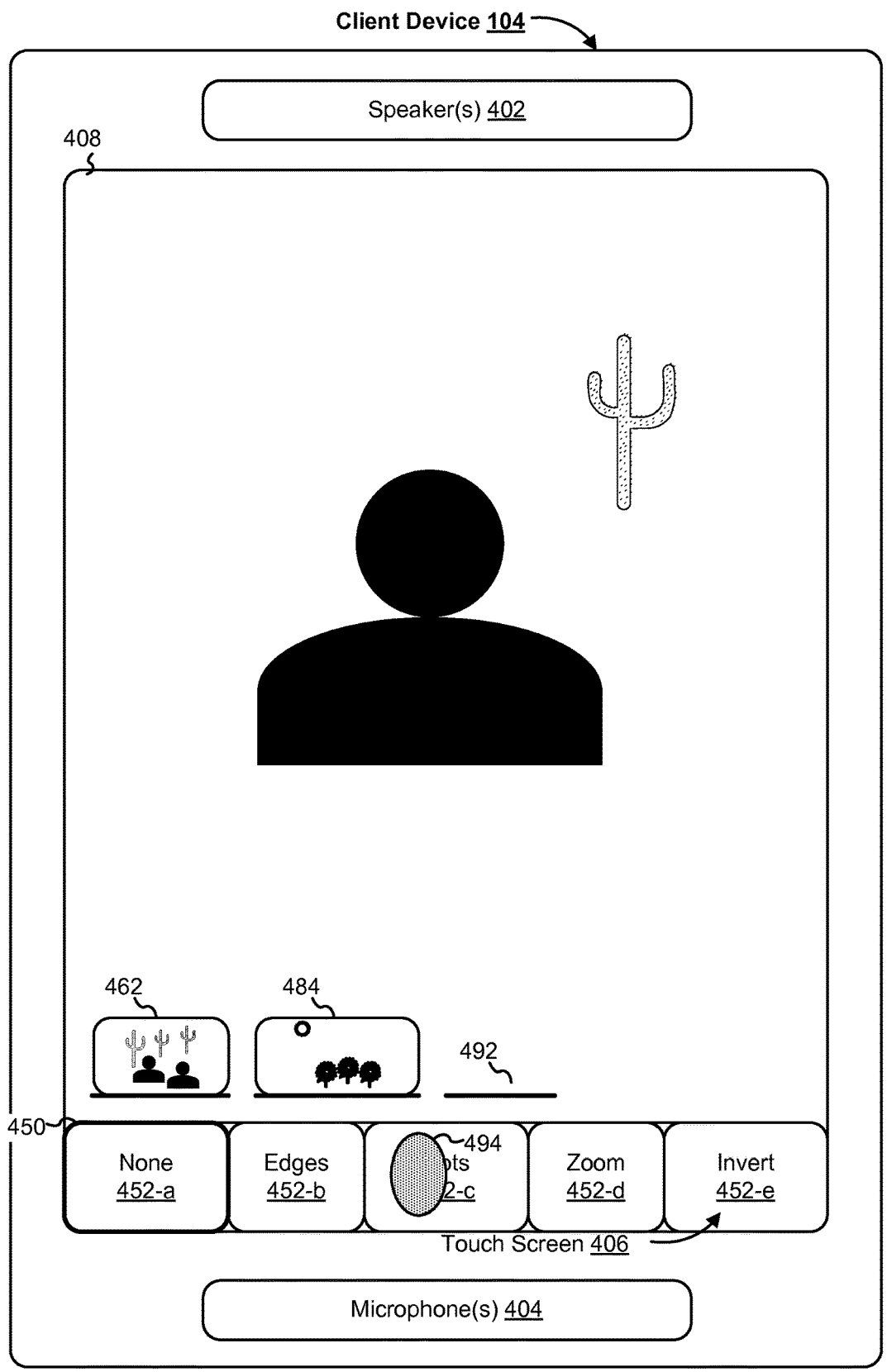

FIG. 4M illustrates client device 104 recording a third video clip in response to detecting contact 490 in FIG. 4L. In FIG. 4M, the user interface includes progress indicator 492 for the third video clip being recorded. FIG. 4M also illustrates detecting contact 494 on touch screen 406 at a location corresponding to effect affordance 452-c.

Figure 4N:
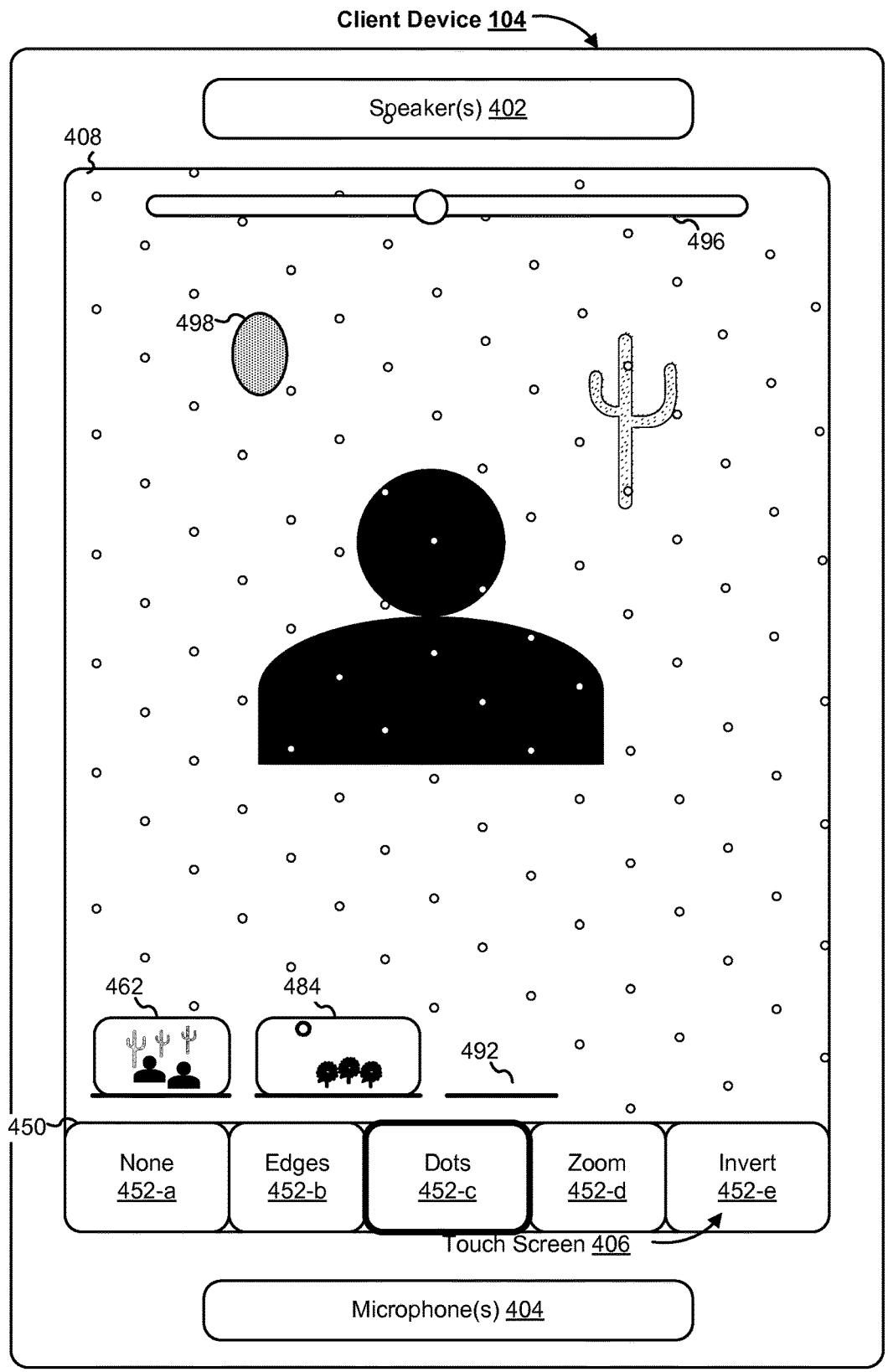

FIG. 4N illustrates client device 104 applying in real-time a dots video effect corresponding to effect affordance 452-c to the third video clip being recorded in response to detecting contact 494 selecting effect affordance 452-c in FIG. 4M. In FIG. 4N, the user interface includes effect modifier 496 for modifying the dots video effect in real-time. For example, effect modifier 496 is a slider that increases the density of dots when slid left-to-right and decreases the density of dots when slid right-to-left. FIG. 4N also illustrates detecting contact 498 at a location on touch screen 406.

Figure 4O:
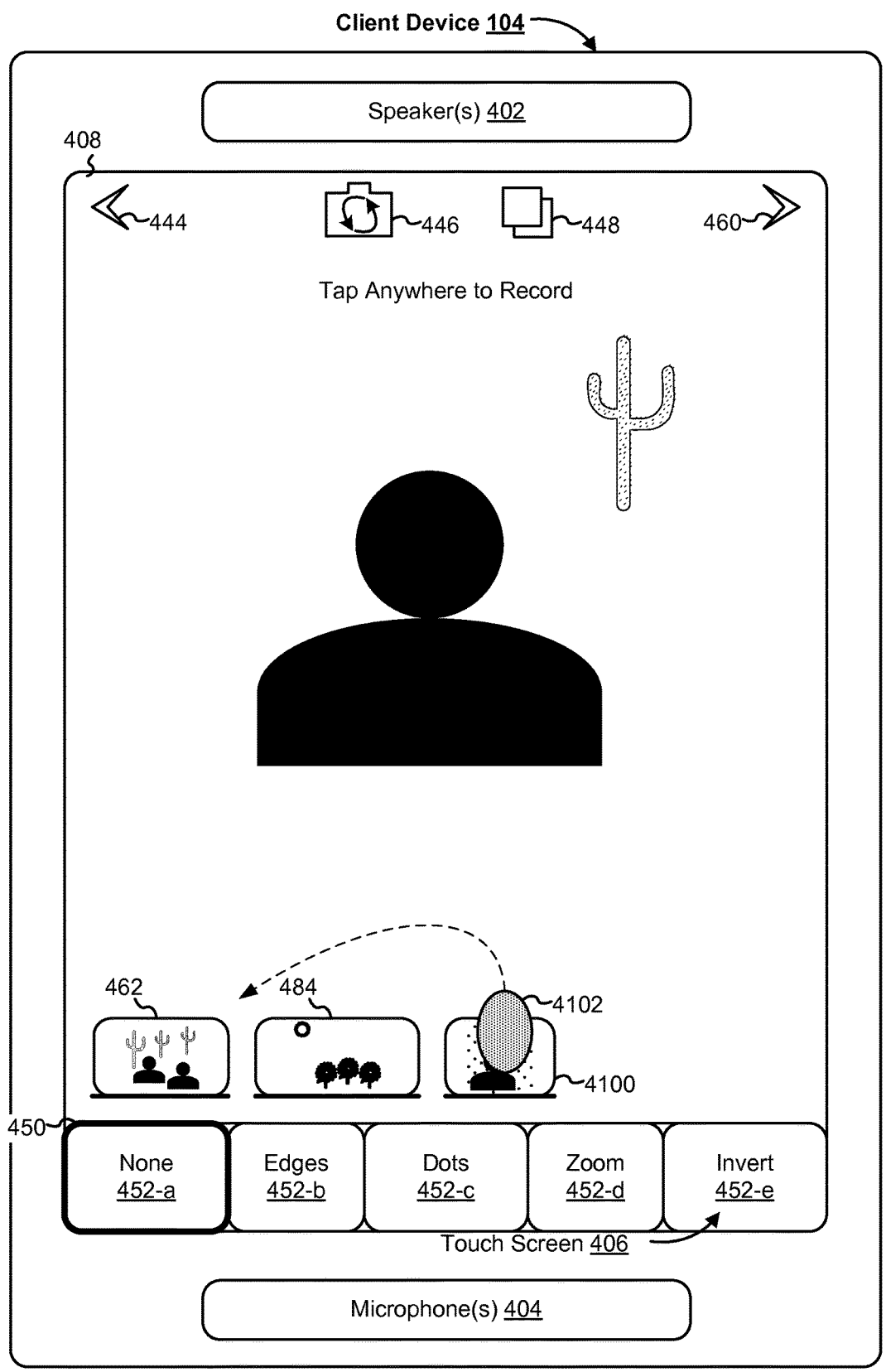

FIG. 4O illustrates client device 104 displaying a live feed from the front-facing camera of client device 104 on touch screen 406 in response to detecting contact 498 in FIG. 4N. In FIG. 4O, the user interface prompts the user of client device 104 to record a video clip for the media item by tapping anywhere on touch screen 406. In FIG. 4O, the user interface also includes representation 4100 of the third video clip recorded in FIGS. 4L-4N in a third position in the sequence of representations.

Figure 4P:
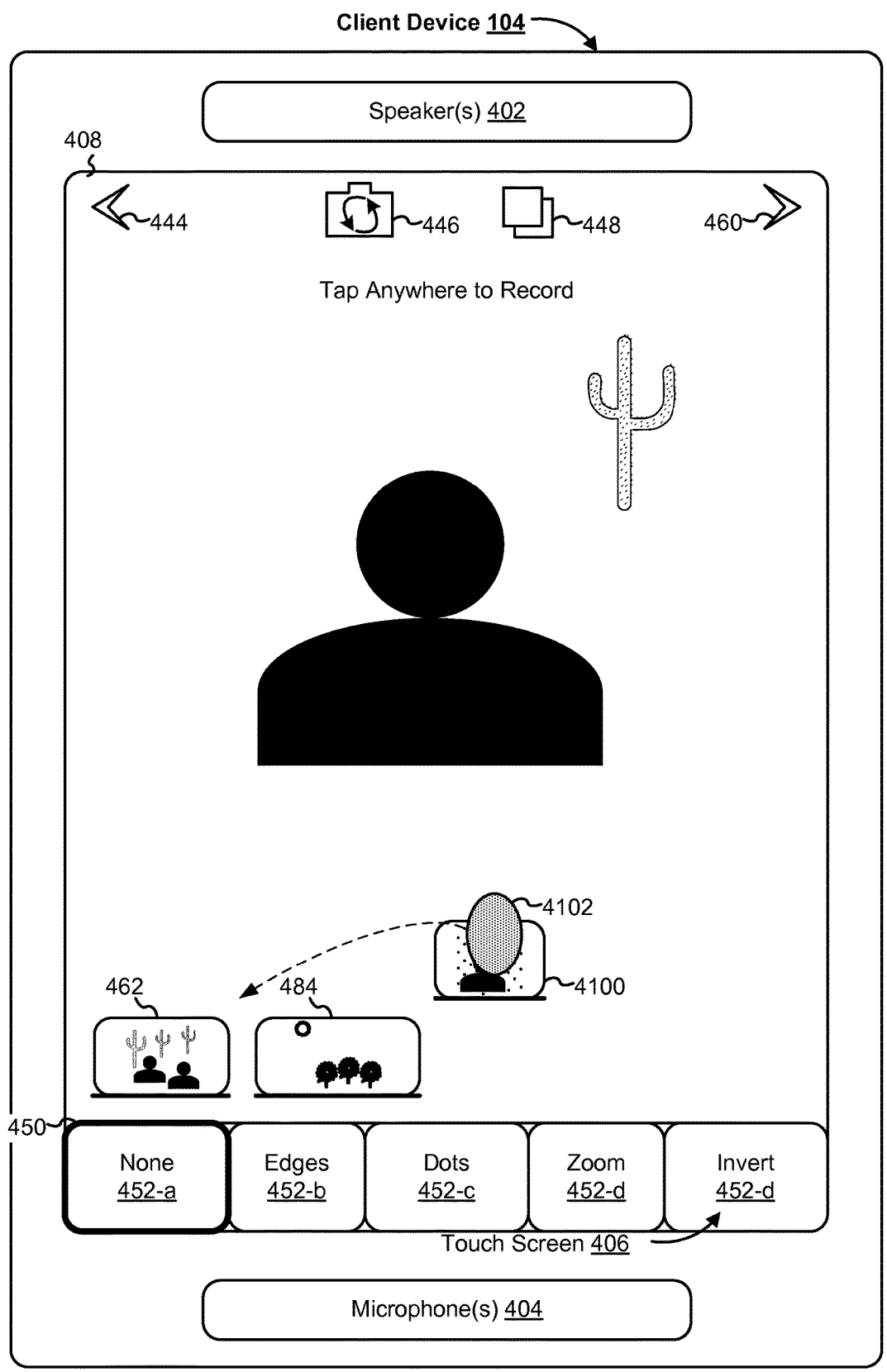

FIGS. 4O-4P illustrate client device 104 detecting a dragging gesture with contact 4102 on touch screen 406 originating at a location corresponding to representation 4100. FIGS. 4O-4P also illustrate moving representation 4100 of the third video clip away from the third position in the sequence of representations.

Figure 4Q:
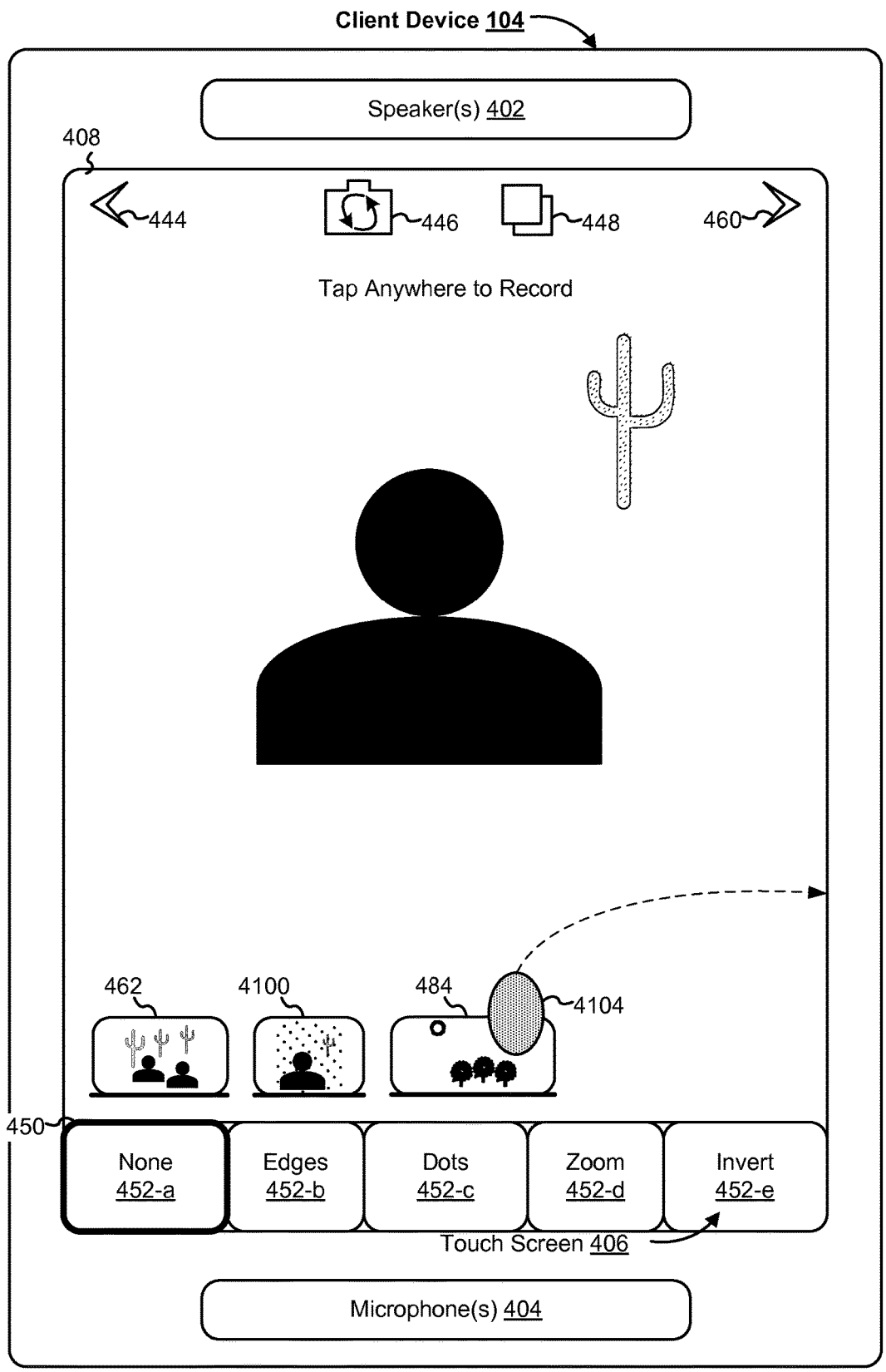

FIG. 4Q illustrates representation 4100 of the third video clip in a second position in the sequence of representations and representation 484 of the second video clip in the third position in the sequences of representations in response to detecting the dragging gesture in FIGS. 4O-4P.

Figure 4R:
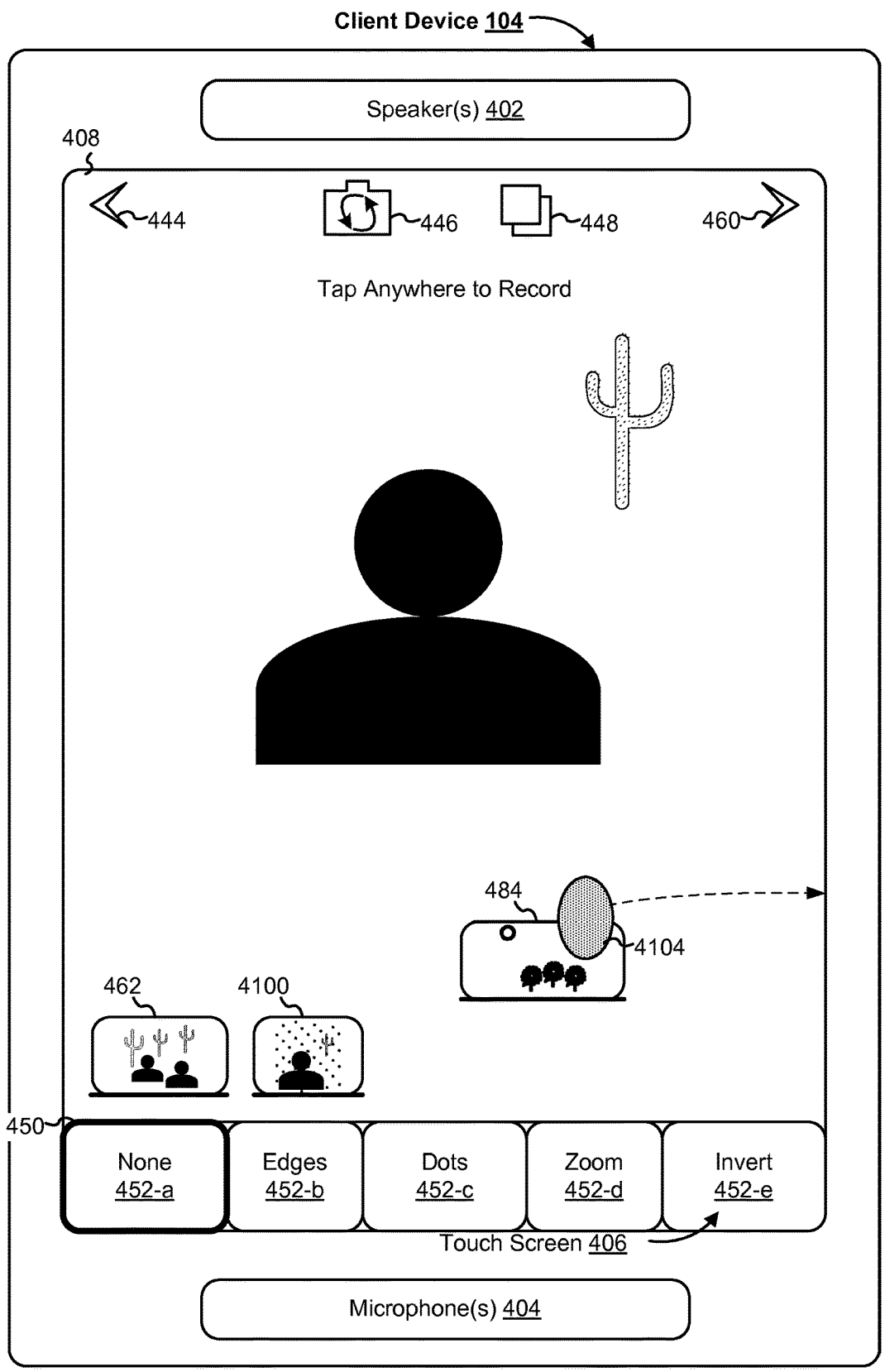

FIGS. 4Q-4R illustrate client device 104 detecting a dragging gesture with contact 4104 on touch screen 406 originating at a location corresponding to representation 484. FIGS. 4Q-4R also illustrate moving representation 484 of the second video clip from a third position in the sequence of representations to the right edge of touch screen 406.

Figure 4S:
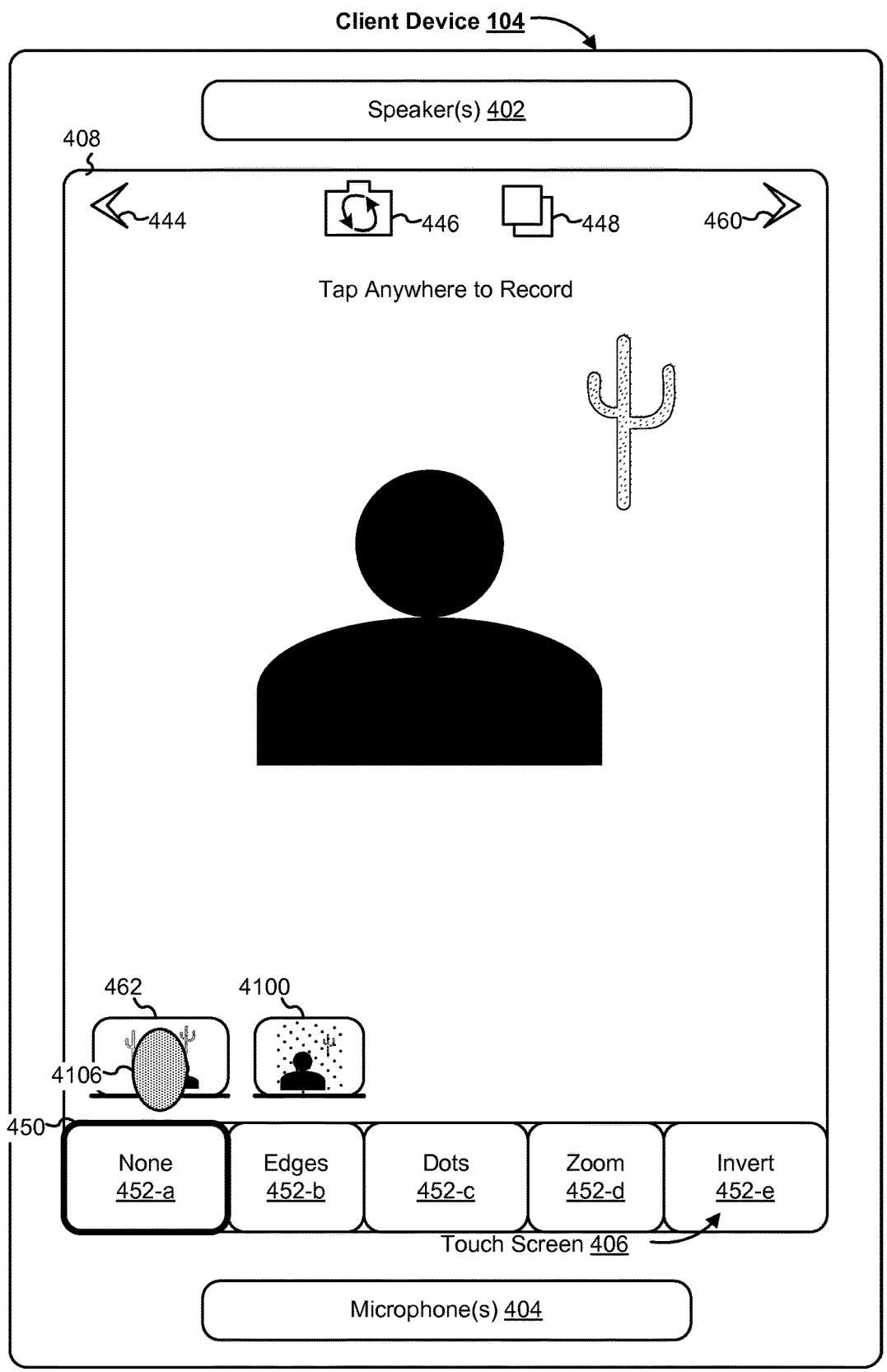

FIG. 4S illustrates representation 462 of the first video clip in a first position and representation 4100 of the third video clip in a second position in the sequence of representations. In FIG. 4S, representation 484 of the second video clip has been deleted in response to detecting the dragging gesture in FIGS. 4Q-4R. FIG. 4S also illustrates client device 104 detecting contact 4106 (e.g., a long press gesture) on touch screen 406 at a location corresponding to representation 462.

Figure 4T:
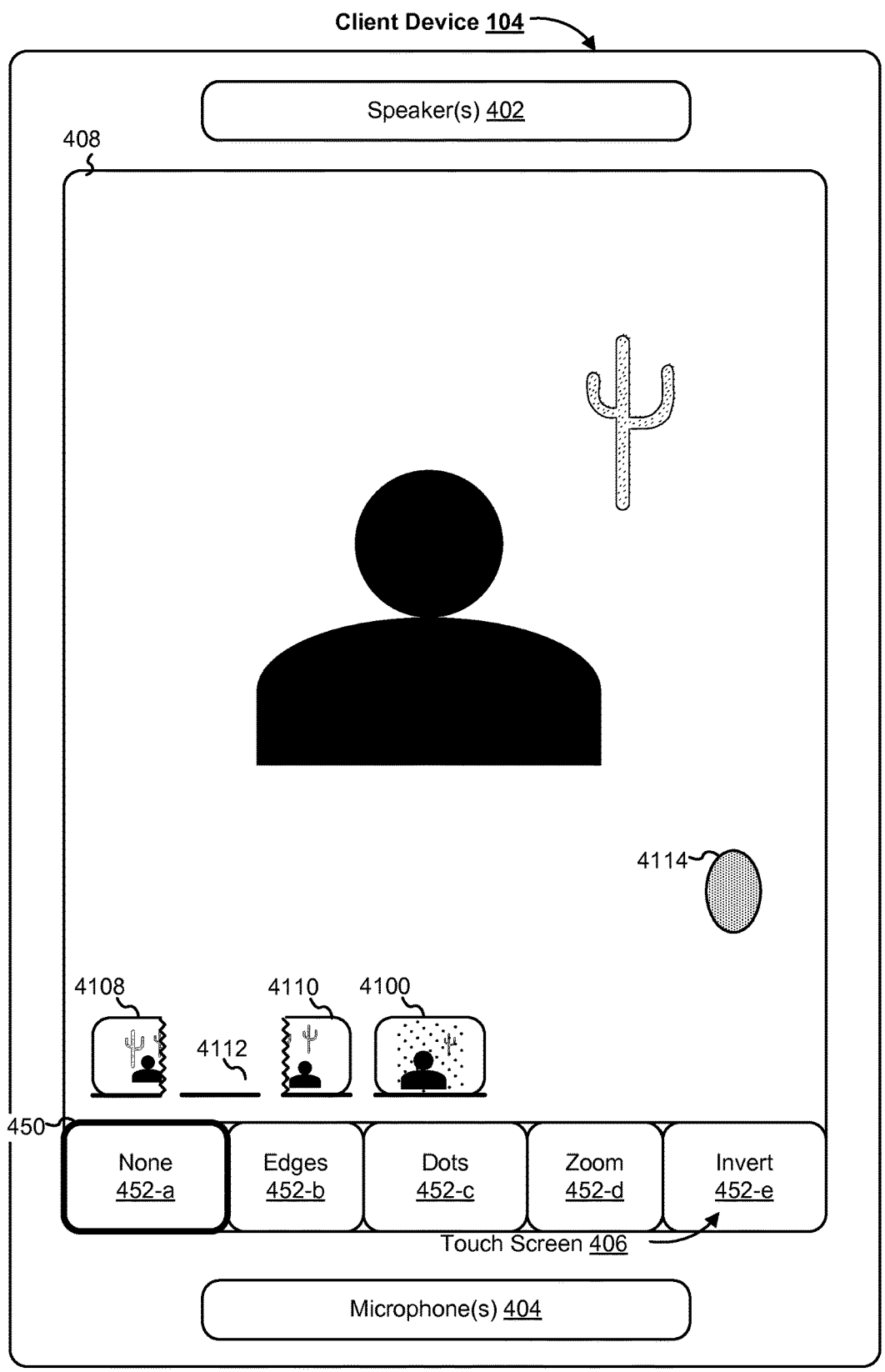

FIG. 4T illustrates splitting the first video clip corresponding to representation 462 into two separate video clips corresponding to representations 4108 and 4110 in response to detecting contact 4106 in FIG. 4S. FIG. 4T also illustrates client device 104 recording a fourth video clip in response to detecting contact 4106 in FIG. 4S. In FIG. 4T, the user interface includes progress indicator 4112 for the fourth video clip being recorded at a position between representations 4108 and 4110. FIG. 4T further illustrates detecting contact 4114 at a location on touch screen 406.

Figure 4U:
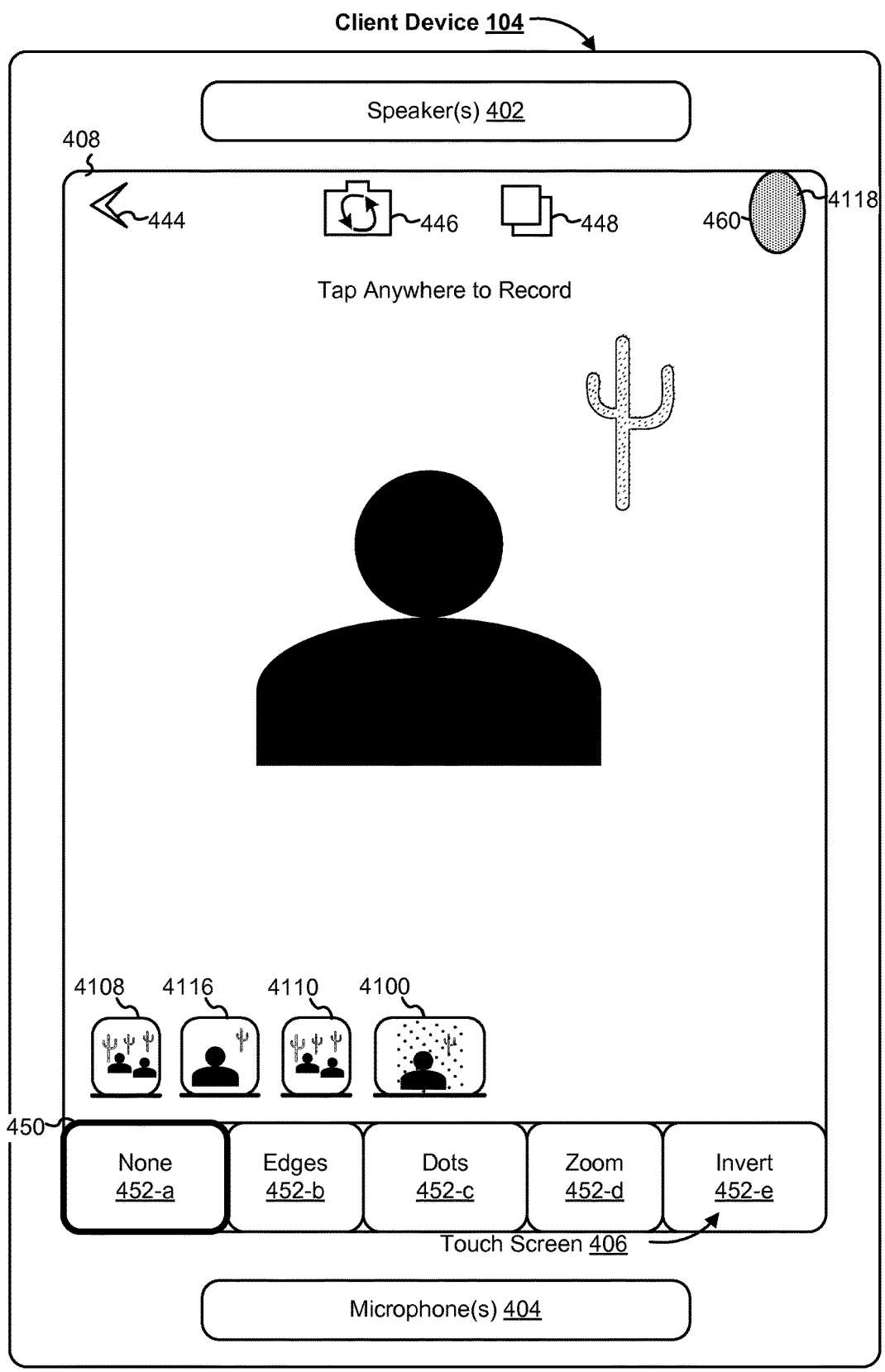

FIG. 4U illustrates client device 104 displaying a live feed from the front-facing camera of client device 104 on touch screen 406 in response to detecting contact 4114 in FIG. 4T. In FIG. 4U, the user interface prompts the user of client device 104 to record a video clip for the media item by tapping anywhere on touch screen 406. In FIG. 4U, the user interface also includes representation 4116 of the fourth video clip recorded in FIGS. 4S-4T in a second position in the sequence of representations. FIG. 4U also illustrates client device 104 detecting contact 4118 on touch screen 406 at a location corresponding to forward navigation affordance 460.

Figure 4V:
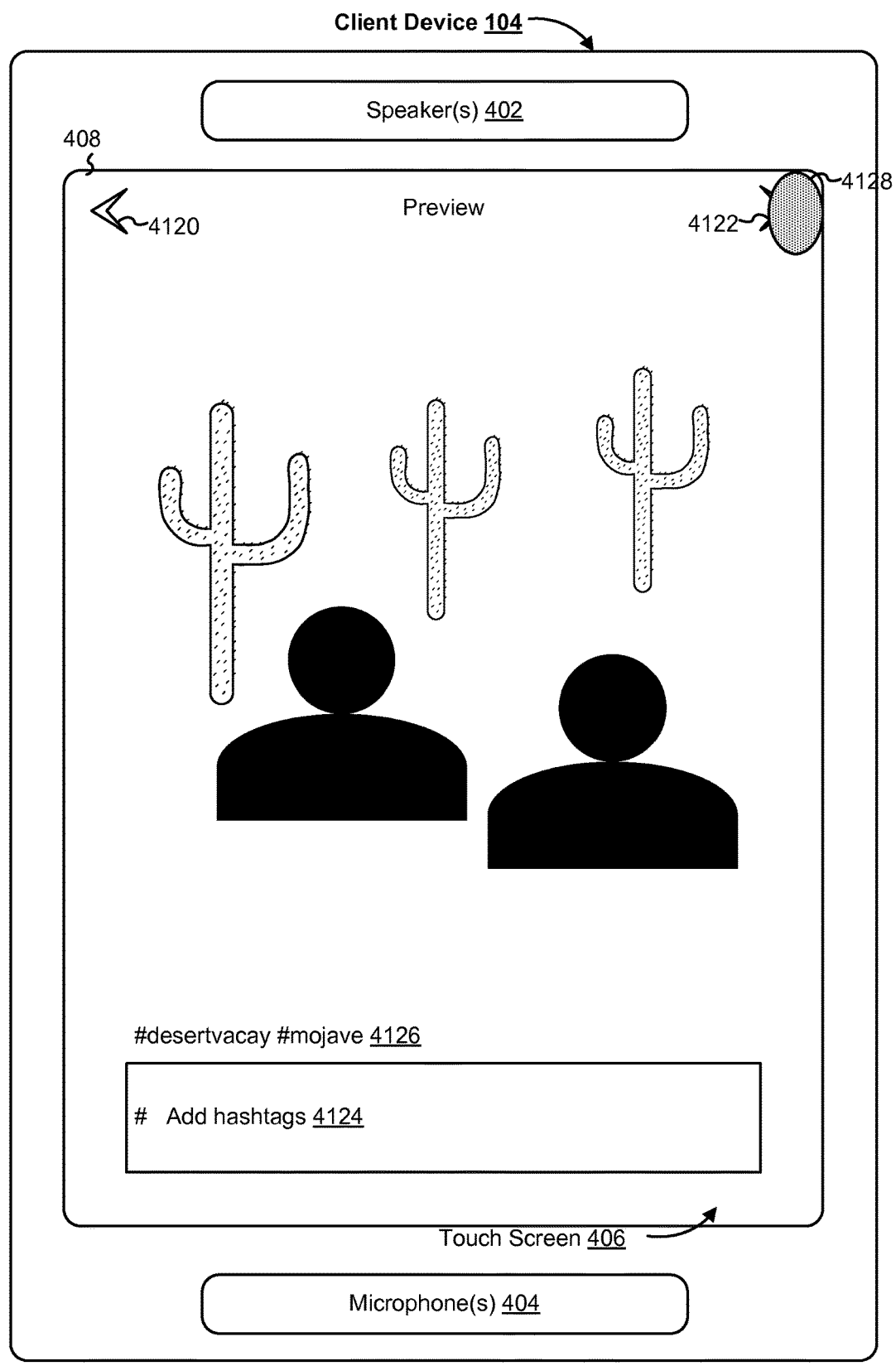

FIG. 4V illustrates client device 104 displaying a preview of the media item generated in FIGS. 4A-4U in response to detecting contact 4118 selecting forward navigation affordance 460 in FIG. 4U. In FIG. 4V, the user interface includes text entry box 4124 for adding a comment or hashtag to the media item and hashtags 4126 entered by the user of client device 104. In FIG. 4V, the user interface also includes back navigation affordance 4120, which, when activated (e.g., by a touch input from the user), causes client device 104 to display a previous user interface (e.g., the user interface in FIG. 4U) and forward navigation affordance 4122, which, when activated (e.g., by a touch input from the user), causes client device 104 to display a next user interface (e.g., the user interface in FIG. 4X). FIG. 4V also illustrates client device 104 detecting contact 4128 on touch screen 406 at a location corresponding to forward navigation affordance 4122.

Figure 4W:
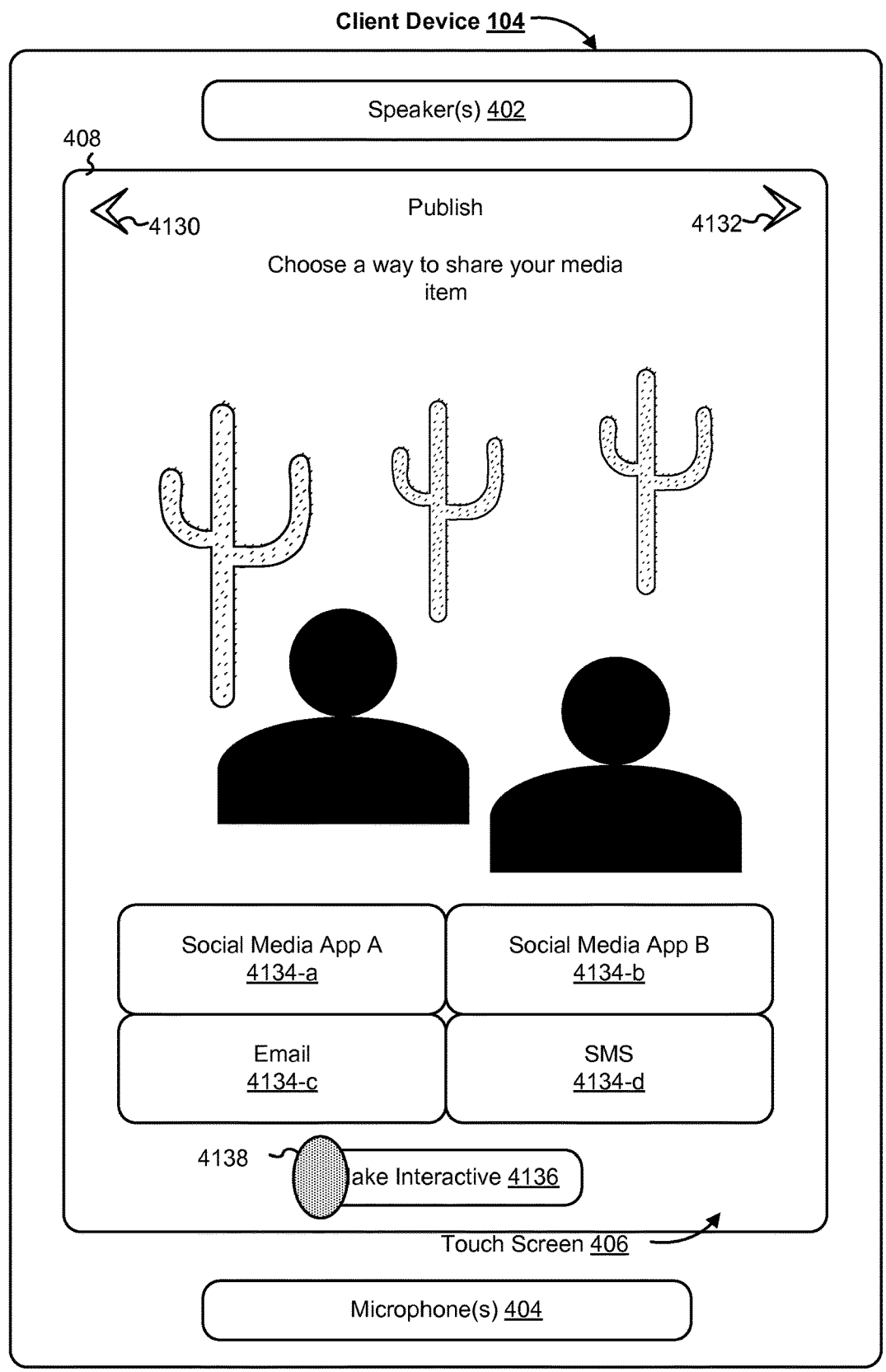

FIG. 4W illustrates client device 104 displaying a publication user interface for the media item generated in FIGS. 4A-4U in response to detecting contact 4128 selecting forward navigation affordance 4122 in FIG. 4V. In FIG. 4W, the user interface prompts the user of client device 104 to choose a method to share the media item generated in FIGS. 4A-4U. In FIG. 4W, the user interface includes a plurality of options 4134 for sharing the media item (e.g., social media application A 4134-a, social media application B 4134-b, email 4134-c, and SMS 4134-d). For example, the application is configured to share the media item by sending a link to the media item via the selected option 4134. In FIG. 4W, the user interface also includes "Make Interactive" affordance 4136, which, when activated (e.g., by a touch input from the user), causes client device 104 to display a user interface (e.g., the user interface in FIG. 4Y) for selecting audio and/or video effects to be applied and manipulated by a subsequent viewer of the media item. In FIG. 4W, the user interface further includes back navigation affordance 4130, which, when activated (e.g., by a touch input from the user), causes client device 104 to display a previous user interface (e.g., the user interface in FIG. 4V) and forward navigation affordance 4132, which, when activated (e.g., by a touch input from the user), causes client device 104 to cause the media item to be published and display a home screen for the application. In some embodiments, when the generated media item is shared via email (e.g., after detecting selection of email sharing option 4134-c), SMS (e.g., after detecting selection of SMS sharing option 4134-d), or the like, the generated media item is sent directly to a recipient via the selected communication method and is not saved by server system 108 or published to the application. FIG. 4W also illustrates client device 104 detecting contact 4138 on touch screen 406 at a location corresponding to "Make Interactive" affordance 4136.

In some embodiments, the plurality of options 4134 for sharing the media item includes other sharing methods (not shown in FIG. 4W) such as private sharing, temporary sharing, and the like. In some embodiments, if a private sharing option is selected, the generated media item is stored by server system 108 but the generated media item is only accessible by users of the application that are specified by the author of the generated media item. In some embodiments, if a temporary sharing option is selected, the generated media item is stored by server system 108 and deleted a predetermined time after the media item is viewed a predetermined number of times (e.g., 1, 100, 1000, etc. views), viewed by a predetermined number or distinct user (e.g., 100 different users of the application), or viewed by a predefined user.

Figure 4X:
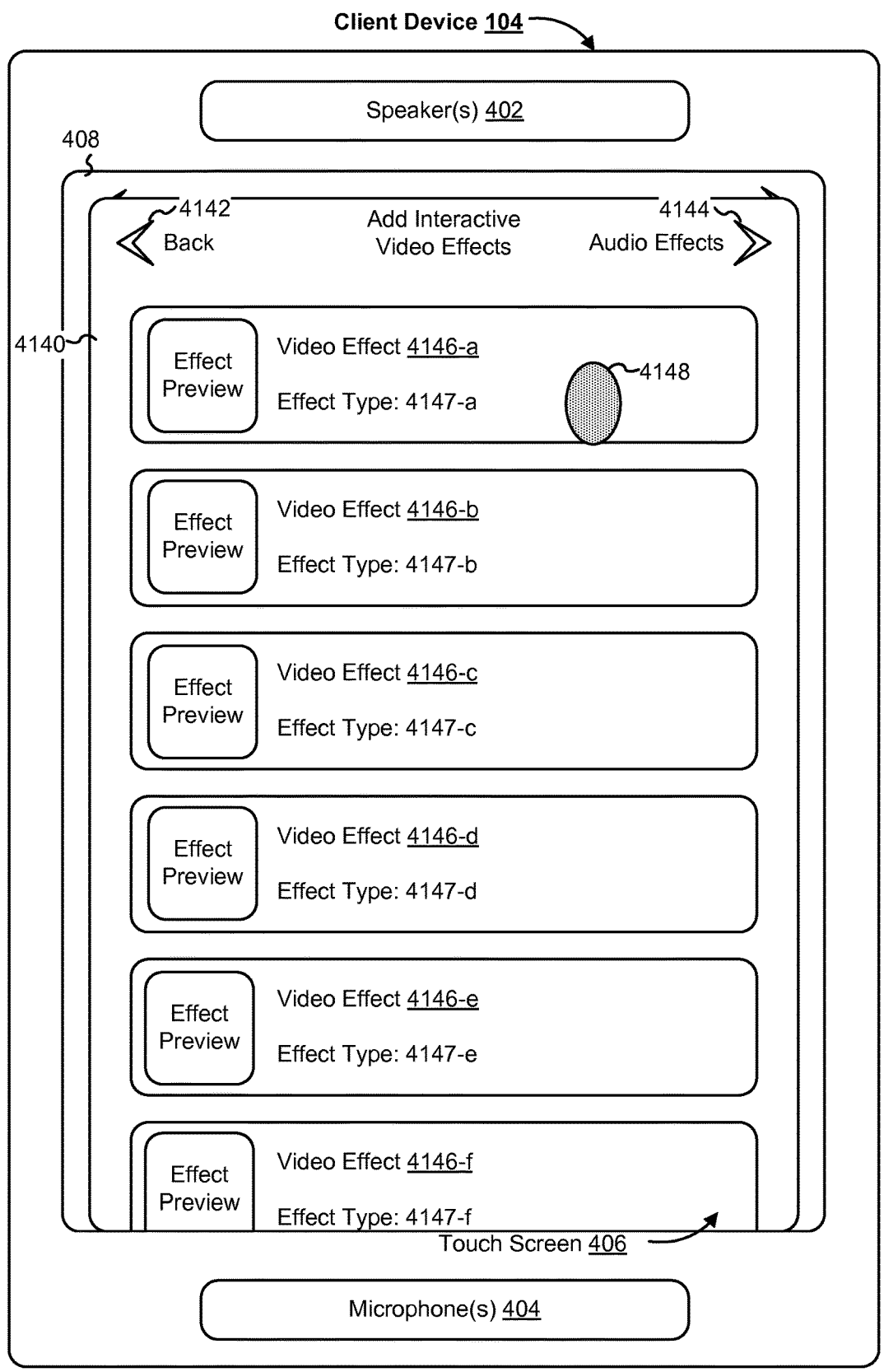

FIG. 4X illustrates client device 104 displaying a first interactive effects selection panel 4140 in response to detecting contact 4138 selecting "Make Interactive" affordance 4136 in FIG. 4W. In FIG. 4X, first interactive effects selection panel 4140 includes a plurality of video effect affordances 4146. In FIG. 4X, each video effect affordance 4146 corresponds to an interactive video effect type 4147 and includes a preview of the corresponding interactive video effect. In FIG. 4X, first interactive effects selection panel 4140 also includes back navigation affordance 4142, which, when activated (e.g., by a touch input from the user), causes client device 104 to display the previous user interface (e.g., the user interface in FIG. 4W or FIG. 4Z) and audio effects affordance 470, which, when activated (e.g., by a touch input from the user) causes client device 104 to display a second interactive effects selection panel including a plurality of interactive audio effects. In FIG. 4X, first interactive effects selection panel 4140 includes a portion of video effect affordance 4146-f indicating that the balance of video effects can be viewed by scrolling downwards in first interactive effects selection panel 4140. FIG. 4X also illustrates detecting contact 4148 on touch screen 406 at a location corresponding to video effect affordance 4146-a.

Figure 4Y:
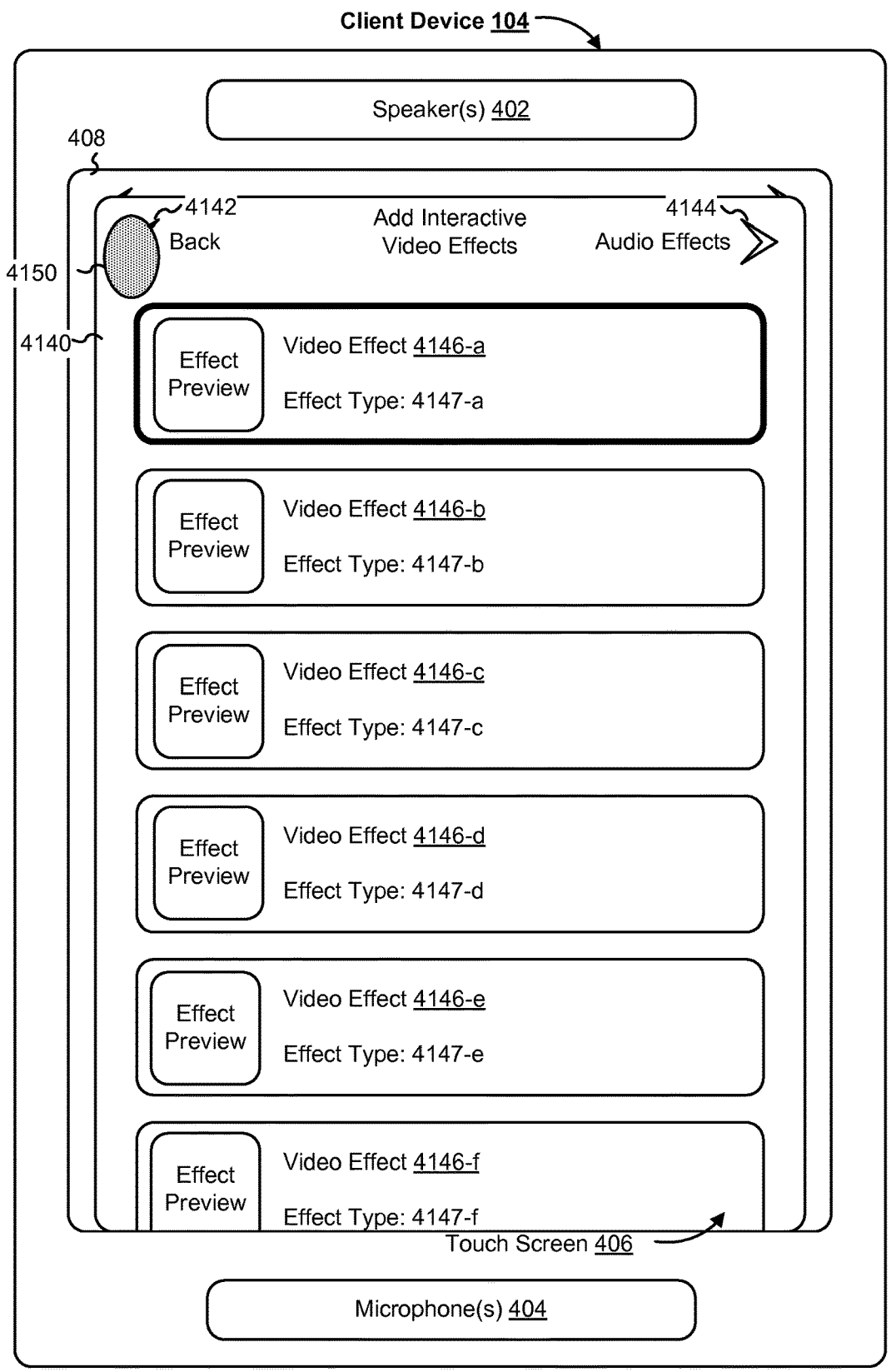
Figure 4Z:
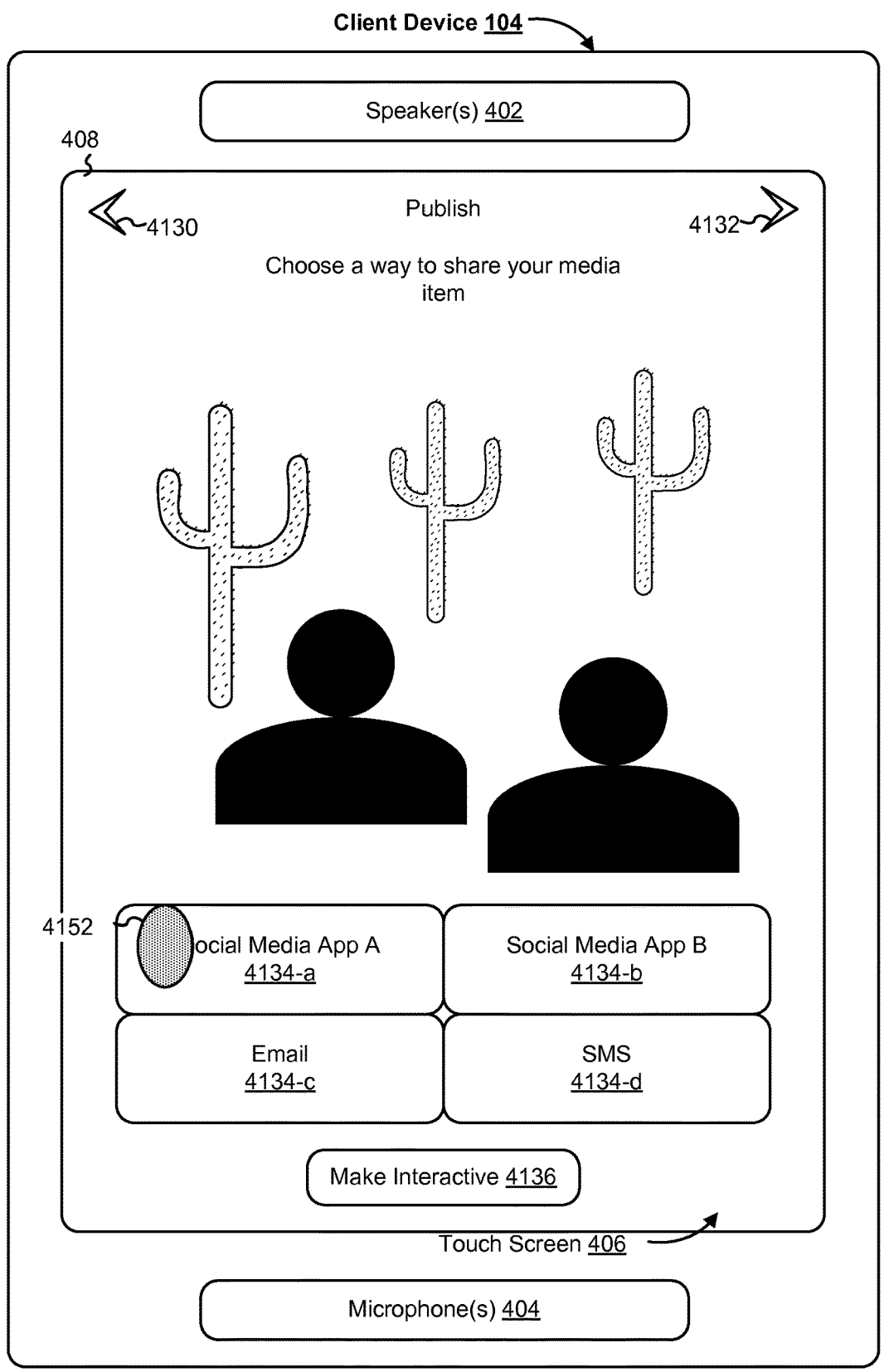
Figure 6A:
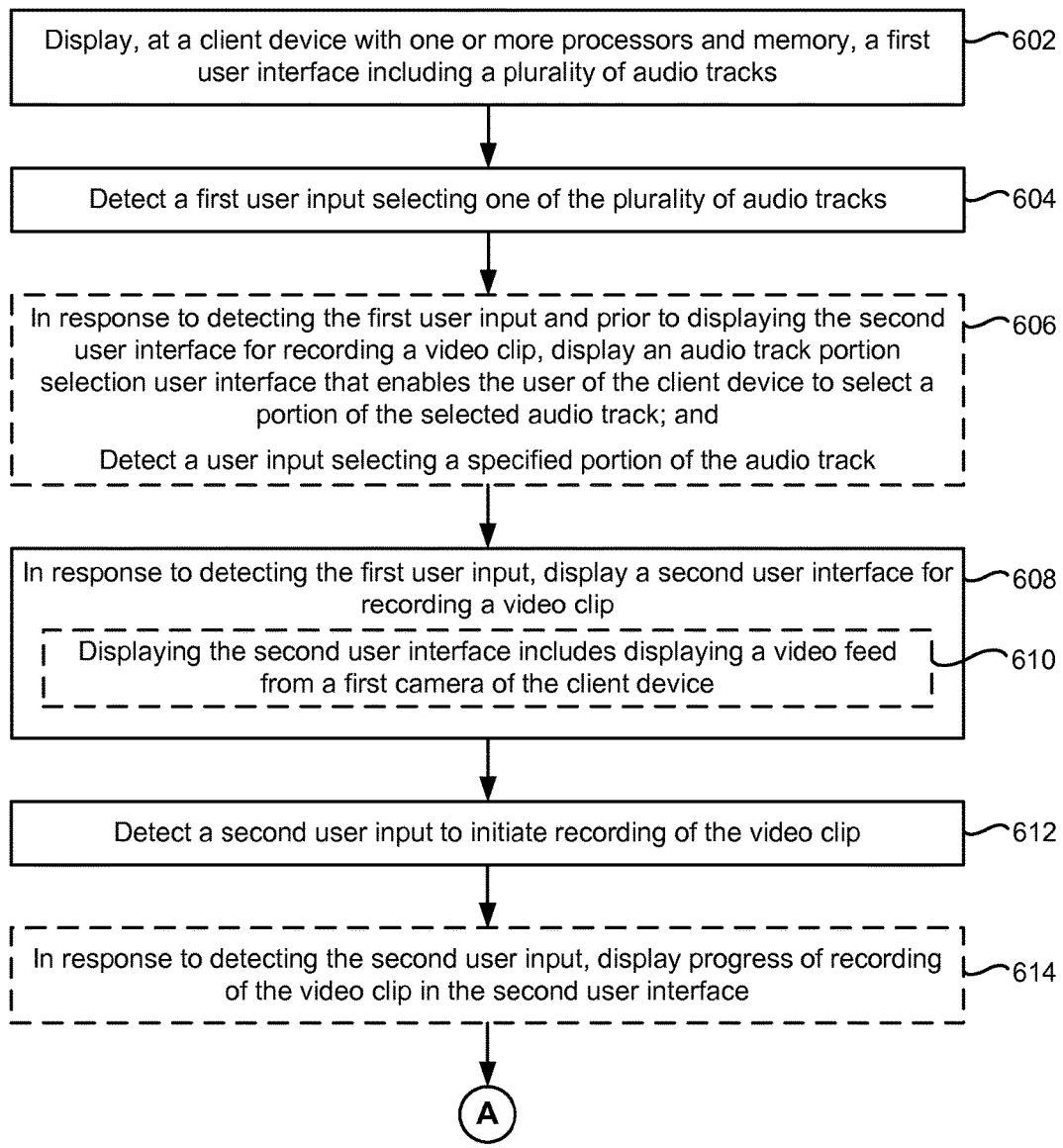
FIGS. 6A-6F illustrate a flowchart representation of a client-side method of generating a media item in accordance with some embodiments.
Figure 6B:
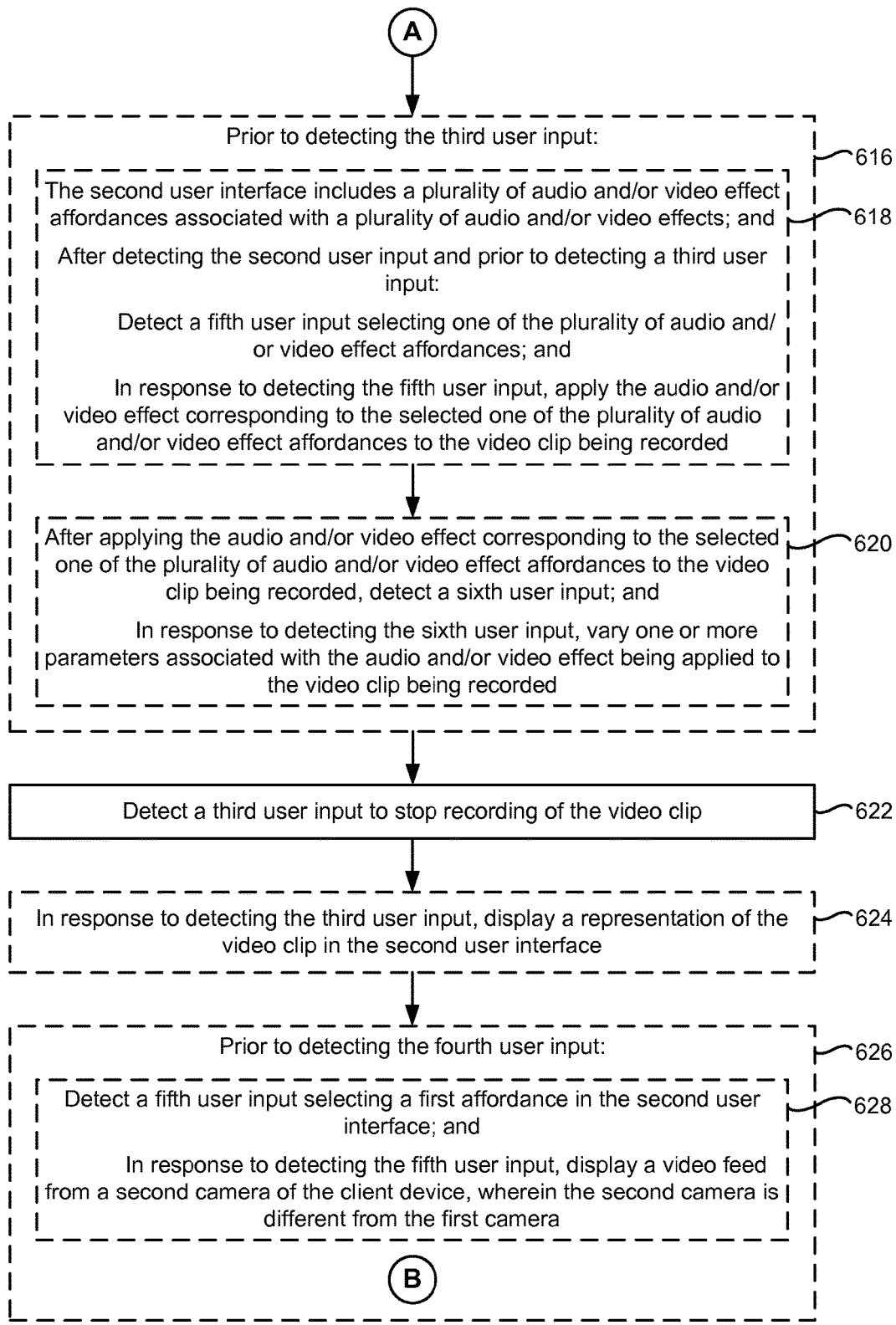
Figure 6C:
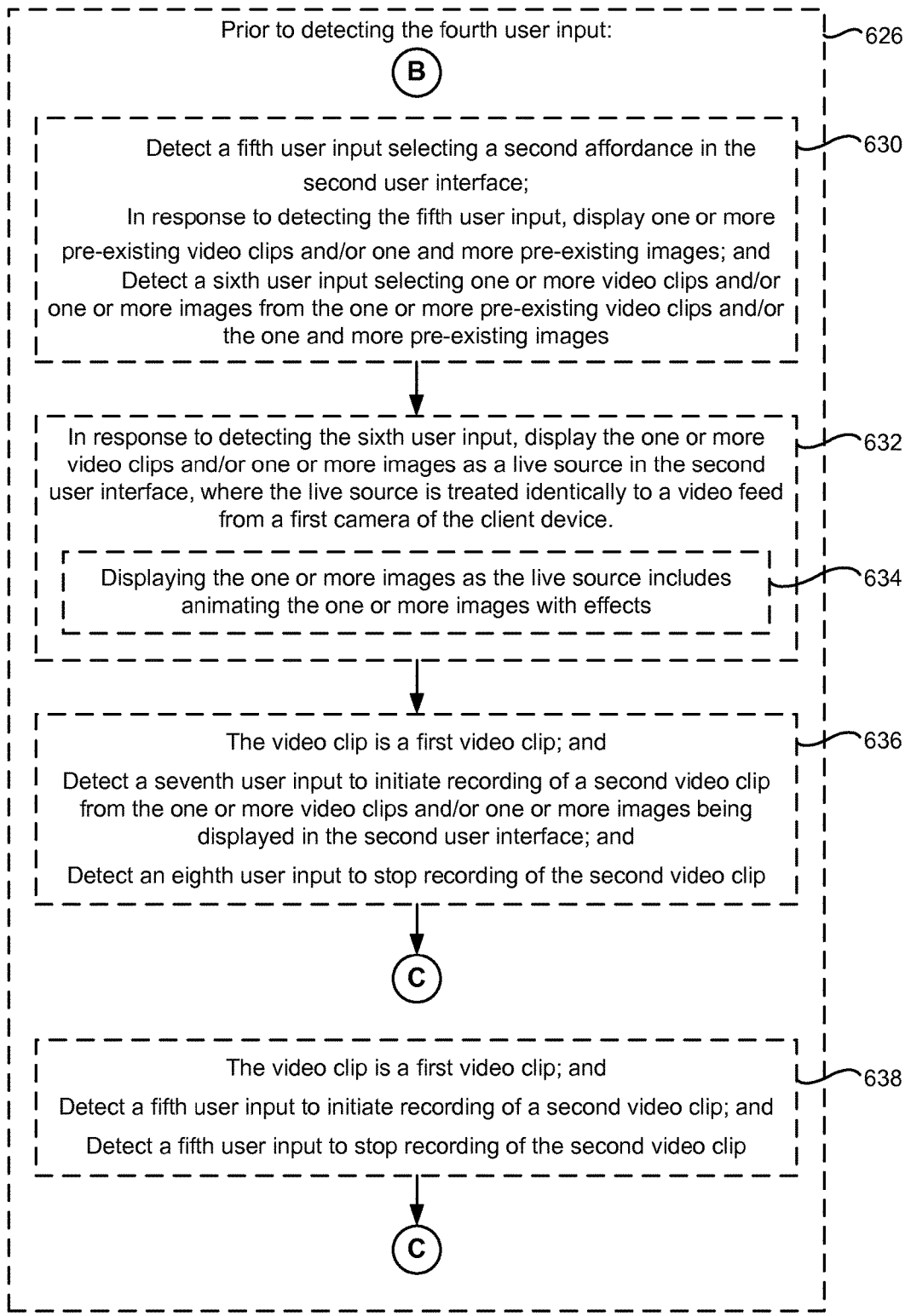
Figure 6D:
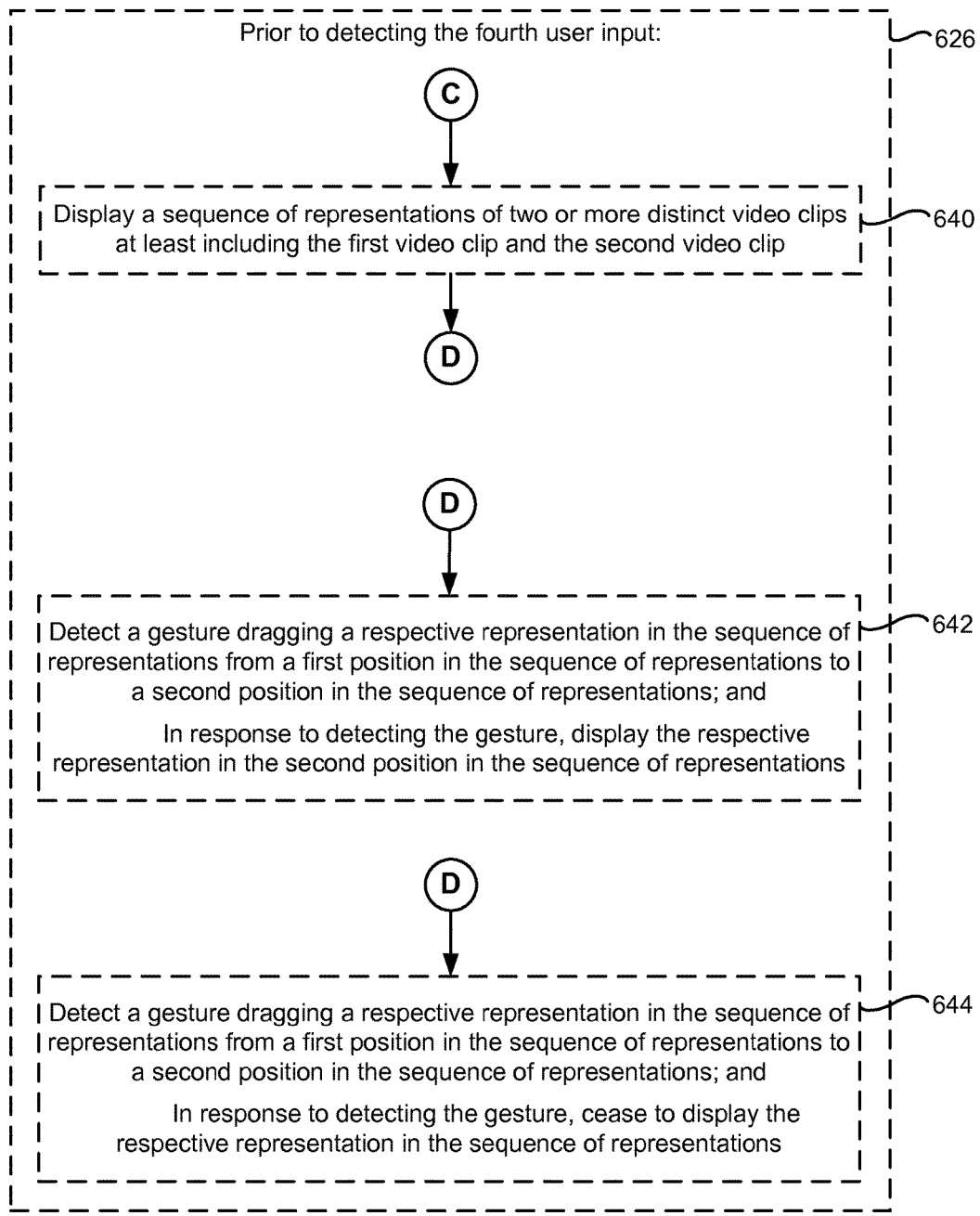
Figure 6E:
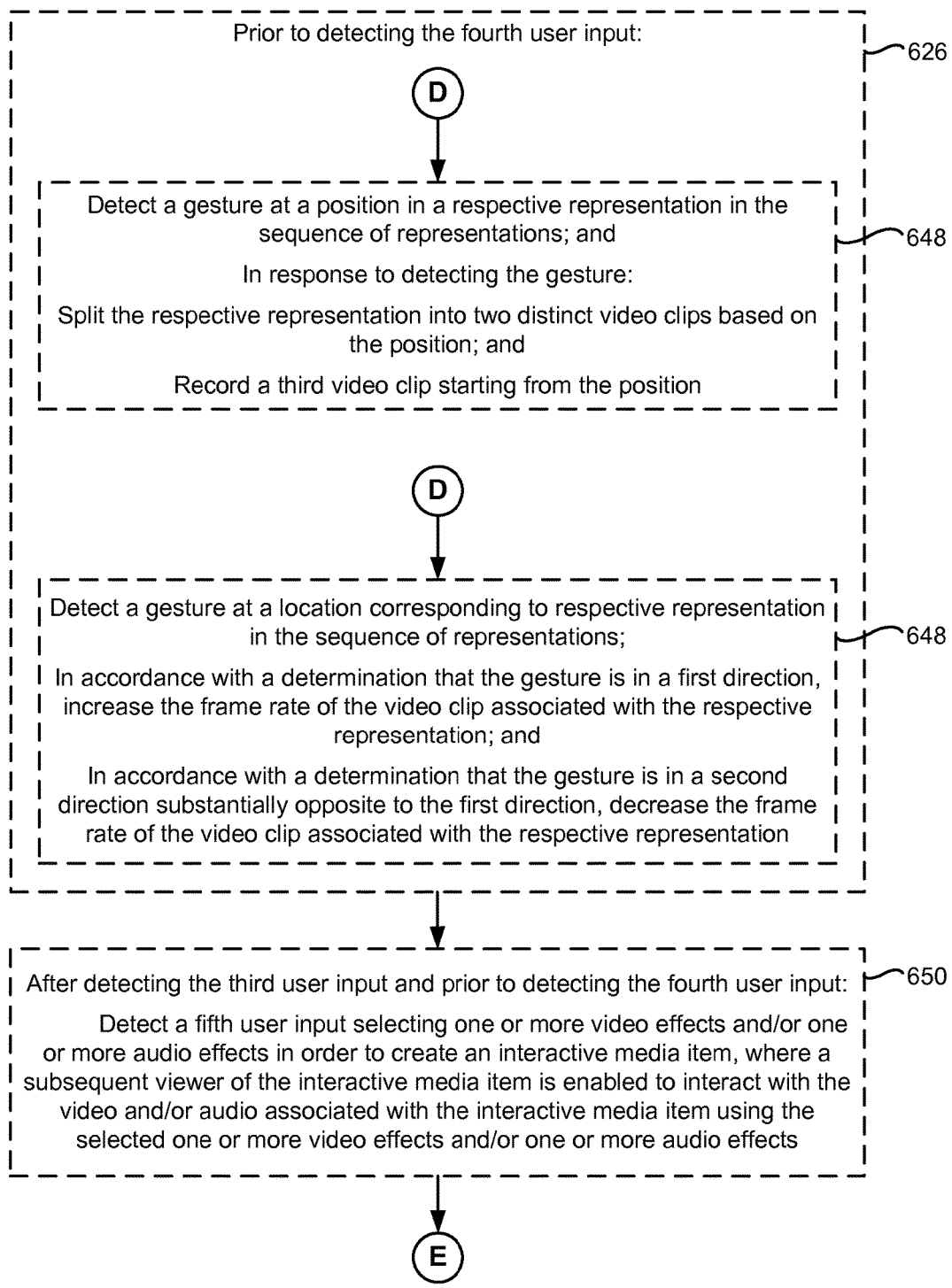
Figure 6F:
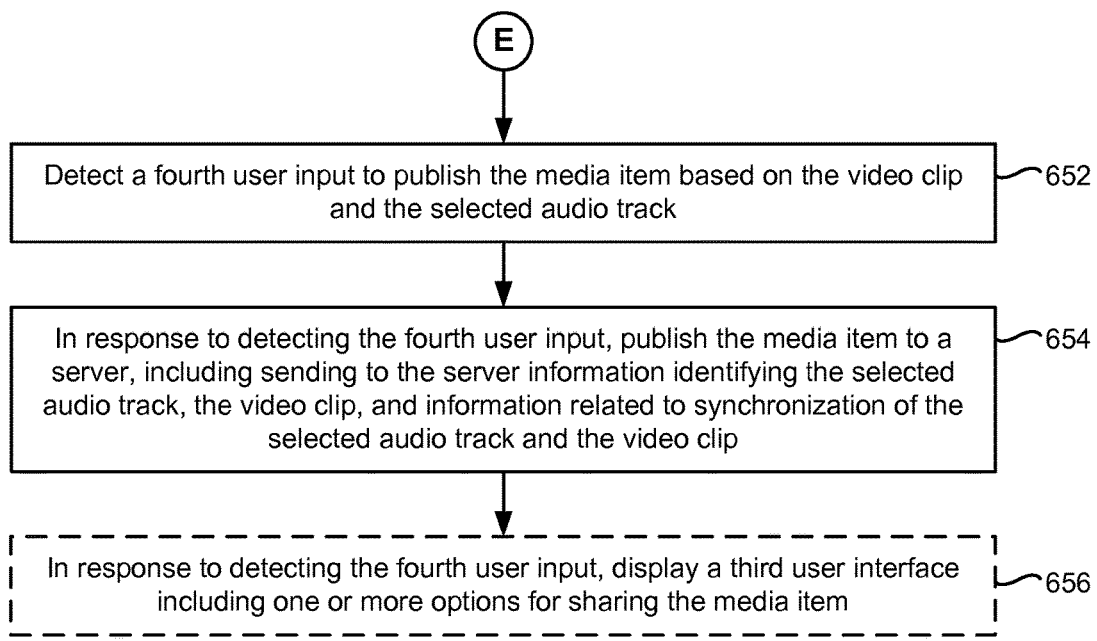

FIG. 4Y illustrates client device 104 displaying first interactive effects selection panel 4140. In FIG. 4Y, the thick frame surrounding video effect affordance 4146-a indicates that the interactive video effect corresponding to video effect affordance 4146-a has been selected in response to detecting contact 4148 in FIG. 4X. In FIG. 4Y, the user of client device 104 is able to select zero or more interactive audio and/or video effects in addition to the interactive video effect corresponding to video effect affordance 4146-a. FIG. 4Y also illustrates client device 104 detecting contact 4150 on touch screen 406 at a location corresponding to back navigation affordance 4142.

FIG. 4Z illustrates client device 104 displaying the publication user interface for the media item generated in FIGS. 4A-4U in response to detecting contact 4150 selecting back navigation affordance 4142 in FIG. 4Y. FIG. 4Z also illustrates client device 104 detecting contact 4152 on touch screen 406 at a location corresponding to social media application A 4134-a. For example, in response to detecting contact 4152 selecting social media application A 4134-a, the application places a link to, or causes a link to be placed for, the media item generated in FIGS. 4A-4U on a profile page in social media application A corresponding to the user of client device 104.

FIG. 5 is a diagram of a representative metadata structure 500 for a respective media item in accordance with some embodiments. In FIG. 5, representative metadata structure 500 corresponds to a respective media item. For example, in response to receiving information from a client device indicating that a user of the client device has generated a new media item (e.g., the respective media item), server system 108 generates metadata structure 500. In some embodiments, the received information at least includes first information identifying one or more audio tracks associated with the respective media item and second information identifying one or more media files (e.g., video clips or images) associated with the respective media item. In some embodiments, metadata structure 500 is stored in media item metadata database 116, as shown in FIGS. 1 and 3.

Metadata structure 500 includes a plurality of entries, fields, and/or tables including a subset or superset of the following:
  identification tag field 502 includes a unique identifier for the respective media item;
  author field 504 includes the identifier, name, or handle associated with the creator/author of the respective media item;
  date/time field 506 includes a date and/or time stamp associated with generation of the respective media item;
  one or more media file pointer fields 508 including a pointer or link (e.g., a URL) for each of the one or more media files (e.g., video clips or images) associated with the respective media item;
  one or more audio source tables 510 for each of the one or more audio tracks associated with the respective media item, for example, a representative audio source table includes one or more pairings for each of one or more audio sources for a respective audio track such as:
    audio pointer 512-a to a first source of the respective track (e.g., SoundCloud), and start time 514-a for the start time of the respective track from the first source; and
    audio pointer 512-b to a second source of the respective track (e.g., Pandora), and start time 514-b for the start time of the respective track from the second source;
  effects table 516 includes an entry 518 for each of zero or more audio and/or video effects to be applied to the respective media item at run-time upon playback by a subsequent viewer, for example, entry 518-a includes one or more of: the identifier, name, or handle associated with the user who added the effect; the effect type; the effect version; the content (e.g., one or more media files and/or audio tracks) subjected to the effect; a start time (t1) for the effect; an end time (t2) for the effect; one or more preset parameters (p1, p2, . . . ) for the effect; and an effect script or computer-readable instructions for the effect (e.g., GLSL);
  interactive effects table 520 includes an entry 522 for each of zero or more interactive audio and/or video effects to be controlled and manipulated at run-time by a subsequent viewer of the respective media item, for example, entry 522-a includes one or more of: the identifier, name, or handle associated with the user who added the interactive effect; the interactive effect type; the interactive effect version; the content (e.g., one or more media files and/or audio tracks) subjected to the effect; one or more parameters (p1, p2, . . . ) for the interactive effect; a table mapping interactive input modalities to effect parameters; and an effect script or computer-readable instructions for the interactive effect (e.g., GLSL);

play count field 524 includes zero or more entries 526 for each play back of the respective media item, for example, entry 526-*a* includes: the identifier, name, or handle associated with the user who played the respective media item; the date and time when the respective media item was played; and the location where the respective media item was played;

shares field 528 includes zero or more entries 530 for each share of the respective media item, for example, entry 530-*a* includes: the identifier, name, or handle associated with the user who shared the respective media item; the method by which the respective media item was shared; the date and time when the respective media item was shared; and the location where the respective media item was shared;

comments field 532 includes zero or more entries 534 for each comment (e.g., a hashtag) corresponding to the respective media item, for example, entry 534-*a* includes: the comment; the identifier, name, or handle associated with the user who authored the comment; the date and time when the comment was authored; and the location where the comment was authored; and associated media items field 536 includes zero or more entries 538 for each media item (e.g., a parent or child media item) associated with the respective media item, for example, entry 538-*a* corresponding to a parent media item associated with the respective media item includes: an identification tag for the parent media item; the identifier, name, or handle associated with the user who authored the parent media item; the date and time when the parent media item was authored; and the location where the parent media item was authored.

In some implementations, metadata structure 500, optionally, stores a subset of the entries, fields, and/or tables identified above. Furthermore, metadata structure 500, optionally, stores additional entries, fields, and/or tables not described above. In some embodiments, effect parameters include, but are not limited to: (x,y) position and scale of audio and/or video effects, edits, specification of interactive parameters, and so on.

FIGS. 6A-6F illustrate a flowchart diagram of a client-side method 600 of generating a media item in accordance with some embodiments. In some embodiments, method 500 is performed by an electronic device with one or more processors and memory. For example, in some embodiments, method 600 is performed by a mobile device (e.g., client device 104, FIGS. 1-2) or a component thereof (e.g., client-side module 102, FIGS. 1-2). In some embodiments, method 600 is governed by instructions that are stored in a non-transitory computer readable storage medium and the instructions are executed by one or more processors of the electronic device. Optional operations are indicated by dashed lines (e.g., boxes with dashed-line borders).

The client device displays (602) a first user interface including a plurality of audio tracks. FIG. 4A, for example, shows client device 104 displaying a first user interface of a process for generating a media item on touch screen 406. In FIG. 4A, for example, the first user interface includes a plurality of audio track affordances 416 corresponding to audio tracks.

The client device detects (604) a first user input selecting one of the plurality of audio tracks. FIG. 4A, for example, shows client device 104 detecting contact 420 selecting audio track affordance 416-*c* corresponding to an audio track.

In some embodiments, in response to detecting the first user input and prior to displaying the second user interface for recording a video clip, the client device displays (606) an audio track portion selection user interface that enables the user of the client device to select a portion of the selected audio track, and the client device detects a user input selecting a specified portion of the audio track. In response to detecting contact 420 selecting audio track affordance 416-*c*, FIGS. 4B-4C, for example, show client device 104 displaying a user interface prompting the user of client device 104 to choose a portion of the audio track corresponding to audio track affordance 416-*c*. FIG. 4B, for example, shows client device 104 detecting a dragging gesture with contact 438 to move end indicator 434 and along with it portion 436 of the audio track corresponding to audio track affordance 416-*c*. FIG. 4C, for example, shows client device 104 detecting contact 442 selecting portion 436 of the audio track corresponding to audio track affordance 416-*c*. In some embodiments, portion 436 is a predetermined maximum length (e.g., a 15, 30, etc. second chunk) in relation to a predetermined maximum size for the media item (e.g., in terms of seconds or bytes). In some embodiments, portion 436 is only limited by the length of the audio track. In FIGS. 4B-4C, for example, portion 436 is a predetermined 30 second chunk of the audio track corresponding to audio track affordance 416-*c* both before and after moving end indicator 434.

In response to detecting the first user input, the client device displays (608) a second user interface for recording a video clip. After selecting the audio track in FIG. 4A, FIG. 4D, for example, shows client device 104 displaying a second user interface on touch screen 406 of a process for generating a media item. In FIG. 4D, for example, the user interface prompts the user of client device 104 to record a video clip for the media item by tapping anywhere on touch screen 406.

In some embodiments, the process for generating the media item proceeds with client device 104 displaying the first user interface for selecting one of a plurality of audio tracks (e.g., FIGS. 4A-4C) for the media item prior to the second user interface for recording a video clip (e.g., FIG. 4D) for the media item. Alternatively, in some embodiments, the process for generating a media item proceeds with client device 104 displaying the second user interface for recording a video clip (e.g., FIG. 4D) for the media item prior to the first user interface for selecting one of a plurality of audio tracks (e.g., FIGS. 4A-4C) for the media item.

In some embodiments, displaying the second user interface includes (610) displaying a video feed from a first camera of the client device. In some embodiments, a feed from at least one of the one or more cameras of client device 104 is automatically displayed in the second user interface after selecting the audio track. FIG. 4D, for example, shows client device 104 displaying a live feed from a back-facing camera of client device 104 on touch screen 406. FIG. 4L, for example, shows client device 104 displaying a live feed from the front-facing camera of client device 104 on touch screen 406.

The client device detects (612) a second user input to initiate recording of the video clip (e.g., a tap gesture anywhere on the second user interface). FIG. 4D, for example, shows client device 104 detecting contact 454 at a location on touch screen 406 to initiate recording of a first video clip for the media item from the live feed from the back-facing camera of client device 104.

In some embodiments, in response to detecting the second user input, the client device displays (614) progress of recording of the video clip in the second user interface (e.g., a progress bar is filled while recording the video clip). FIG. 4E, for example, shows client device 104 displaying progress indicator 456 for the first video clip being recorded. In some embodiments, a predetermined maximum length for the media item limits the length of the one or more video clips being shot (e.g., 15, 30, 60, etc. seconds). For example, the horizontal width of the screen represents the predetermined maximum length for the one or more video clips associated with the media item. For example, in FIG. 4E, the length of progress indicator 456 indicates the length of the first video clip in relation to the predetermined maximum size for the media item.

In some embodiments, prior to detecting the third user input (616), the second user interface includes (618) a plurality of audio and/or video effect affordances associated with a plurality of audio and/or video effects, and, after detecting the second user input and prior to detecting the third user input, the client device: detects a fifth user input selecting one of the plurality of audio and/or video effect affordances; and in response to detecting the fifth user input, applies the audio and/or video effect corresponding to the selected one of the plurality of audio and/or video effect affordances to the video clip being recorded. FIG. 4L, for example, shows client device 104 displaying the user interface for recording a video clip including effects region 450 with a plurality of audio and/or video effect affordances 452 corresponding to audio and/or video effects. In FIG. 4L, for example, the thick frame surrounding effect affordance 452-a indicates that the effect corresponding to effect affordance 452-a (i.e., no effect) is being applied to the video feed displayed on touch screen 406. FIG. 4M, for example, shows client device 104 detecting contact 494 selecting effect affordance 452-c corresponding to a dots video effect. FIG. 4N, for example, shows client device 104 applying, in real-time, the dots video effect to the third video clip being recorded in response to detecting contact 494 selecting effect affordance 452-c in FIG. 4M. In some embodiments, the user of client device 104 is also able to apply, in real-time, overlay text, such as a title, to the video clip being recorded.

In some embodiments, prior to detecting the third user input (616), the client device (620): detects a sixth user input (e.g., moving a slider associated with the effect or performing a specified gesture) after applying the audio and/or video effect corresponding to the selected one of the plurality of audio and/or video effect affordances to the video clip being recorded; and in response to detecting the sixth user input, varies one or more parameters associated with the audio and/or video effect being applied to the video clip being recorded. In FIG. 4N, for example, the user interface includes effect modifier 496 for modifying the dots video effect in real-time. For example, effect modifier 496, in FIG. 4N, is a slider that increases the density of dots when slid left-to-right and decreases the density of dots when slid right-to-left. In some embodiments, audio and/or video effects in which multiple actual parameters have been projected to one-dimensional controls that map to simultaneously change to many actual controls, in order to simplify the user experience. In some embodiments, the control of effects is via "invisible" sliders actuated by simply touching and dragging across the screen. In some embodiments, the audio and/or video effects have interactive components that can be controlled and manipulated at run-time via user inputs from a subsequent viewer.

In some embodiments, the effects are downloaded from server system 108 at run-time including computer-readable instructions or scripts for the effects written in a language such as GLSL, accompanied by effect metadata indicating effect type, effect version, effect parameters, a table mapping interactive modalities (e.g., touch, gesture, sound, vision, etc.) to effect parameters, and so on. In this way, the choice, number, and type of effect can be varied at run-time. In some embodiments, a web-based content management server (CMS) is available for the real-time browser-based authoring and uploading of effects to the server, including real-time preview of effects on video and/or audio (e.g., using technologies such as WebGL). In some embodiments, the audio and/or video effects have interactive components that can specified and customized by authors via the CMS, and then be controlled and manipulated at run-time via user inputs.

The client device detects (622) a third user input to stop recording of the video clip (e.g., a tap gesture anywhere on the second user interface). FIG. 4E, for example, shows client device 104 detecting contact 458 at a location on touch screen 406 to stop recording of the first video clip for the media item.

In some embodiments, in response to detecting the third user input, the client device displays (624) a representation of the video clip in the second user interface. In FIG. 4F, for example, the user interface includes representation 462 of the first video clip recorded in FIGS. 4D-4E.

In some embodiments, the second user interface includes a first affordance, and, prior to detecting the fourth user input (626), the client device (628): detects a fifth user input selecting the first affordance; and, in response to detecting the fifth user input, displays a video feed from a second camera of the client device, where the second camera is different from the first camera. FIG. 4K, for example, shows client device 104 displaying a live feed from the back-facing camera of client device 104 on touch screen 406 and detecting contact 488 on touch screen 406 at a location corresponding to affordance 446 (e.g., the first affordance). FIG. 4L, for example, shows client device 104 displaying a live feed from the front-facing camera of client device 104 on touch screen 406 in response to detecting contact 488 selecting affordance 446 in FIG. 4K.

In some embodiments, the second user interface includes a second affordance, and, prior to detecting the fourth user input (626), the client device (630): detects a fifth user input selecting the second affordance; in response to detecting the fifth user input, displays one or more pre-existing video clips and/or one and more pre-existing images; and detects a sixth user input selecting one or more video clips and/or one or more images from the one or more pre-existing video clips and/or the one and more pre-existing images. FIG. 4F, for example, shows client device 104 detecting contact 464 on touch screen 406 at a location corresponding to affordance 448 (e.g., the second affordance). FIG. 4G, for example, shows client device 104 displaying first pre-existing media content selection panel 466 in response to detecting contact 464 selecting affordance 448 in FIG. 4F. For example, in FIG. 4G, first pre-existing media content selection panel 466 includes a plurality of video regions 471, where each of video regions 471 is associated with a pre-recorded video 472 from a video library associated with the user of client device 104 (e.g., video library 252, FIG. 2) and includes the recording date/time, length, comments, and location for the associated pre-recorded video 472. For example, in FIG. 4G, first pre-existing media content selection panel 466 also includes image library affordance 470, which, when activated (e.g., by a touch input from the user) causes client device 104 to display a second content selection panel including one or more pre-captured images in an image library associated with the user of client device 104 (e.g., image library 254, FIG. 2). FIG. 4G, for example, also shows client device 104 detecting contact 474 on touch screen 406 at a location corresponding to video region 471-*a* associated with pre-recorded video 472-*a*.

In some embodiments, in response to detecting the sixth user input, the client device displays (632) the one or more video clips and/or one or more images as a live source in the second user interface, where the live source is treated identically to a video feed from a first camera of the client device. FIG. 4H, for example, shows client device 104 displaying pre-recorded video 472-*a* as a live feed on touch screen 406 in response to detecting contact 474 selecting video region 471-*a* in FIG. 4G.

In some embodiments, displaying the one or more images as the live source includes animating (634) the one or more images with effects. For example, when one or more pre-captured images are selected from the image library, the one or more selected images are displayed on touch screen 406 as a live source (e.g., a slideshow) with animation effects (e.g., two- and three-dimensional movements, scale, pixel effects, distortion effects, transition effects, and so on) between images.

In some embodiments, the video clip is a first video clip, and, prior to detecting the fourth user input (626), the client device (636): detects a seventh user input to initiate recording of a second video clip from the one or more video clips and/or one or more images being displayed in the second user interface; and detects an eighth user input to stop recording of the second video clip. In some embodiments, the user of client device 104 is able to "sample" from pre-recorded video clips as if the pre-recorded video clip is a love source. FIG. 4H, for example, shows client device 104 detecting contact 478 at a location on touch screen 406 to initiate recording of a second video clip for the media item from pre-recorded video 472-*a*. FIG. 4I, for example, shows client device 104 detecting contact 482 at a location on touch screen 406 to stop recording of the second video clip for the media item.

In some embodiments, the video clip is a first video clip, and, prior to detecting the fourth user input (626), the client device (638): detects a fifth user input to initiate recording of a second video clip; and detects a fifth user input to stop recording of the second video clip. FIG. 4L, for example, shows client device 104 detecting contact 490 at a location on touch screen 406 to initiate recording of a third video clip for the media item from the live feed from the front-facing camera of client device 104. FIG. 4N, for example, shows client device 104 detecting contact 498 at a location on touch screen 406 to stop recording of the third video clip for the media item.

In some embodiments, prior to detecting the fourth user input (626), the client device displays (640) a sequence of representations of two or more distinct video clips at least including the first video clip and the second video clip. In some embodiments, representations of the recorded video clips are arranged according to the sequence in which the video clips were recorded in the process for generating the media item. In FIG. 4J, for example, the user interface includes a sequence of representations for two video clips: (1) representation 462 of the first video clip recorded in FIGS. 4D-4E; and (2) representation 484 of the second video clip recorded in FIGS. 4H-4I. In FIG. 4O, for example, the user interface includes a sequence of representations for three video clips: (1) representation 462 of the first video clip recorded in FIGS. 4D-4E; (2) representation 484 of the second video clip recorded in FIGS. 4H-4I; and (3) representation 4100 of the third video clip recorded in FIGS. 4L-4N.

In some embodiments, prior to detecting the fourth user input (626), the client device (642): detects a gesture dragging a respective representation in the sequence of representations from a first position in the sequence of representations to a second position in the sequence of representations; and, in response to detecting the gesture, displays the respective representation in the second position in the sequence of representations. In some embodiments, the user of client device 104 is able to reorder the recorded video clips by dragging a representation of a respective video clip them a first location to a second location in the sequence of representations. FIGS. 4O-4P, for example, show client device 104 detecting a dragging gesture with contact 4102 on touch screen 406 originating at a location corresponding to representation 4100 and moving representation 4100 of the third video clip out of the third position in the sequence of representations. FIG. 4Q, for example, shows client device 104 displaying representation 4100 of the third video clip in a second position in the sequence of representations and representation 484 of the second video clip in the third position in the sequences of representations in response to detecting the dragging gesture in FIGS. 4O-4P.

In some embodiments, prior to detecting the fourth user input (626), the client device (644): detects a gesture dragging a respective representation in the sequence of representations from a first position in the sequence of representations to a second position in the sequence of representations; and, in response to detecting the gesture, ceases to display the respective representation in the sequence of representations. In some embodiments, the user of client device 104 is able to delete a video clip by dragging a representation corresponding to the video clip off the screen or towards the top or edge of the screen, and detecting the end of a dragging gesture (e.g., liftoff of the contact comprising the dragging gesture). FIGS. 4Q-4R, for example, shows client device 104 detecting a dragging gesture with contact 4104 on touch screen 406 originating at a location corresponding to representation 484 and moving representation 484 of the second video clip from a third position in the sequence of representations to the right edge of touch screen 406. FIG. 4S, for example, shows client device 104 ceasing to display representation 484 in response to detecting the dragging gesture in FIGS. 4Q-4R.

In some embodiments, prior to detecting the fourth user input (626), the client device (646): detects a gesture at a position in a respective representation in the sequence of representations; and, in response to detecting the gesture: splits the respective representation into two distinct video clips based on the position; and records a third video clip starting from the position. In some embodiments, the user of client device 104 is able to split a video clip into two separate video clips based on the location of a user input selecting a representation of the video clip and, also, record a new video clip between the two separate video clips. FIG. 4S, for example, shows client device 104 detecting contact 4106 (e.g., a long press gesture) on touch screen 406 at a location corresponding to representation 462. FIG. 4T, for example, shows client device 104 splitting the first video clip corresponding to representation 462 into two separate video clips corresponding to representations 4108 and 4110 and, also, recording a fourth video clip associated with progress indicator 4112 between the two separate video clips in response to detecting contact 4106 in FIG. 4S. In one embodiment, the user of client device 104 is able to select an insertion along the video timeline somewhere between the beginning and end of a video clip corresponding to the location of an input gesture at a location corresponding to the representation for the video clip. Subsequently, in response to detecting a user input to initiate recording of a video clip, the video clip corresponding to the representation is split into two separate video clips at the insertion point, and a new video clip begins recording at the insertion point, moving all subsequent video clips forward in time in proportion to the duration of the new video clip.

In some embodiments, prior to detecting the fourth user input (626), the client device (648): detects a gesture at a location corresponding to a respective representation in the sequence of representations; in accordance with a determination that the gesture is in a first direction, increases the frame rate of the video clip associated with the respective representation; and in accordance with a determination that the gesture is in a second direction substantially opposite to the first direction, decreases the frame rate of the video clip associated with the respective representation. In some embodiments, the video clip was recorded at a maximum available frame rate (e.g., 120 frames per second (fps)). For example, with respect to FIG. 4L, the user of client device 104 is able to perform a pinch gesture at a location corresponding to representation 462 to increase the frame rate (and decrease the duration) of the video clip associated with representation 462. In this example, the frame rate is increased up to the displayable maximum frame-rate (e.g. 60 fps) after which point client device 104 is configured to skip or blend frames (e.g. playing the 2nd, 4th, 6th, and so on frames, or playing blended frames 2+3, 4+5, 6+7, and so on) to provide the continued illusion of faster-and-faster motion. In another example, with respect to FIG. 4L, the user of client device 104 is able to perform a de-pinch gesture (substantially opposite to the punch gesture) at a location corresponding to representation 462 to decrease the frame rate (and increase the duration) of the video clip associated with representation 462. In this example the frame rate is decreased down to the displayable minimum frame-rate (e.g. 15 fps) and thereafter client device 104 is configured to generate interpolated frames (e.g. interpolating between frames 3 and 4 to generate frame 3.5) to create ultra-slow-motion effects.

In some embodiments, the user of client device 104 is able to select the frame rate to record video in slow motion. In some embodiments, the user of client device 104 is able to import video clips from video library 252 (FIG. 2) and subsequently select the frame rate to sample the previously recorded video in slow motion. In some embodiments, after recording a video or sampling previously recorded video, the user of client device 104 is able to select a reverse-motion feature whereby the video is played back in reverse and the user of client device 104 is able to sample the video in reverse-motion for the media item to be generated. In some embodiments, before recording a video or sampling previously recorded video, the user of client device 104 is able to select a time-lapse feature whereby the run time of the video will be compressed to a selected time-lapse length (e.g., 5 minutes of captured video is sped up to fit a selected 2 minute time-lapse length). In some embodiments, before recording a video or sampling previously recorded video, the user of client device 104 is able to select a time-stretch feature whereby the run time of the video will be r stretched to a selected time-lapse length (e.g., 2 minutes of captured video is slowed down to fit a selected 5 minute time-stretch length).

In some embodiments, after detecting the third user input and prior to detecting the fourth user input, the client device detects (650) a fifth user input selecting one or more video effects and/or one or more audio effects in order to create an interactive media item, where a subsequent viewer of the interactive media item is able to interact with the video and/or audio associated with the interactive media item using the selected one or more video effects and/or one or more audio effects. In some embodiments, interactive audio and/or video effects selected by the author are embedded into the media item to make the media item interactive for subsequent viewers. For example, user inputs from a subsequent viewer control and manipulate these interactive effects at run-time. In some embodiments, effect ranges and parameters for the interactive effects are also selected by the author. FIG. 4X, for example, shows client device 104 displaying a first interactive effects selection panel 4140 in response to detecting contact 4138 selecting "Make Interactive" affordance 4136 in FIG. 4W. In FIG. 4X, for example, first interactive effects selection panel 4140 includes a plurality of video effect affordances 4146 each corresponding to an interactive video effect type 4147 and including a preview of the corresponding interactive video effect. In FIG. 4X, for example, first interactive effects selection panel 4140 also includes audio effects affordance 470, which, when activated (e.g., by a touch input from the user) causes client device 104 to display a second interactive effects selection panel including a plurality of interactive audio effects. FIG. 4X, for example, shows also shows client device 104 detecting contact 4148 on touch screen 406 selecting video effect affordance 4146-*a* corresponding to a respective video effect. In FIG. 4Y, for example, the thick frame surrounding video effect affordance 4146-*a* indicates that the video effect corresponding to video effect affordance 4146-*a* has been selected in response to detecting contact 4148 in FIG. 4X. For example, in FIG. 4Y, the user of client device 104 is able to select zero or more interactive audio and/or video effects in addition to the interactive video effect corresponding to video effect affordance 4146-*a*.

The client device detects (652) a fourth user input to publish the media item based on the video clip and the selected audio track. For example, in response to detecting a user input selecting forward navigation affordance 4132, in FIG. 4W or 4Z, client device 104 causes the media item to be published and displays a home screen for the application.

In response to detecting the fourth user input, the client device publishes (654) the media item to a server, including sending to the server information identifying the selected audio track, the video clip, and information related to synchronization of the selected audio track and the video clip. For example, in response to detecting a user input selecting forward navigation affordance 4132 (e.g., in FIG. 4W or FIG. 4Z) or a user input selecting any of sharing options 4134 (e.g., in FIG. 4W), client device 104 causes the media item generated in FIGS. 4A-4U to be published by sending, to server system 108, information associated with the media item. In some embodiments, the information at least includes: (A) first information identifying at least a portion of an audio track selected in FIGS. 4A-4C; and (B) second information identifying the recorded video clips corresponding to representations 4108, 4116, 4110, and 4100 in FIG. 4U. In some embodiments, in response to publishing the media item, server system 108 downloads the one or more video clips identified in the second information and creates a metadata structure (e.g., metadata structure 500, FIG. 5) at least including a pointer to each of the one or more video clips and a pointer to the audio track.

In some embodiments, in response to detecting the fourth user input, the client device displays (656) a third user interface including one or more options for sharing the media item (e.g., affordances for email, SMS, social media outlets, etc.). FIG. 4Z, for example, shows client device 104 detecting contact 4152 on touch screen 406 at a location corresponding to social media application A 4134-*a*. For example, in response to detecting contact 4152 selecting social media application A 4134-*a*, client device 104 causes a link to the generated media item to be placed on a profile page in social media application A corresponding to the user of client device 104. In another example, in response to detecting contact 4152 selecting social media application A 4134-*a*, client device 104 causes a link to the generated media item to be placed on a profile page in social media application A corresponding to the user of client device 104 and the generated media item is published by sending, to server system 108, information associated with the media item.

Figure 7A:
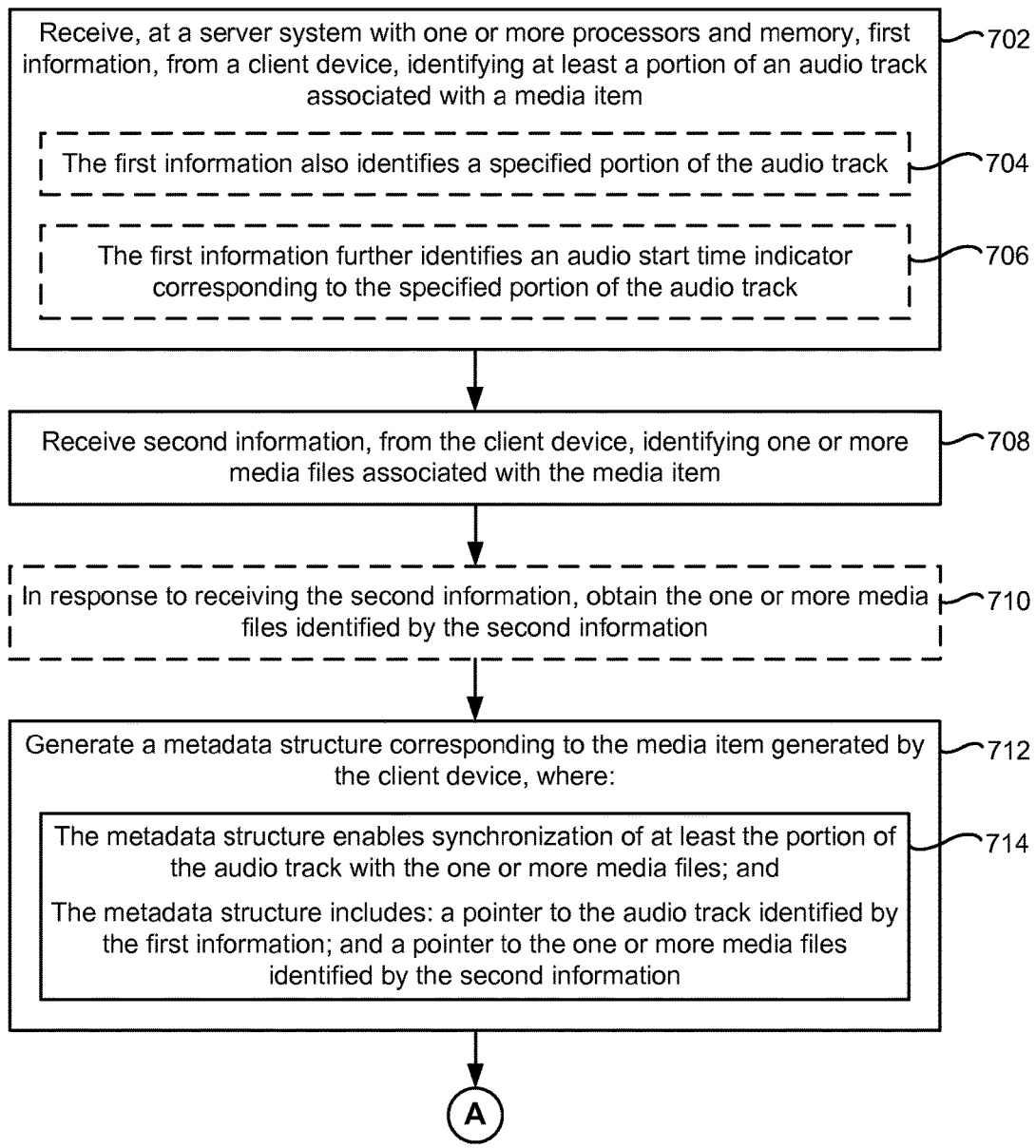
FIGS. 7A-7B illustrate a flowchart representation of a server-side method of generating a media item in accordance with some embodiments.
Figure 7B:
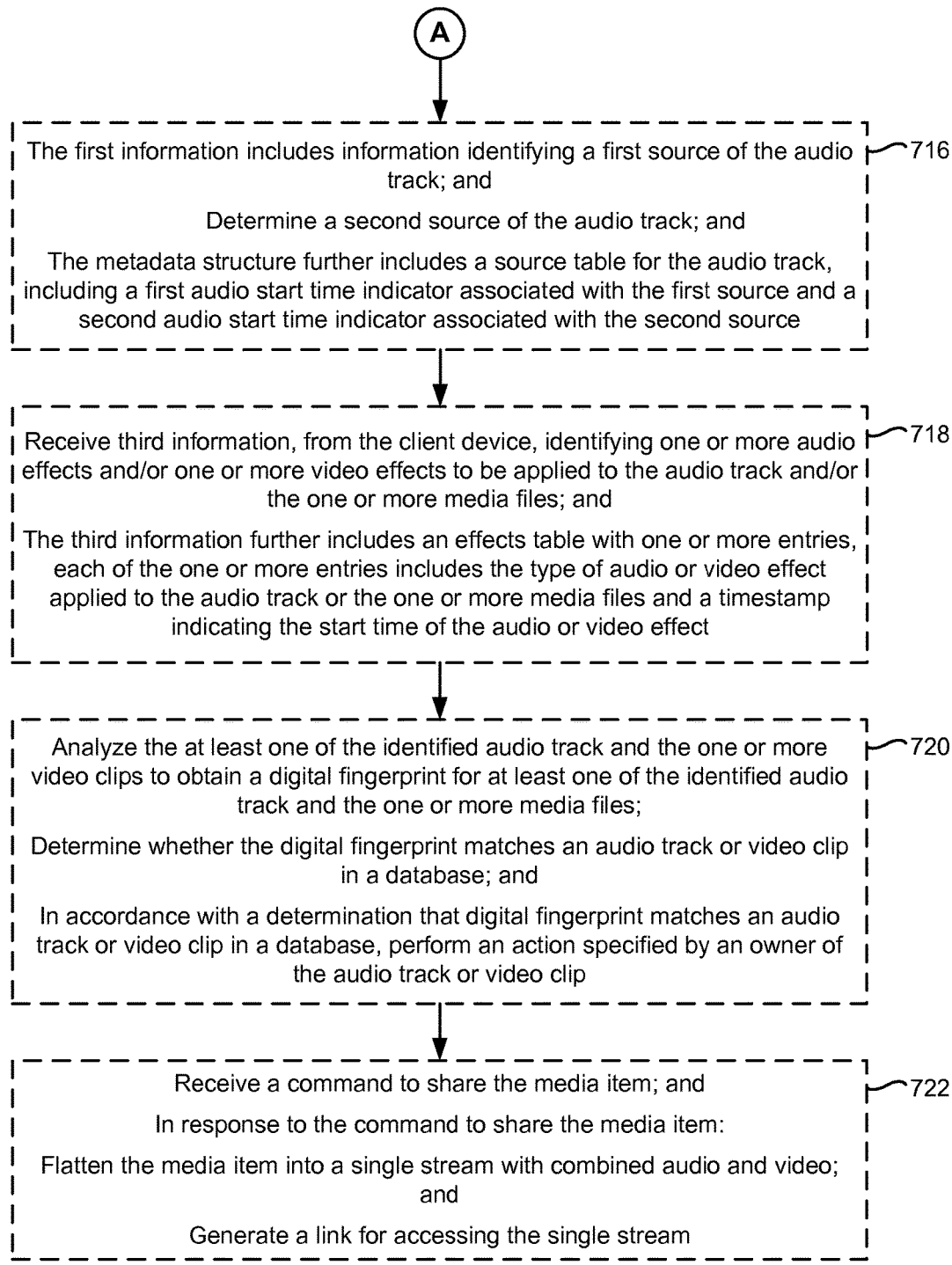

FIGS. 7A-7B illustrate a flowchart diagram of a server-side method 700 of generating the media item in accordance with some embodiments. In some embodiments, method 700 is performed by an electronic device with one or more processors and memory. For example, in some embodiments, method 700 is performed by a server (e.g., server system 108, FIGS. 1 and 3) or a component thereof (e.g., server-side module 106, FIGS. 1 and 3). In some embodiments, method 700 is governed by instructions that are stored in a non-transitory computer readable storage medium and the instructions are executed by one or more processors of the electronic device. Optional operations are indicated by dashed lines (e.g., boxes with dashed-line borders).

The server receives (702) first information, from a client device, identifying at least a portion of an audio track associated with the media item. For example, in response to detecting a user input selecting forward navigation affordance 4132, in FIG. 4W or FIG. 4Z, client device 104 causes the media item to be published by sending, to server system 108, first information identifying at least a portion of an audio track selected in FIGS. 4A-4C associated with the media item generated in FIGS. 4A-4U.

In some embodiments, the first information also identifies (704) a specified portion of the audio track (e.g., the specified portion of the audio track includes at least a predetermined amount of the audio track such as 5, 10, 15, 30, etc. seconds). For example, the first information identifying at least a portion of the audio track selected in FIGS. 4A-4C, identifies portion 436 (e.g., a 30 second chunk of the audio track corresponding to audio track affordance 416-*c*) selected in FIG. 4C.

In some embodiments, the first information further identifies (706) an audio start time indicator corresponding to the specified portion of the audio track. For example, the first information includes a start timestamp associated with start indicator 440 and an end timestamp associated with end indicator 434 for portion 436 of the audio track corresponding to audio track affordance 416-*c* selected in FIG. 4C.

The server receives (708) second information, from the client device, identifying one or more media files associated with the media item. In some embodiments, the one or more media files include one or more video clips recorded by the user during the process for creating the media item, one or more pre-recorded video clips selected from the user's video library 252 (FIG. 2), one or more pre-captured images selected from the user's image library 256 (FIG. 2), or video clips and/or images selected from a remote media file source 126, as shown in FIG. 1 (e.g., YouTube or Flickr). For example, in response to detecting a user input selecting forward navigation affordance 4132, in FIG. 4W or FIG. 4Z, client device 104 causes the media item to be published by also sending, to server system 108, second information identifying the recorded video clips corresponding to representations 4108, 4116, 4110, and 4100 in FIG. 4U associated with the media item generated in FIGS. 4A-4U.

In some embodiments, in response to receiving the second information, the server obtains (710) the one or more media files identified by the second information. For example, server system 108 downloads the video clips corresponding to representations 4108, 4116, 4110, and 4100 in FIG. 4U to media files database 114, as shown in FIGS. 1 and 3. In another example, server system 108 causes the video clips corresponding to representations 4108, 4116, 4110, and 4100 in FIG. 4U to be saved to a database located remotely from server system 108.

The server generates (712) a metadata structure corresponding to the media item generated by the client device, where (714): the metadata structure enables synchronization of at least the portion of the audio track with the one or more media files; and the metadata structure includes: a pointer to the audio track identified by the first information; and a pointer to the one or more media files identified by the second information. For example, in response to receiving the first information and the second information, server system 108 generates metadata structure 500, as shown in FIG. 5, corresponding to the media item generated in FIGS. 4A-4U. In FIG. 5, for example, metadata structure 500 includes: (A) one or more video file pointer fields 508 including a pointer or link (e.g., a URL) for each of the one or more video clips associated with the media item; and (B) an audio pointer for each of the one or more audio tracks associated with the media item. For example, metadata structure 500 also includes an audio start time field to synchronize the audio track with the one or more media files associated with the media item. In another example, metadata structure 500 does not include an audio start time field and the audio track is predefined to start from its beginning.

In some embodiments, the first information includes information identifying a first source of the audio track, and the client device (716): determines a second source of the audio track, where the metadata structure further includes a source table for the audio track, including a first audio start time indicator associated with the first source and a second audio start time indicator associated with the second source. For example, an audio source table for an audio track associated with a media item is required to maintain synchronized play back of the audio track when the audio track is available from two or more streaming audio service providers (e.g., Spotify, SoundCloud, Rdio, Pandora, etc.) and the various streaming versions of the audio track include differences such as varying start times. In FIG. 5, for example, metadata structure 500 includes one or more audio source tables 510 for each of the one or more audio tracks associated with the media item. In this example, a representative audio source table for a respective audio track includes one or more pairings for each of one or more audio sources for the respective audio track. In this example, a first representative pairing includes audio pointer 512-*a* to a first source of the respective track (e.g., SoundCloud) and start time 514-*a* for the start time of the respective track from the first source, and a second representative pairing includes audio pointer 512-*b* to a second source of the respective track (e.g., Pandora) and start time 514-*b* for the start time of the respective track from the second source.

In some embodiments, the server receives (718) third information, from the client device, identifying one or more audio effects and/or one or more video effects to be applied to the audio track and/or the one or more media files, where the third information further includes an effects table with one or more entries, each of the one or more entries includes the type of audio or video effect applied to the audio track or the one or more media files and a timestamp indicating the start time of the audio or video effect. In some embodiments, audio and/or video effects are created during the process of generating a media item as a metadata description of effects, that are to be applied at run-time in the application or browser of the subsequent viewer, to preserve the quality of effects, and to allow infinite remixing, revision, and future high-quality compatibility with new devices and resolution. For example, the third information includes effects table 516, in FIG. 5. In this example, each entry 518 in effects table 516 corresponds to an audio and/or video effect selected by the author of the media item. Continuing with this example, the entry 518-*a* includes one or more of: the identifier, name, or handle associated with the user who added the effect; the effect type; the effect version; the content (e.g., media file and/or audio track) subjected to the effect; a start time (t1) for the effect; an end time (t2) for the effect; and one or more preset parameters (p1, p2, . . . ) for the effect. In some embodiments, the entry also includes computer-readable instructions for generating the effect such as GLSL scripts.

In some embodiments, the server (720): analyzes the at least one of the identified audio track and the one or more media files to obtain a digital fingerprint for at least one of the identified audio track and the one or more media files; determines whether the digital fingerprint matches an audio track or video clip in a database; and in accordance with a determination that digital fingerprint matches an audio track or video clip in a database, performs an action specified by an owner of the audio track or video clip. In some embodiments, owners of copyrighted audio tracks or video clips upload at least a sample of the audio tracks or video clips to reference database 332 (FIG. 3) associated with the provider of the application. In some embodiments, the owner of the copyrighted audio tracks or video clips also identifies a preference for treating user generated media items that include audio tracks or video clips that matches their copyrighted audio tracks or video clips. In some embodiments, server system 108 or a component thereof (e.g., analyzing module 322, FIG. 3) analyzes the audio tracks and video clips associated with the user generated media item to determine a digital fingerprint for the audio tracks and video clips. In some embodiments, when server system 108 or a component thereof (e.g., determining module 324, FIG. 3) determines that the digital fingerprint for the audio tracks and video clips associated with the user generated media item matches copyrighted audio tracks and/or video clips in reference database 332, server system 108 or a component thereof (e.g., performing module 326, FIG. 3) is configured to perform an action corresponding to the preference identified by the owner of the copyrighted audio tracks and/or video clips. For example, copyright holder may allow users to freely use their copyrighted audio tracks and/or video clips, prefer to collect a portion of ad revenue generated from views of the user generated media item, or prefer to scrub their copyrighted audio tracks and/or video clips from the user generated media item (e.g., muting the copyrighted audio).

In some embodiments, the server (722): receives a command to share the media item; and in response to the command to share the media item: flattens the media item into a single stream with combined audio and video; and generates a link for accessing the single stream. For example, in response to detecting contact 4152 selecting social media application A 4134-*a* in FIG. 4Z, server system 108 receives, from client device 104, a command to share the media item generated in FIGS. 4A-4U. In response to receiving the command, server system 108 causes a link to the media item to be placed on a profile page in social media application A corresponding to the user of client device 104. In some embodiments, server system 108 or a component thereof (e.g., modifying module 328, FIG. 3) generates a flattened version of the media item by combining the one or more audio tracks, one or more video clips, and zero or more effects associated with the media item into a single stream or digital media item. In some embodiments, the link placed on the profile page in social media application A corresponds to the flattened version of the media item for web browsers.

In some embodiments, sharing a media item is accomplished by a specialized web player that recreates a subset of the functions of the application and runs in a web browser, such as some combination of: synchronizing audio and video streams from different sources during playback; applying real-time effects; allowing interaction with the player; allowing sharing and re-sharing of the media item on social networks or embedded in web pages, etc.

It will be understood that, although the terms "first," "second," etc. may be used herein to describe various elements, these elements should not be limited by these terms. These terms are only used to distinguish one element from another. For example, a first user input could be termed a second user input, and, similarly, a second user input could be termed a first user input, without changing the meaning of the description, so long as all occurrences of the "first user input" are renamed consistently and all occurrences of the "second user input" are renamed consistently. The first user input and the second user input are both user inputs, but they are not the same user input.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method, comprising:
   at a server system, receiving information associated with an interactive media item, the information associated with the interactive media item including information identifying an audio file, information identifying a visual media file, synchronization information for playing the audio file simultaneously with the visual media file, and information on one or more interactive effects, wherein the interactive media item is generated based on input from a user, the generating of the interactive media item comprising:
   detecting one or more first user inputs selecting the audio files;
   detecting one or more second user inputs for obtaining the visual media file;
   detecting one or more third user inputs selecting the one or more interactive effects for association with the interactive media item, wherein the one or more third user inputs cause the server system to make the one or more interactive effects available to a subsequent viewer during a playback of the interactive media item, such that the subsequent viewer of the interactive media item is able to interact with video and/or audio of the interactive media item by controlling at least one parameter associated with the one or more interactive effects during the playback of the interactive media item; and
   generating the interactive media item based on the visual media file, the audio file, and the one or more interactive effects, the generating including generating the synchronization information; and
   publishing, by the server system, the interactive media item, the publishing comprising providing access for the playback of the interactive media item based on metadata generated using the information associated with the interactive media item, wherein the metadata includes information associating the at least one parameter with the interactive media item.

2. The method of claim 1, wherein the one or more interactive effects are selected from a group comprising:
   one or more audio effects;
   one or more visual effects; and
   one or more audiovisual effects.

3. The method of claim 1, wherein the one or more interactive effects are embedded into the interactive media item.

4. The method of claim 1, wherein the interactive media item is generated further based on one or more fourth user inputs varying one or more parameters associated with at least one of the one or more interactive effects.

5. The method of claim 1, wherein the visual media file is obtained based on:
   detecting a user input for initiating recording of a video clip; and
   detecting a user input to stop recording of the video clip.

6. The method of claim 1, wherein detecting the one or more third user inputs selecting the one or more interactive effects for association with the interactive media item comprises detecting the one or more third user inputs selecting one or more affordances corresponding to the one or more interactive effects.

7. The method of claim 1,
   wherein generating the interactive media item based on the visual media file, the audio file, and the one or more interactive effects comprises linking a particular interactive effect to a respective input gesture such that the subsequent viewer is able to activate the particular interactive effect using the respective input gesture, and wherein the respective input gesture is designated by one or more fourth user inputs.

8. The method of claim 1,
   wherein the generating of the interactive media item is further based on a user selected portion of the audio file.

9. The method of claim 1, further comprising:
   publishing the interactive media item in response to receiving the information associated with the interactive media item.

10. The method of claim 9, wherein the information identifying the audio file includes information identifying a licensed source for the audio file.

11. The method of claim 1, wherein the visual media file is obtained from a video feed from a camera of a client device operated by the user.

12. The method of claim 1, wherein the visual media file is obtained through user selection of the visual media file from a list of visual media files.

13. The method of claim 12, wherein the list of visual media files includes at least one image file displayed to the user as a live source.

14. The method of claim 1,
   wherein the interactive media item is generated further based on a second visual media file obtained based on input from the user.

15. The method of claim 14, further comprising:
   enabling the user to edit one or more properties of at least one of: the visual media file, the second visual media file, the audio file, and the one or more interactive effects; and
   enabling user input for editing timing information for the visual media file and the second visual media file, wherein the interactive media item is generated further based on the edited timing information.

16. The method of claim 15, wherein the user input for editing timing information is provided in response to displaying an interactive sequence of representations of two or more distinct visual media files including the visual media file and the second visual media file.

17. The method of claim 15,
   wherein the interactive media item is generated further based on user input adjusting a frame rate of the visual media file.

18. The method of claim 1, further comprising:
   storing, by the server system, the metadata for the interactive media item in a metadata database in response to the receiving of the information associated with the interactive media item, wherein the metadata includes a mapping of the at least one parameter to an input modality by which the subsequent viewer can control the at least one parameter.

19. A server system, comprising:
one or more processors; and
memory storing one or more programs to be executed by the one or more processors, the one or more programs comprising instructions for:
receiving information associated with an interactive media item, the information associated with the interactive media item including information identifying an audio file, information identifying a visual media file, synchronization information for playing the audio file simultaneously with the visual media file, and information on one or more interactive effects, wherein the interactive media item is generated based on input from a user, the generating of the interactive media item comprising:
detecting one or more first user inputs selecting the audio files;
detecting one or more second user inputs for obtaining the visual media file;
detecting one or more third user inputs selecting the one or more interactive effects for association with the interactive media item, wherein the one or more third user inputs cause the server system to make the one or more interactive effects available to a subsequent viewer during a playback of the interactive media item, such that the subsequent viewer of the interactive media item is able to interact with video and/or audio of the interactive media item by controlling at least one parameter associated with the one or more interactive effects during the playback of the interactive media item; and
generating the interactive media item based on the visual media file, the audio file, and the one or more interactive effects, the generating including generating the synchronization information; and
publishing, by the server system, the interactive media item, the publishing comprising providing access for the playback of the interactive media item based on metadata generated using the information associated with the interactive media item, wherein the metadata includes information associating the at least one parameter with the interactive media item.

20. A non-transitory computer-readable storage medium storing one or more programs, the one or more programs comprising instructions, which, when executed by one or more processors, cause the one or more processors to:
receive information associated with an interactive media item, the information associated with the interactive media item including information identifying an audio file, information identifying a visual media file, synchronization information for playing the audio file simultaneously with the visual media file, and information on one or more interactive effects, wherein the interactive media item is generated based on input from a user, the generating of the interactive media item comprising:
detecting one or more first user inputs selecting the audio files;
detecting one or more second user inputs for obtaining the visual media file;
detecting one or more third user inputs selecting the one or more interactive effects for association with the interactive media item, wherein the one or more third user inputs cause the one or more interactive effects to be made available to a subsequent viewer during a playback of the interactive media item, such that the subsequent viewer of the interactive media item is able to interact with video and/or audio of the interactive media item by controlling at least one parameter associated with the one or more interactive effects during the playback of the interactive media item; and
generating the interactive media item based on the visual media file, the audio file, and the one or more interactive effects, the generating including generating the synchronization information; and
publishing the interactive media item, the publishing comprising providing access for the playback of the interactive media item based on metadata generated using the information associated with the interactive media item, wherein the metadata includes information associating the at least one parameter with the interactive media item.

* * * * *

UNITED STATES PATENT AND TRADEMARK OFFICE
CERTIFICATE OF CORRECTION

PATENT NO. : 10,120,530 B2
APPLICATION NO. : 14/933921
DATED : November 6, 2018
INVENTOR(S) : Scott Snibbe et al.

Page 1 of 1

It is certified that error appears in the above-identified patent and that said Letters Patent is hereby corrected as shown below:

In the Claims

Column 27, Line 26, Claim 1, delete "files;" and insert -- file; --, therefor.

Column 29, Line 17, Claim 19, delete "files;" and insert -- file; --, therefor.

Column 30, Line 17, Claim 20, delete "files;" and insert -- file; --, therefor.

Signed and Sealed this
Fifteenth Day of January, 2019

Andrei Iancu
*Director of the United States Patent and Trademark Office*